(12) United States Patent
Muqaibel et al.

(10) Patent No.: US 9,154,263 B1
(45) Date of Patent: Oct. 6, 2015

(54) EVALUATION OF COMPRESSED SENSING IN UWB SYSTEMS WITH NBI

(71) Applicant: King Fahd University of Petroleum and Minerals, Dhahran (SA)

(72) Inventors: Ali Hussain Muqaibel, Dhahran (SA); Saleh Ahmed Alawsh, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/231,090

(22) Filed: Mar. 31, 2014

(51) Int. Cl.
*H04L 1/00* (2006.01)

(52) U.S. Cl.
CPC .................... *H04L 1/0048* (2013.01)

(58) Field of Classification Search
USPC .................. 375/350, 324, 346, 349
See application file for complete search history.

(56) References Cited

U.S. PATENT DOCUMENTS

| | | | |
|---|---|---|---|
| 2009/0046792 A1* | 2/2009 | Xu et al. | 375/260 |
| 2009/0222226 A1 | 9/2009 | Baraniuk et al. | |
| 2010/0246635 A1* | 9/2010 | Ye et al. | 375/130 |
| 2013/0115904 A1* | 5/2013 | Kapoor et al. | 455/234.1 |

FOREIGN PATENT DOCUMENTS

| | | |
|---|---|---|
| WO | 02/068990 | 9/2002 |
| WO | 2007/079574 | 7/2007 |

OTHER PUBLICATIONS

Ahmad Gomaa et al.; "Two Novel Compressed-sensing Algorithms for NBI Detection in OFDM Systems"; Mar. 2010; retrieved from http://www.utdallas.edu/~aag083000/ICASSP10_CS_NBI.pdf.

* cited by examiner

*Primary Examiner* — Kabir A Timory
(74) *Attorney, Agent, or Firm* — Oblon, McClelland, Maier & Neustadt, L.L.P.

(57) ABSTRACT

A method of mitigating narrow band interference (NBI) in ultra wide band (UWB) systems operating around 10 GHz mitigates multiuser interference from IEEE 802.22 and WiMAX, wherein the multiuser interference interferes with both trained and blind UWB systems, with the trained UWB system using pilot symbol assisted modulation. The method passes a received UWB signal through a band pass filter (BPF), wherein the BPF is located at a UWB receiver and the UWB signal is a Hanning modulated pulse centered at 4 GHz frequency. The method further measures a plurality of test functions, determines a number of active users, notch filters NBI signals, based on the determined number of active users, passes the notch filtered signal through a quadratic programming algorithm, to perform joint decoding, estimates an arrival of a UWB payload, and demodulates the UWB payload, based on the estimated arrival of the UWB payload.

20 Claims, 41 Drawing Sheets

Block diagram of the proposed system model

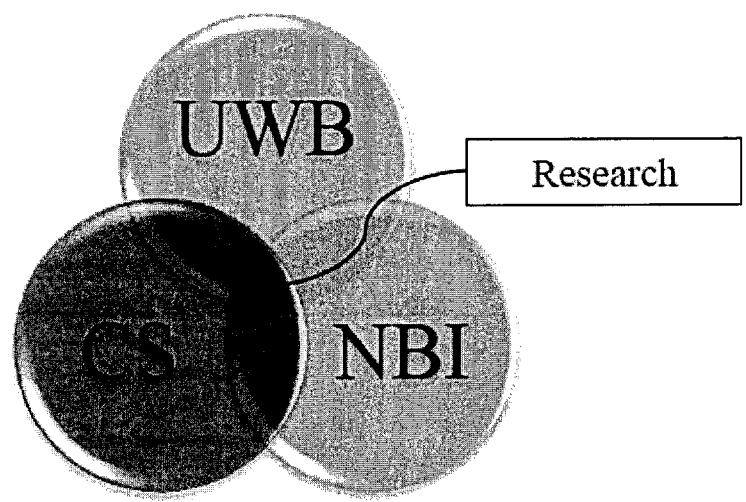
Figure 1 the main topics of the present disclosure

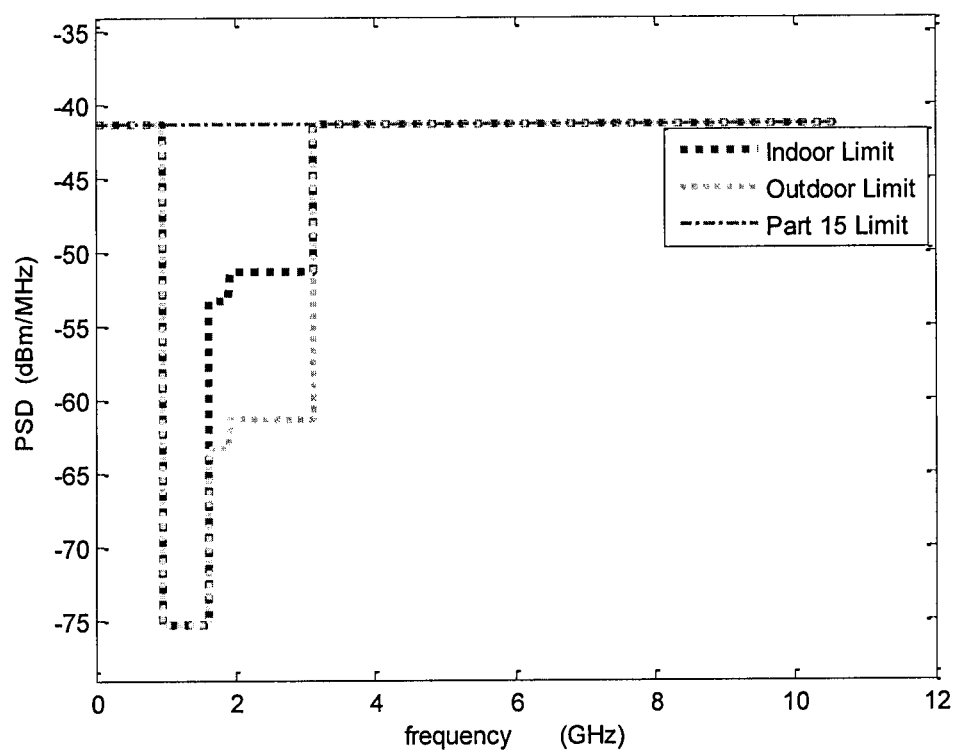
Figure 2 FCC spectral mask for UWB indoor communication systems

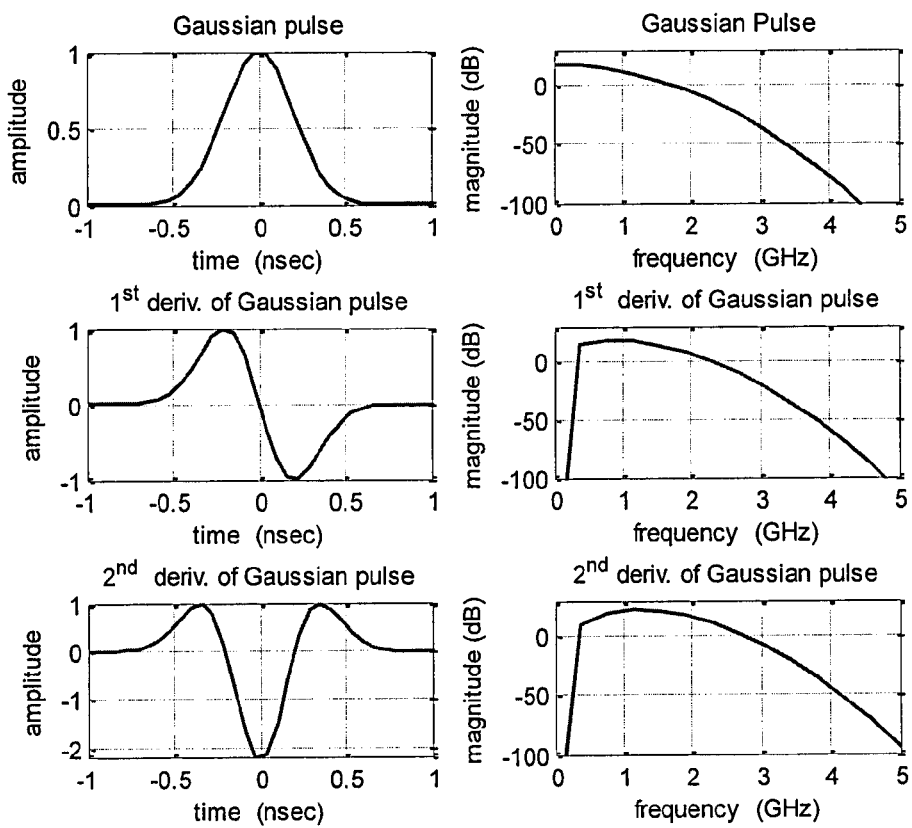
Figure 3 Time and frequency domains for the Gaussian, first, and second derivative Gaussian pulses

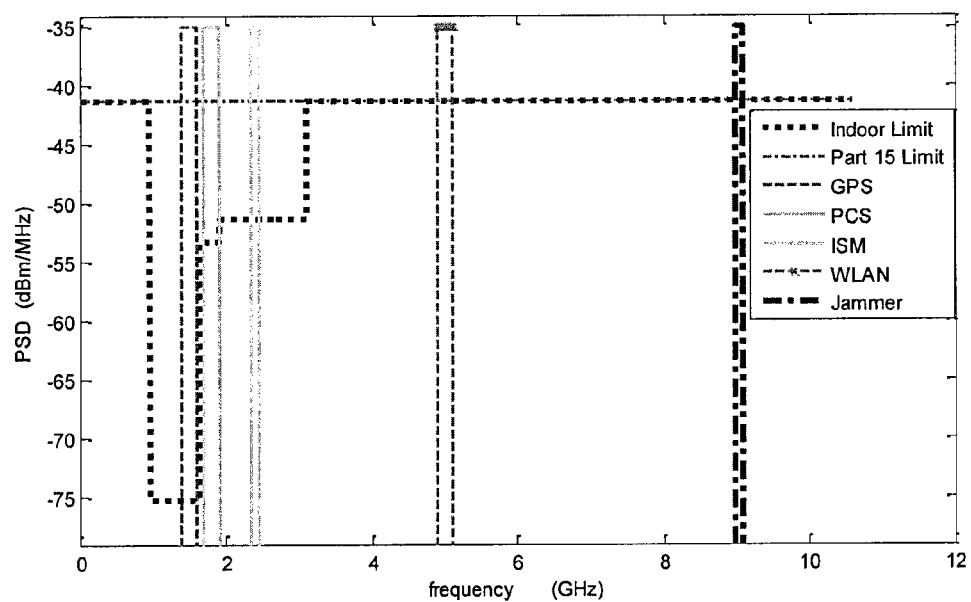
Figure 4 FCC spectral mask for UWB indoor communication systems with narrowband systems

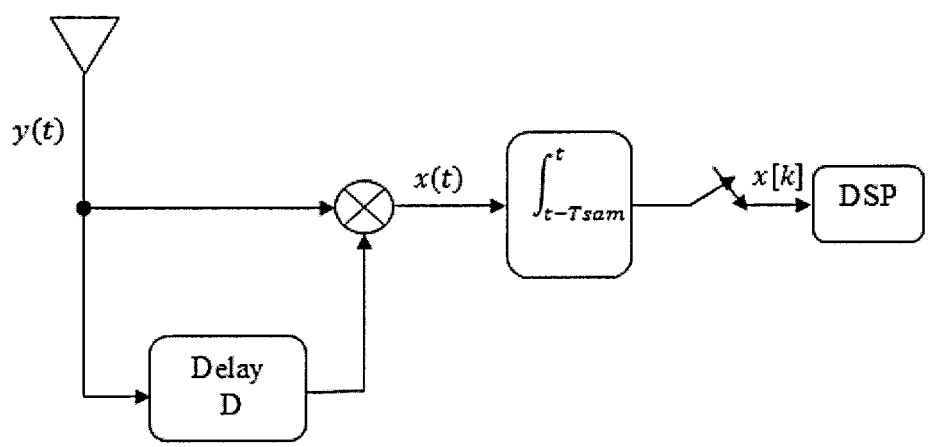
Figure 5 Autocorrelation receiver (AcR)

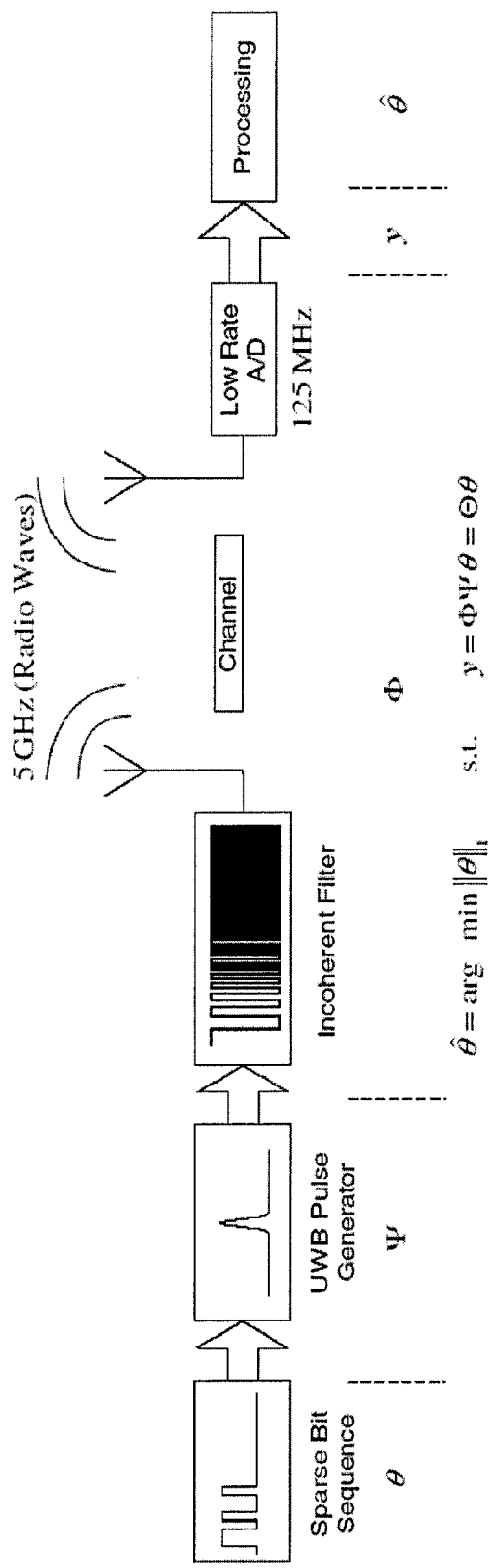
Figure 6 System architecture of CS based-UWB system

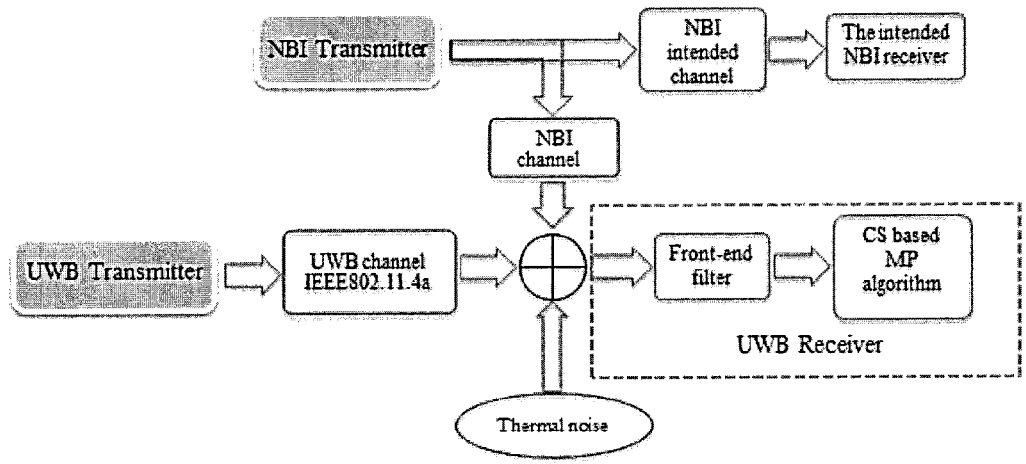
Figure 7 Block diagram of the proposed system model

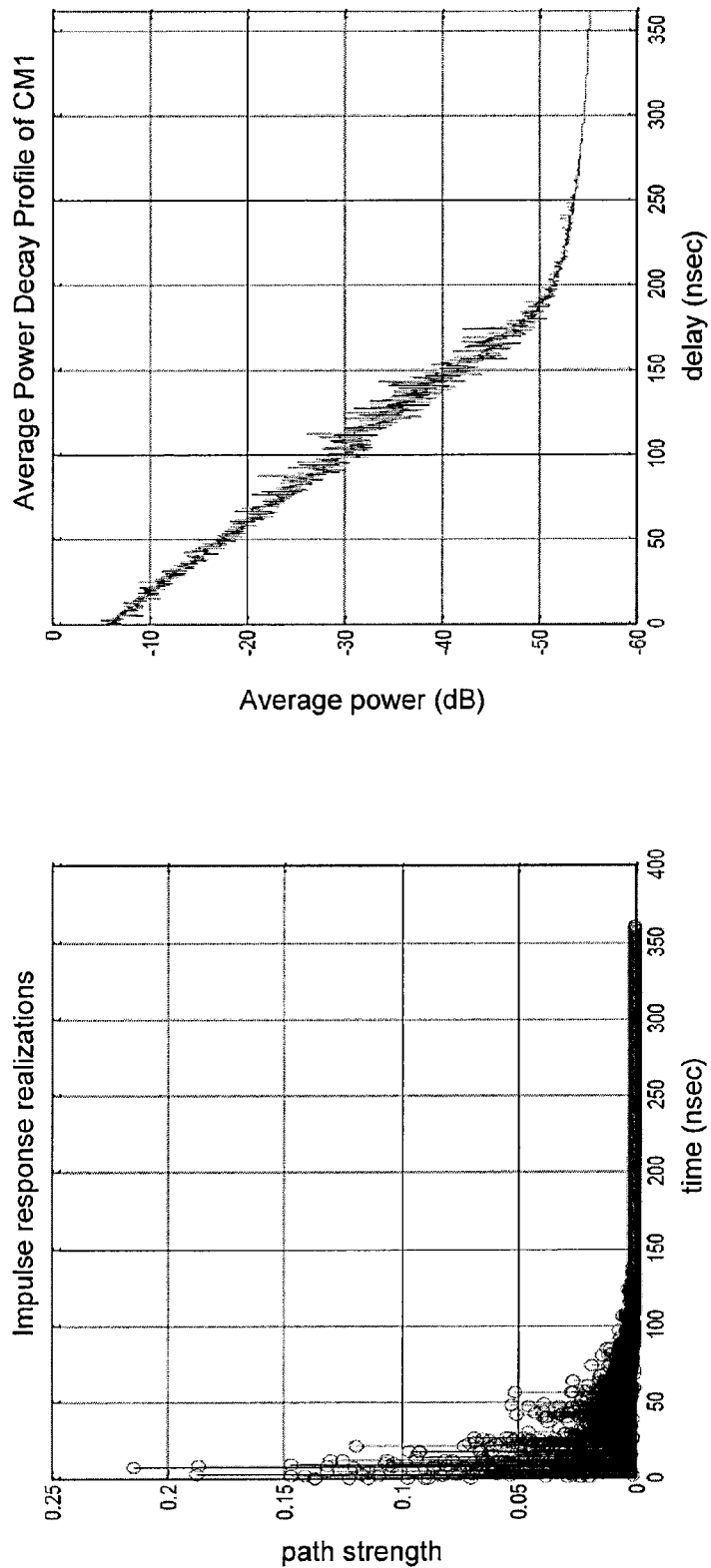
Figure 8 The impulse response and the power delay profile of CMI

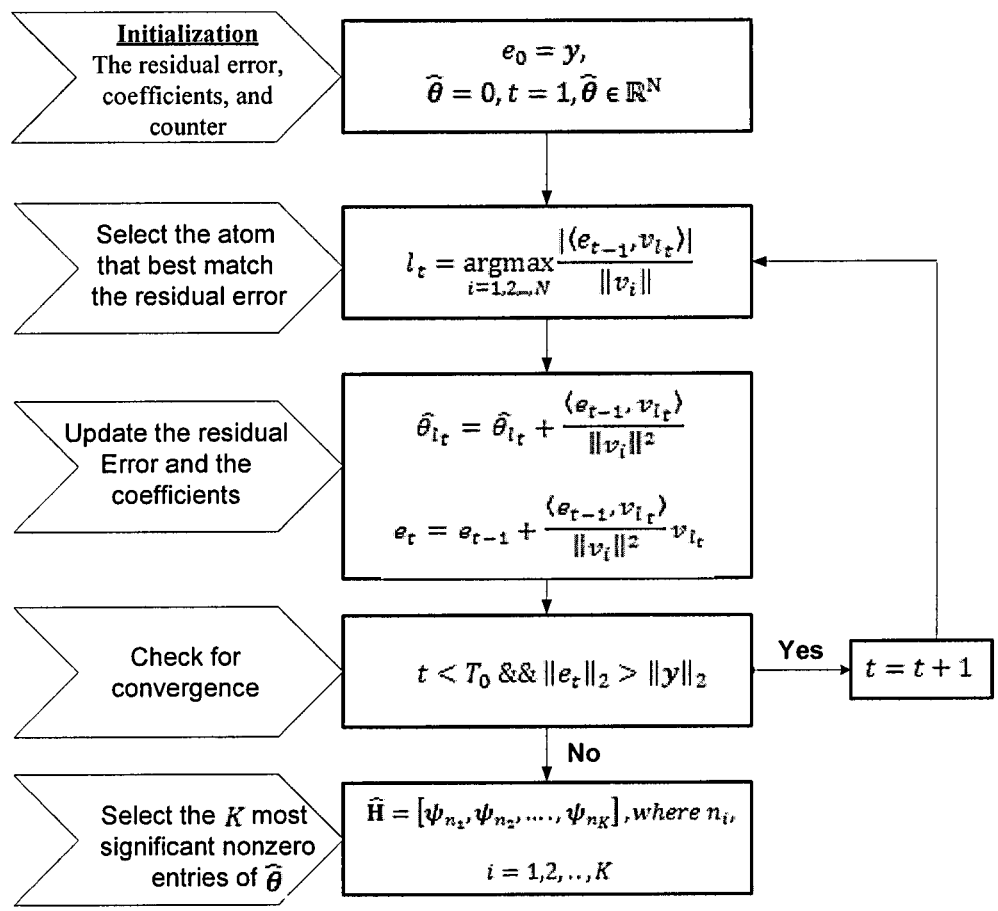
Figure 9 Matching Pursuit for signal structure estimation

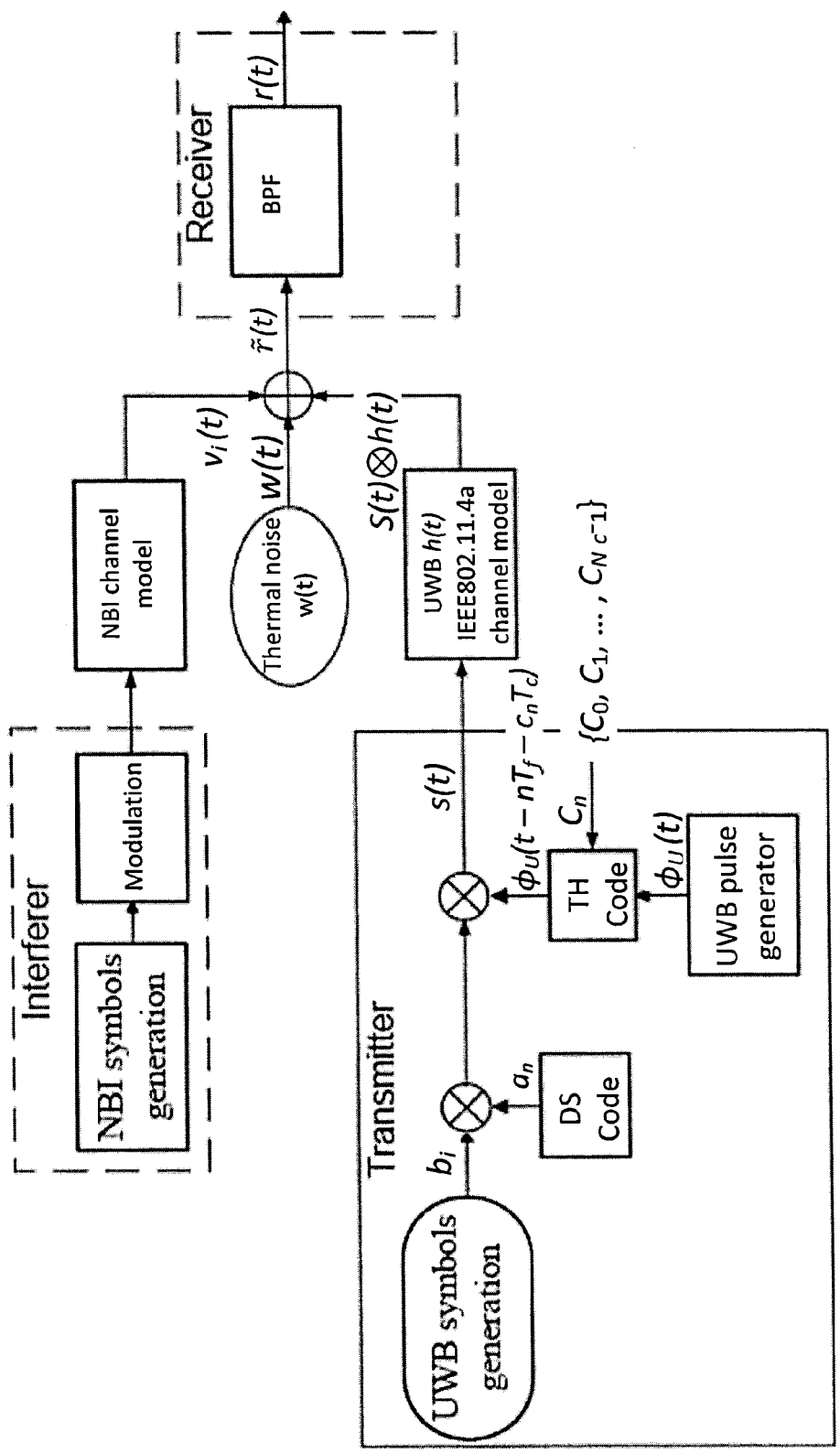
Figure 10 Block diagram for the I-UWB system

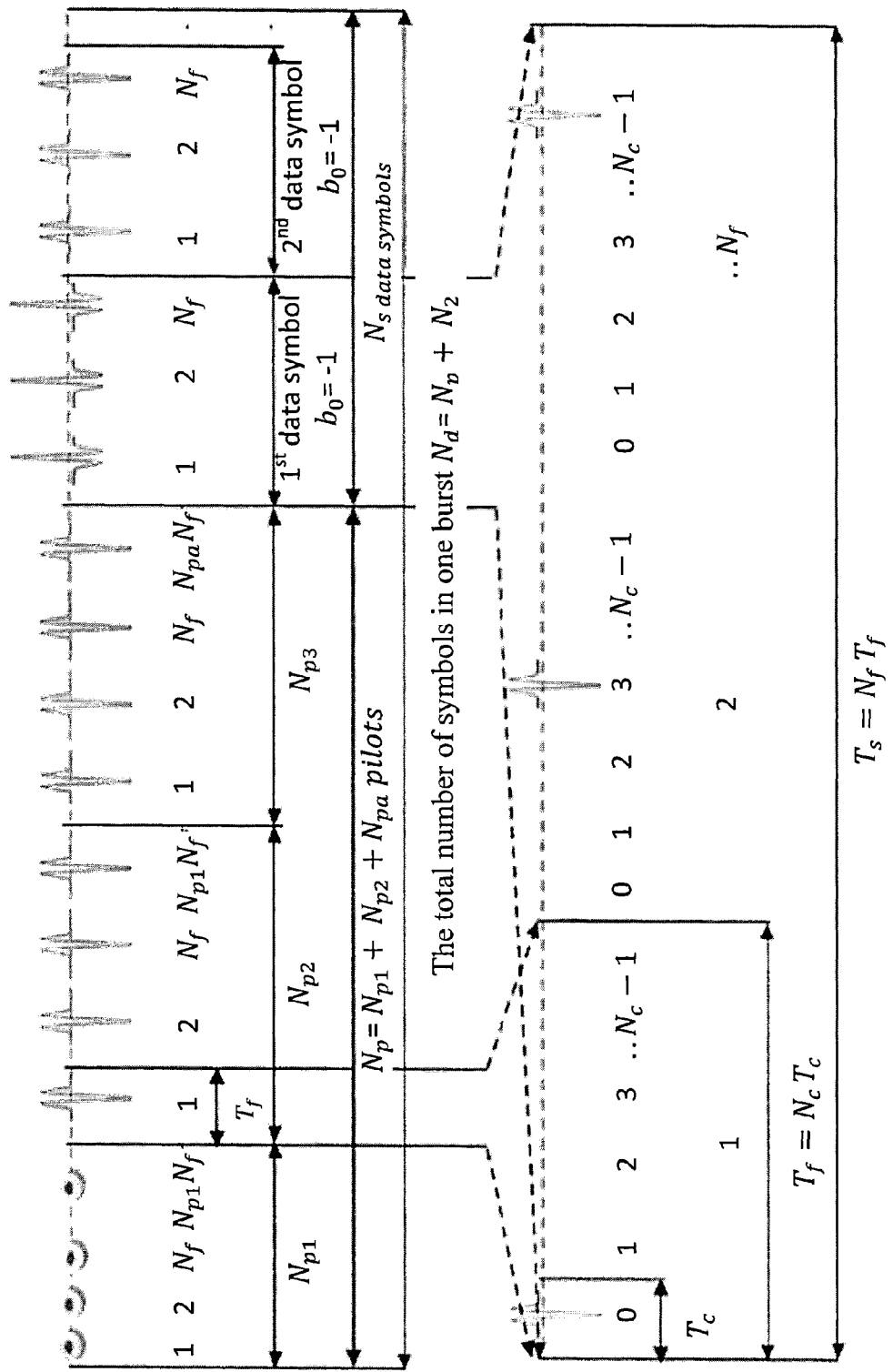
Figure 11 Implemented I-UWB signaling scheme

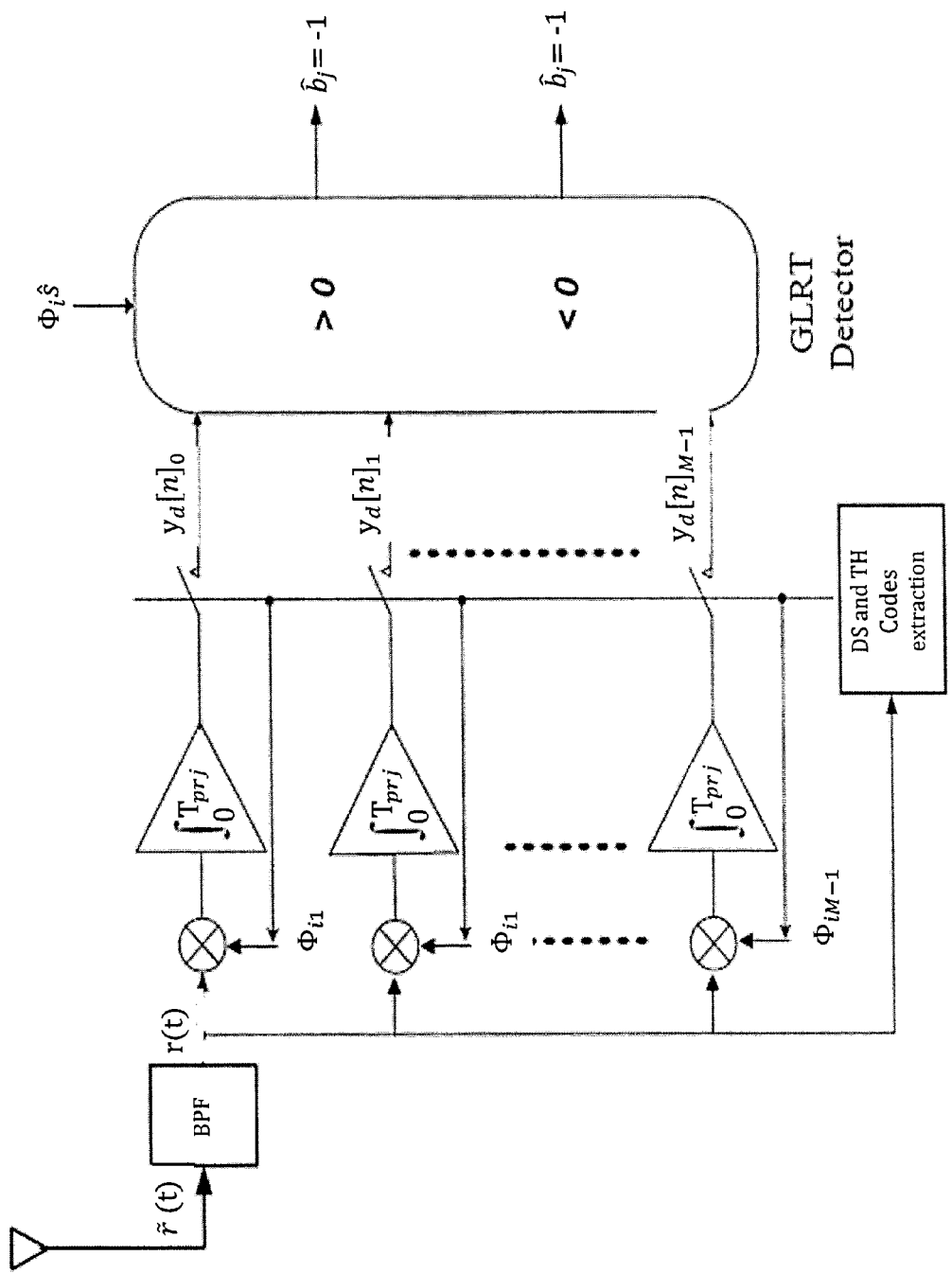
Figure 12 I-UWB receiver with GLRT detector

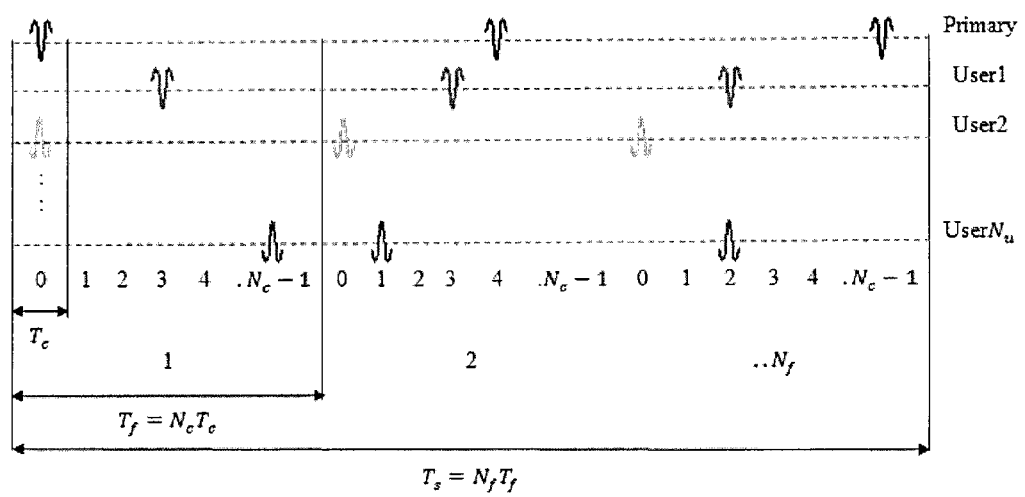
Figure 13 Distribution of pulses transmitted over time - Frames and chips are synchronized for all users

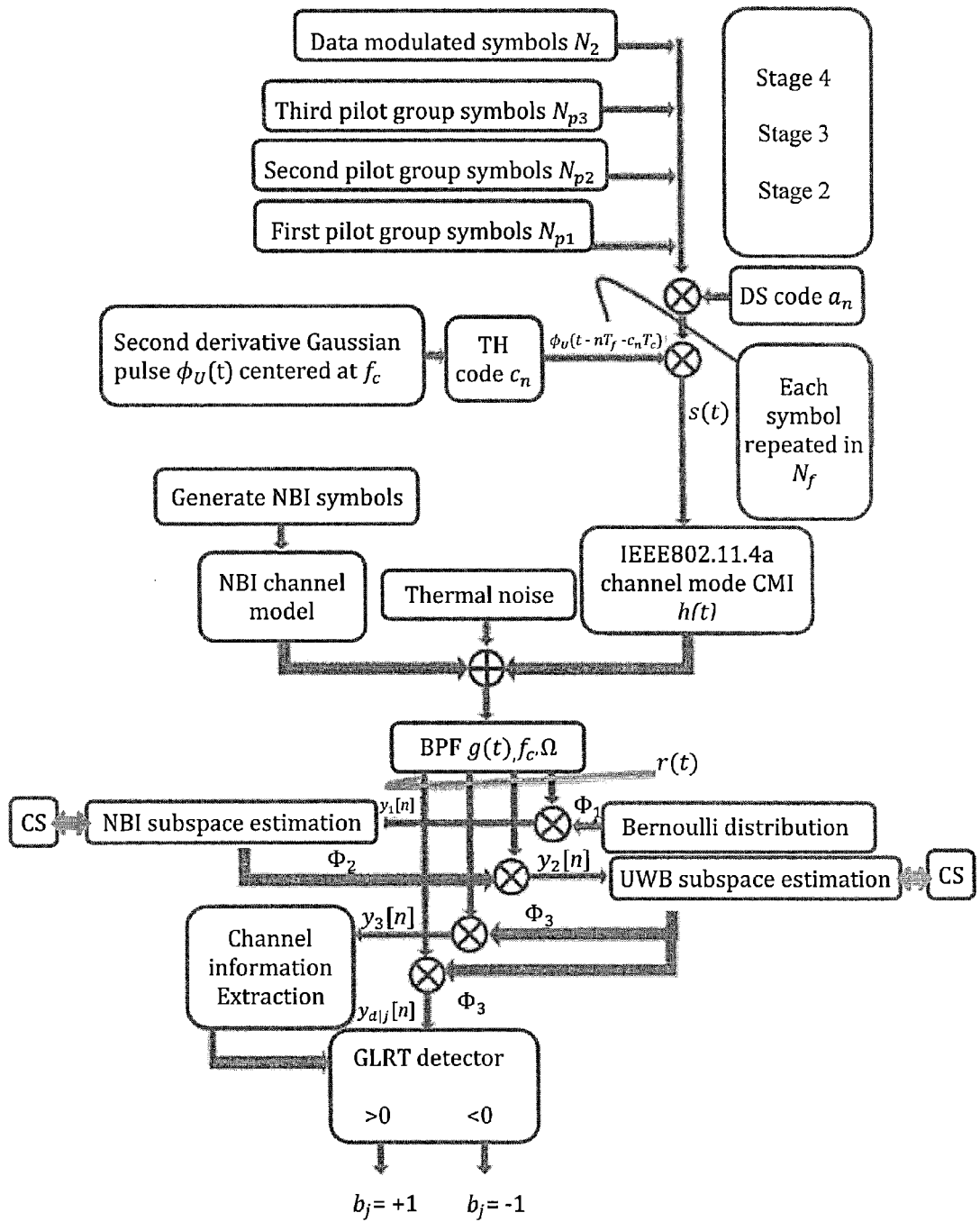
Figure 14 Flowchart for the main steps of the UWB system with training

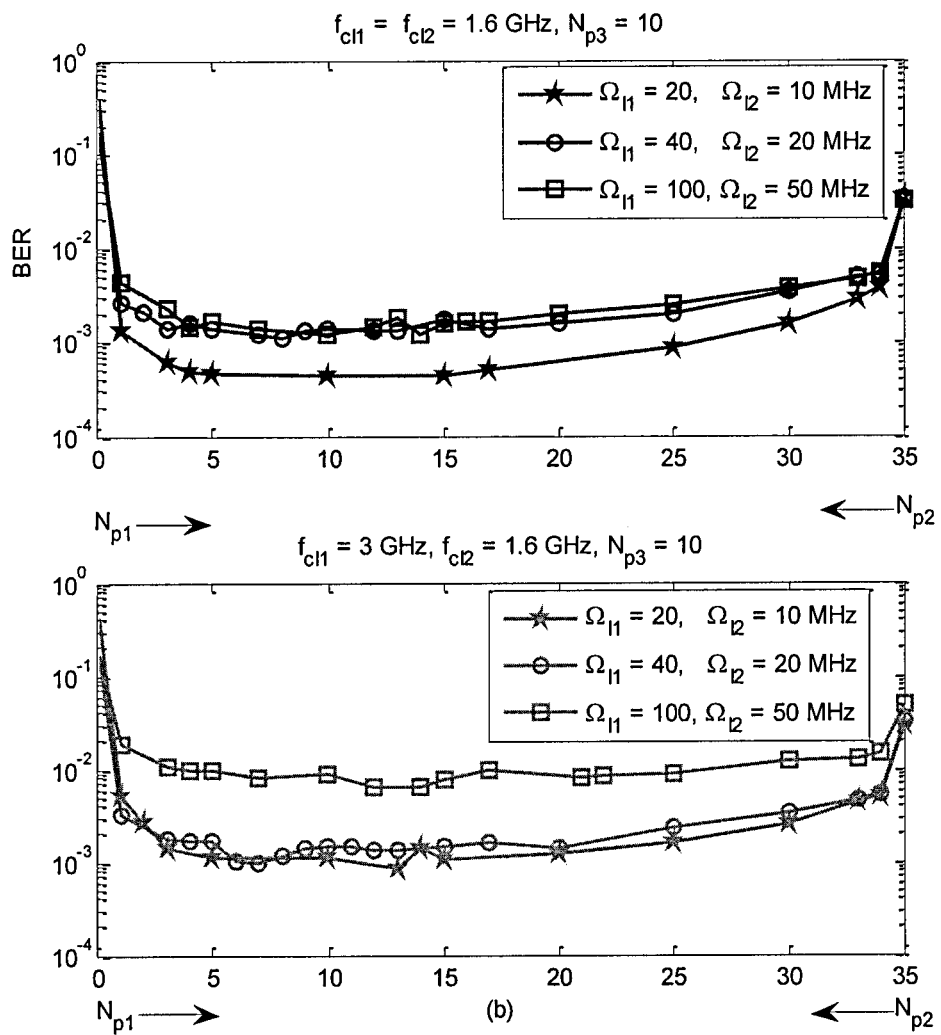
Figure 15 The BER as a function of *Np1* and *Np2*

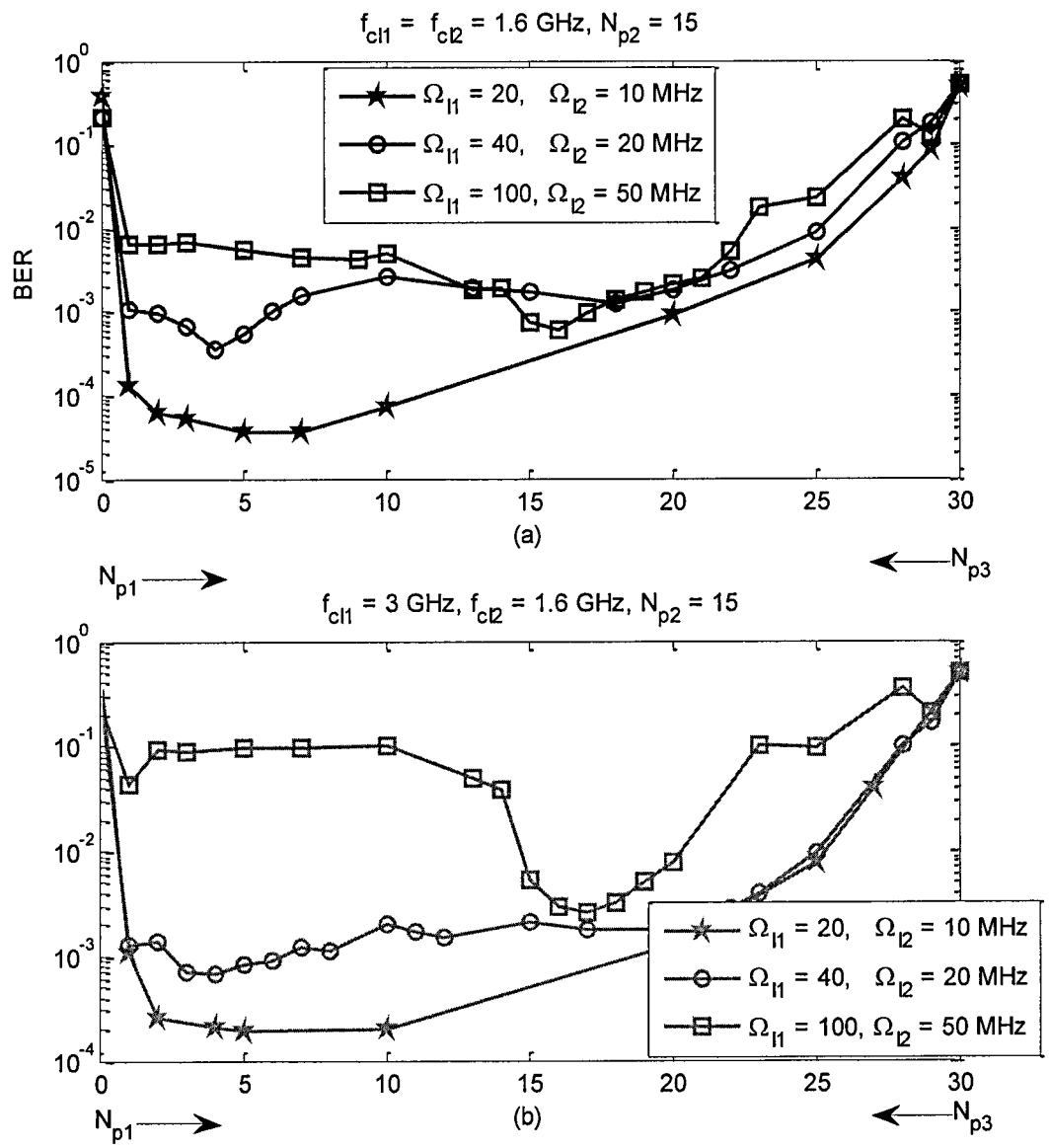
Figure 16 The BER as a function of *Np1* and *Np3*

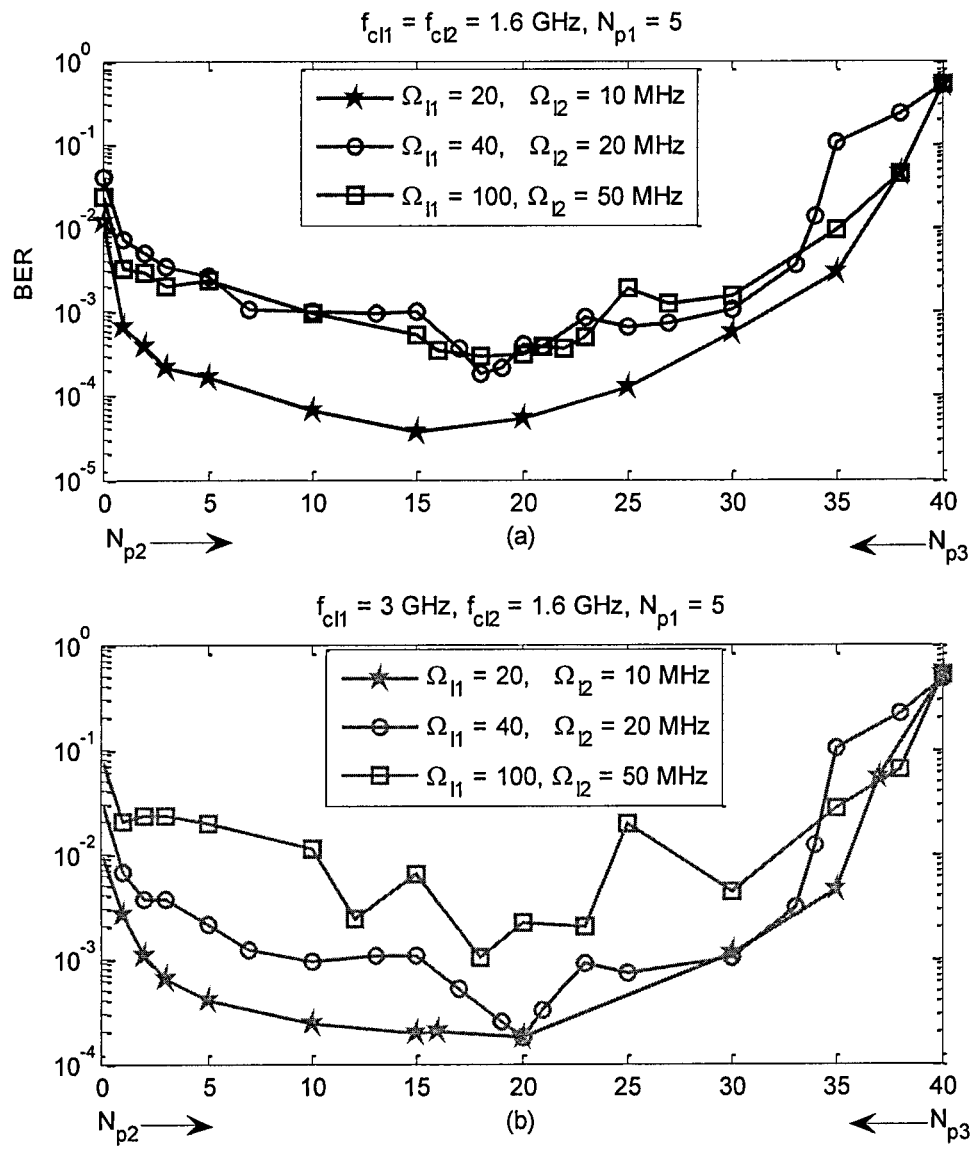
Figure 17 The BER as a function of $Np2$ and $Np3$

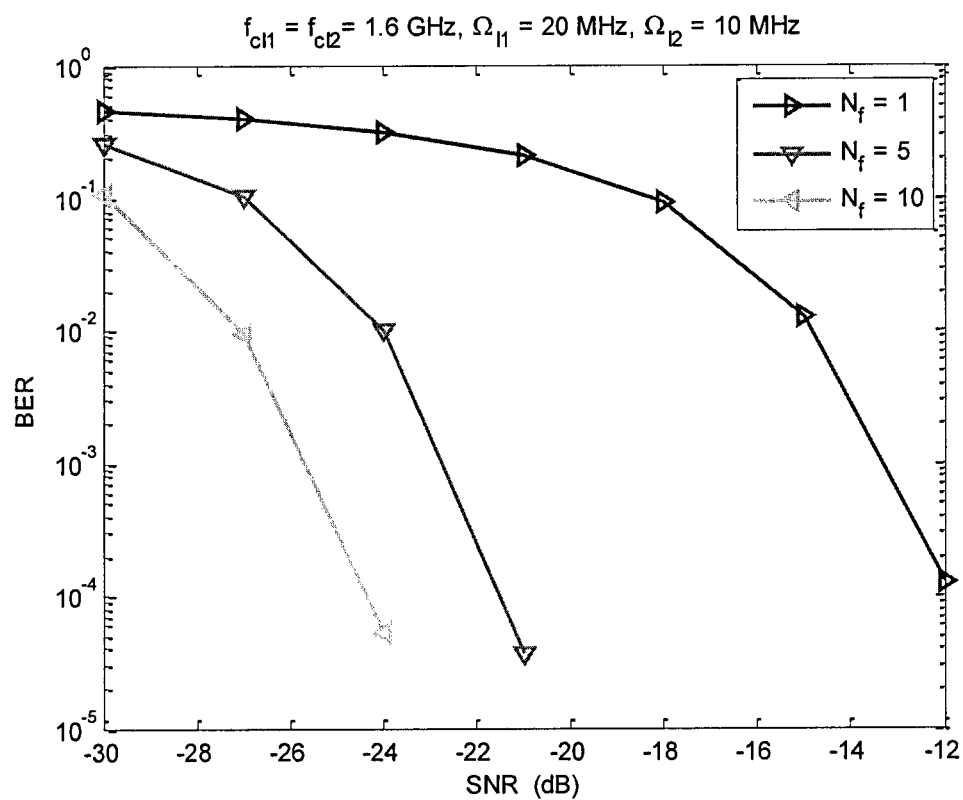
Figure 18 BER with different frame number

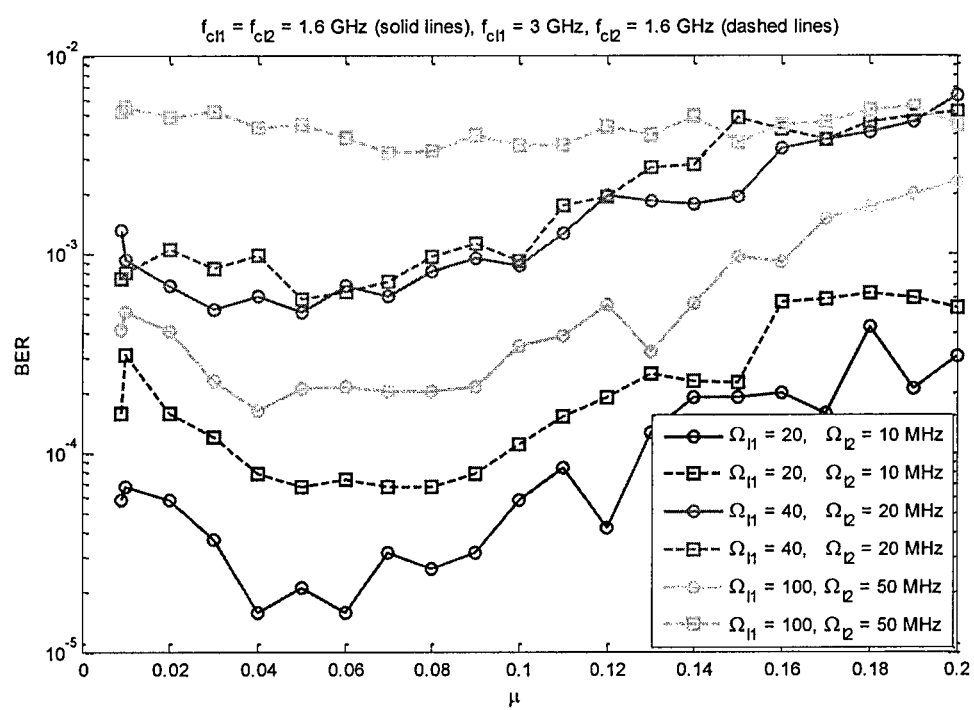
Figure 19 The BER as a function of the interference threshold

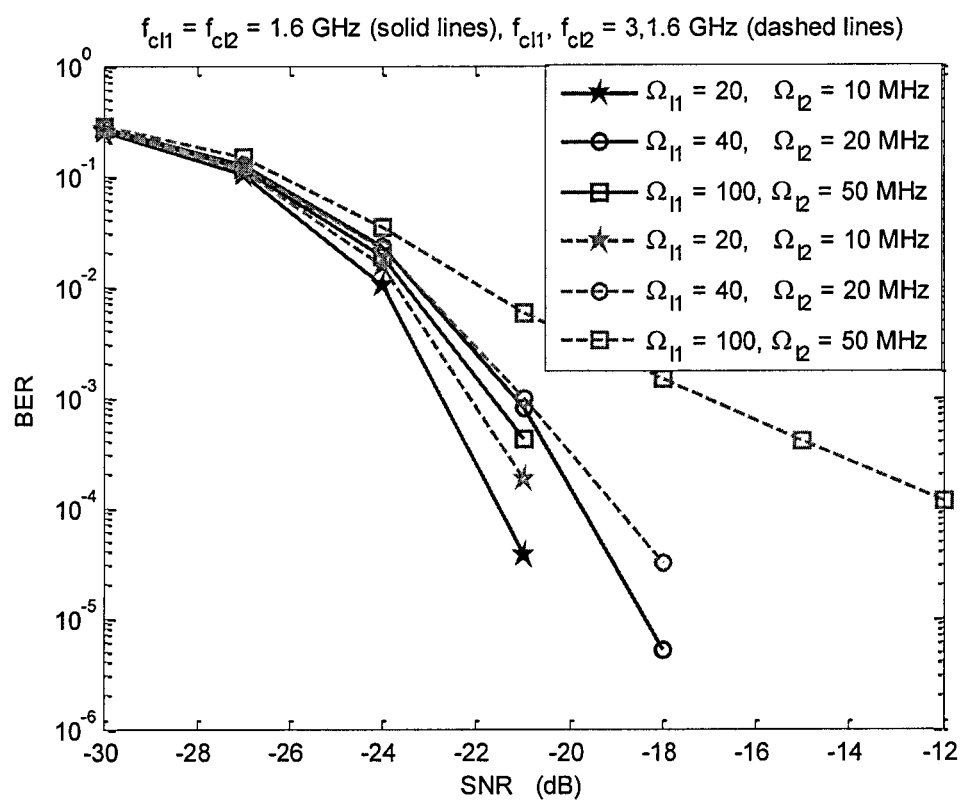
Figure 20 System performance for different NBI

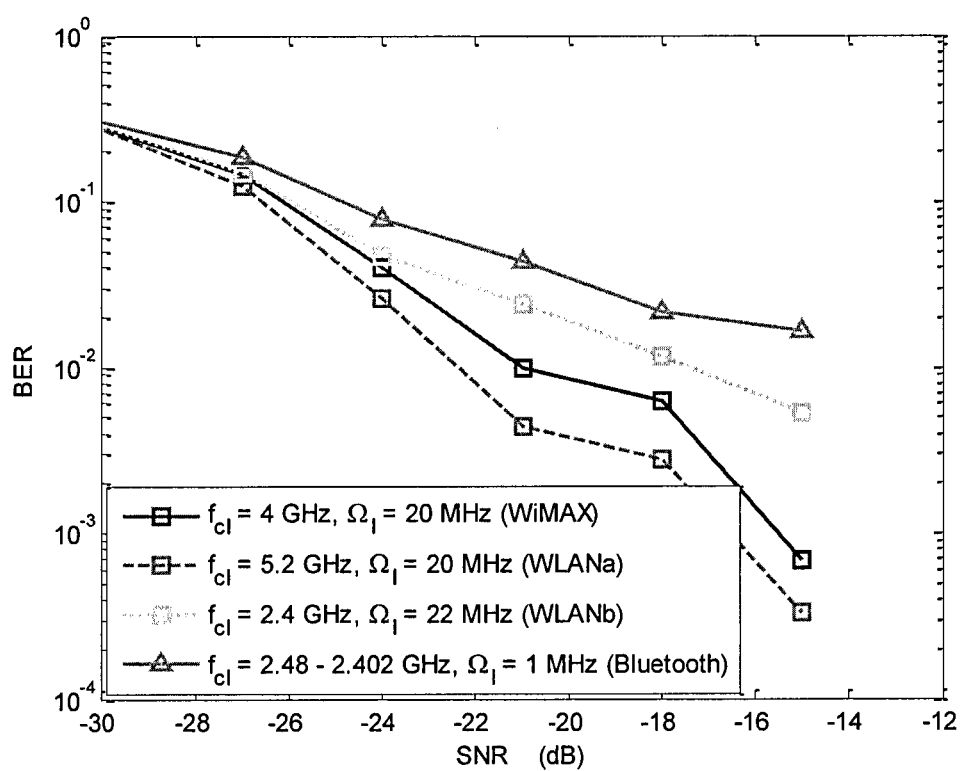
Figure 21 The performance for licensed NBIs

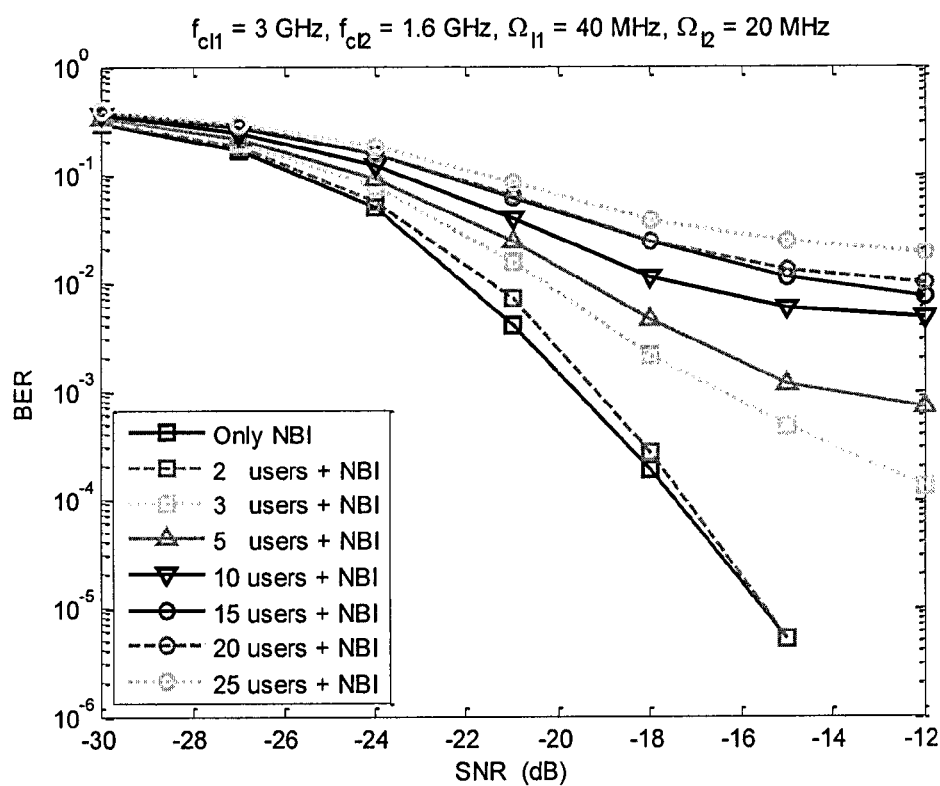
Figure 22 System performance when 0, 2, 3, 5, 10, 15, 20 and 25 users are active

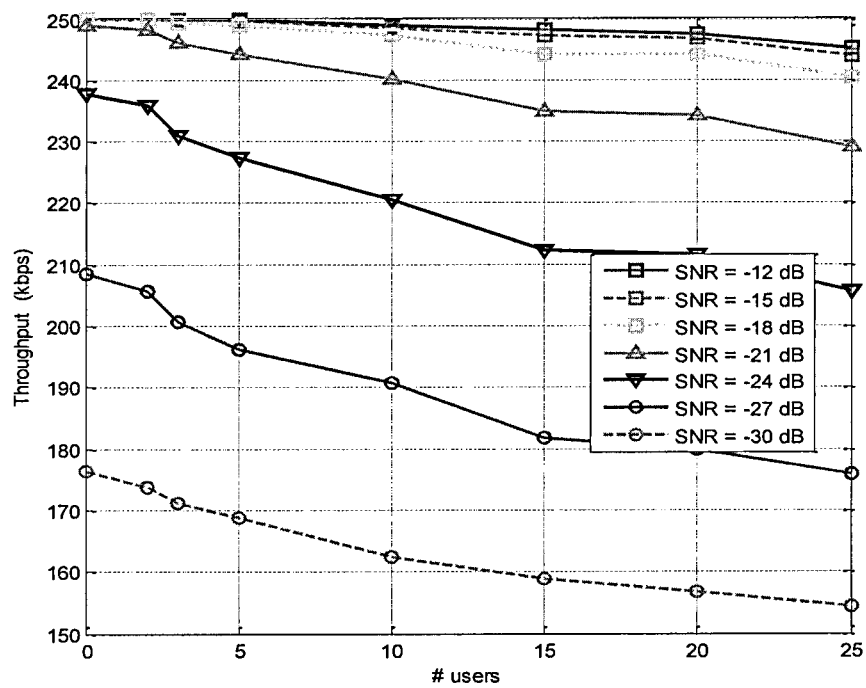
Figure 23 Throughput of DS-TH coding for different number of interfering users

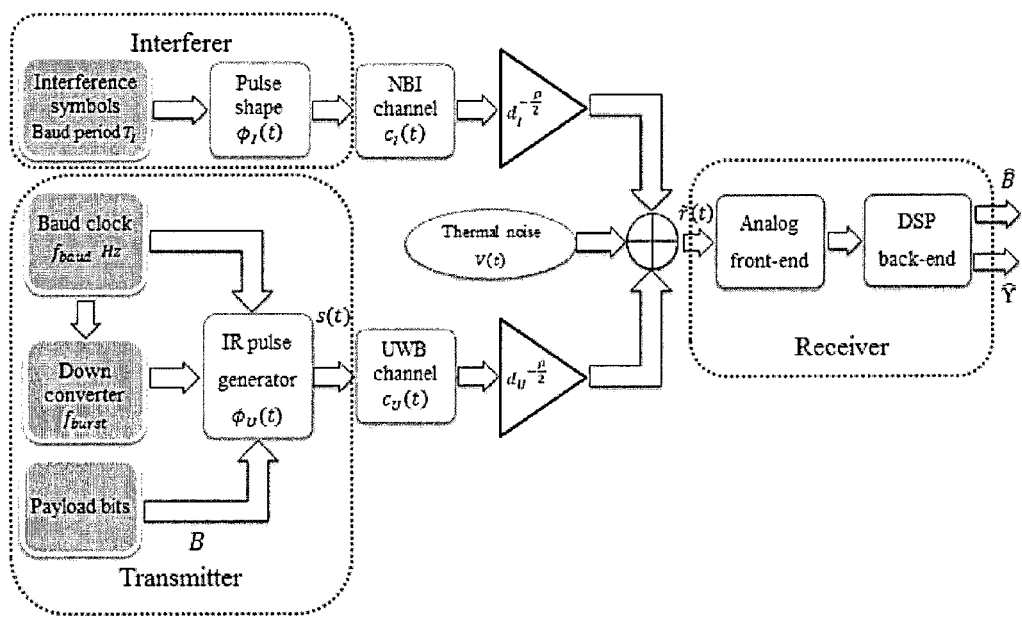
Figure 24 Signal paths taken by the UWB-IR and the NBI signals

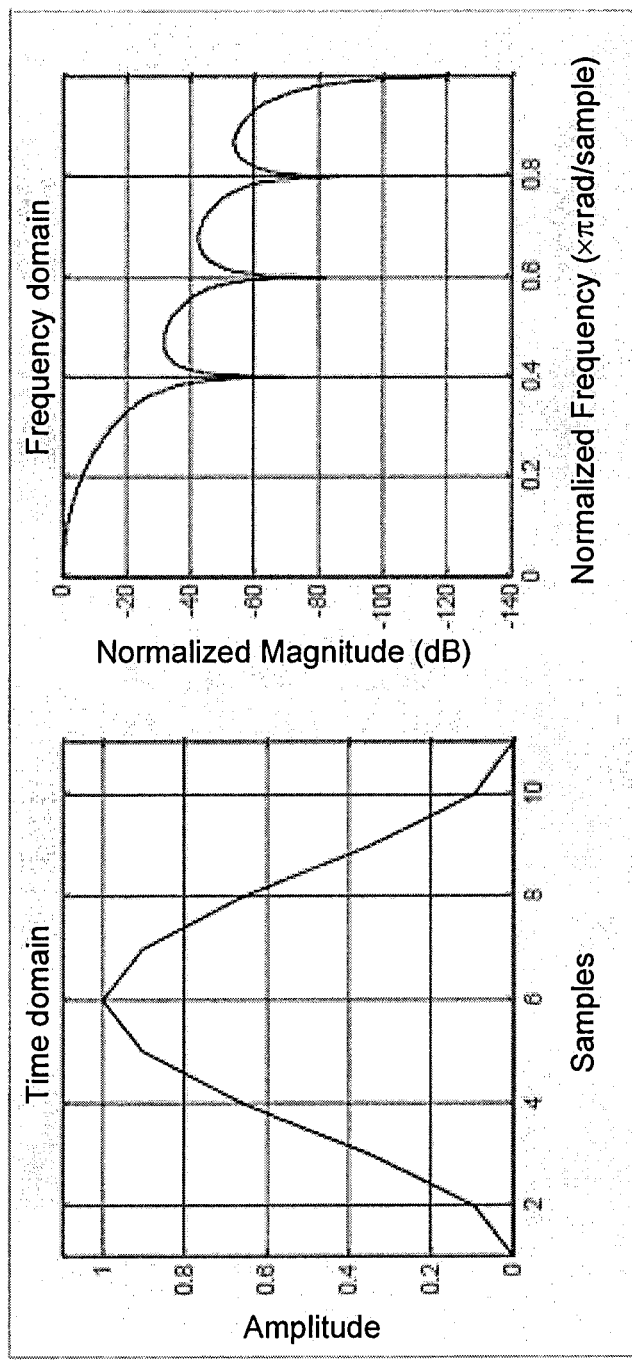
Figure 25 Hanning window in time and frequency domain

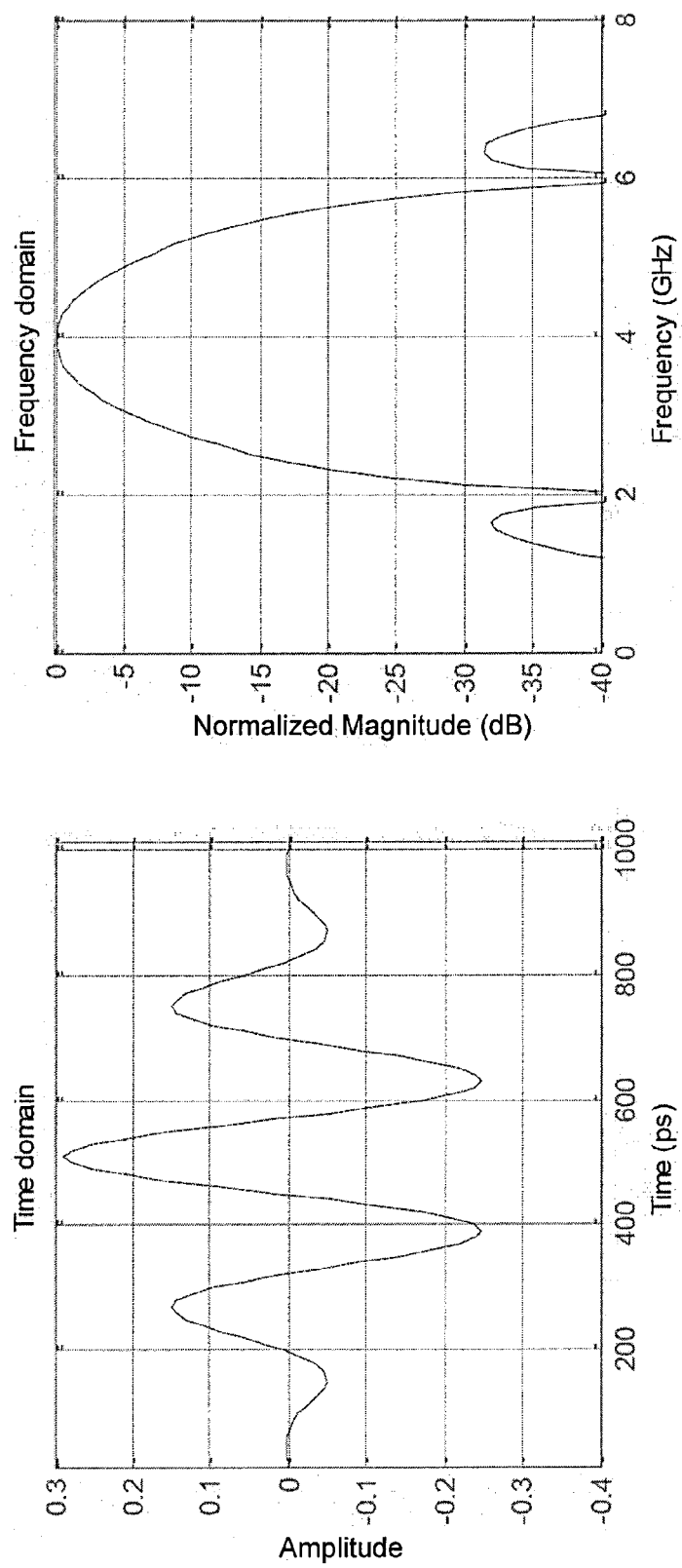
Figure 26 Hanning modulated pulse and its power spectrum

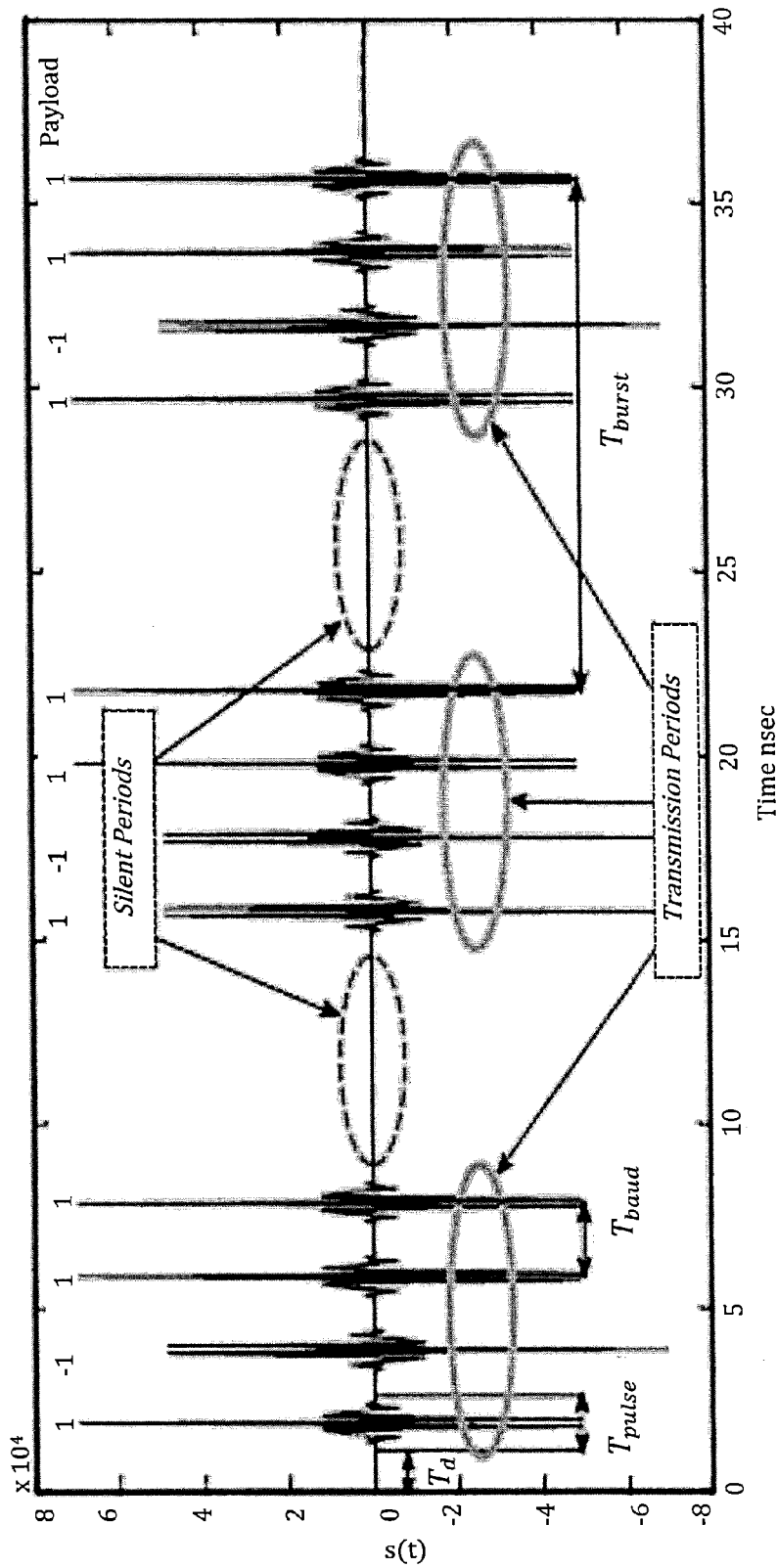
Figure 27 Frame format for the bursty data transmission

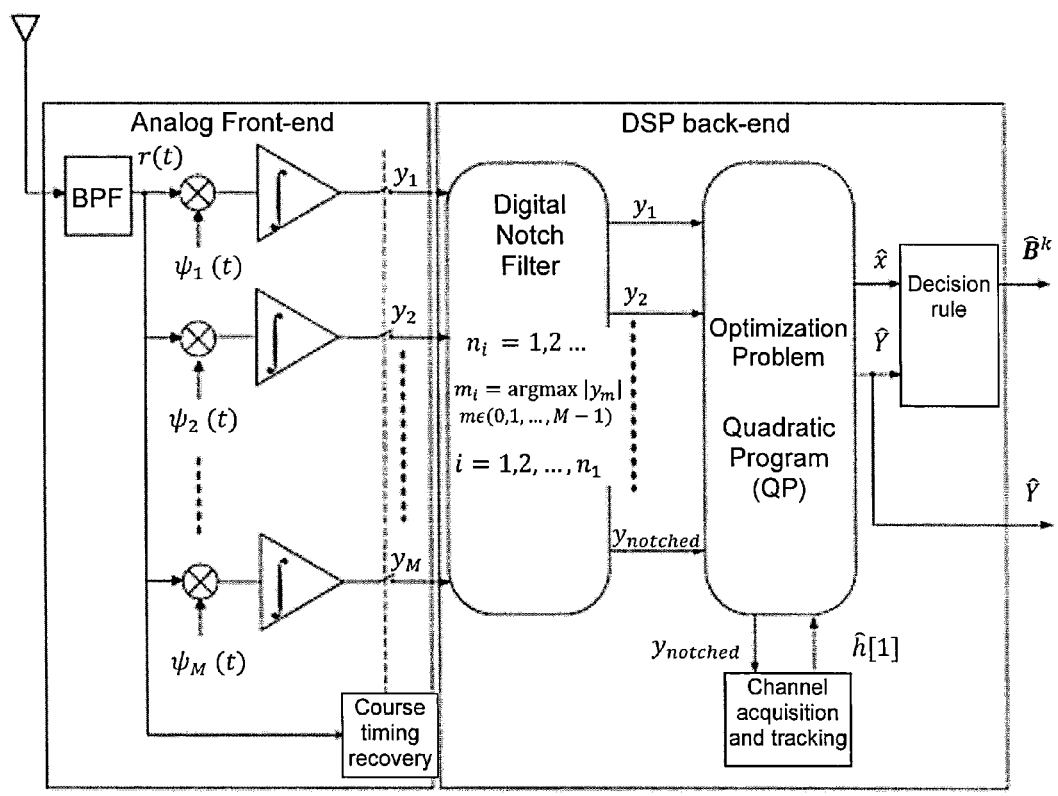
Figure 28 Correlator receiver with digital notch filter

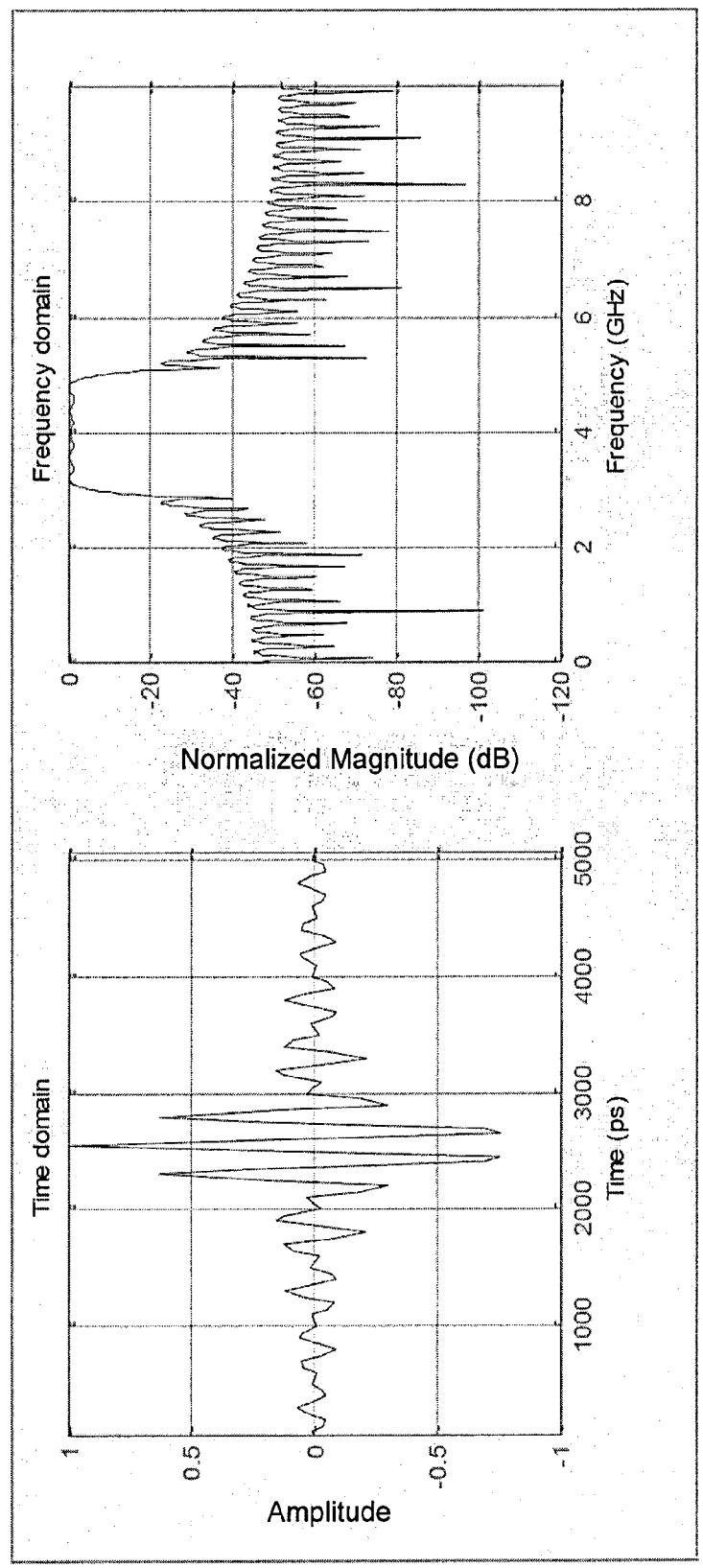
Figure 29 Time and frequency domain representations of the BPF

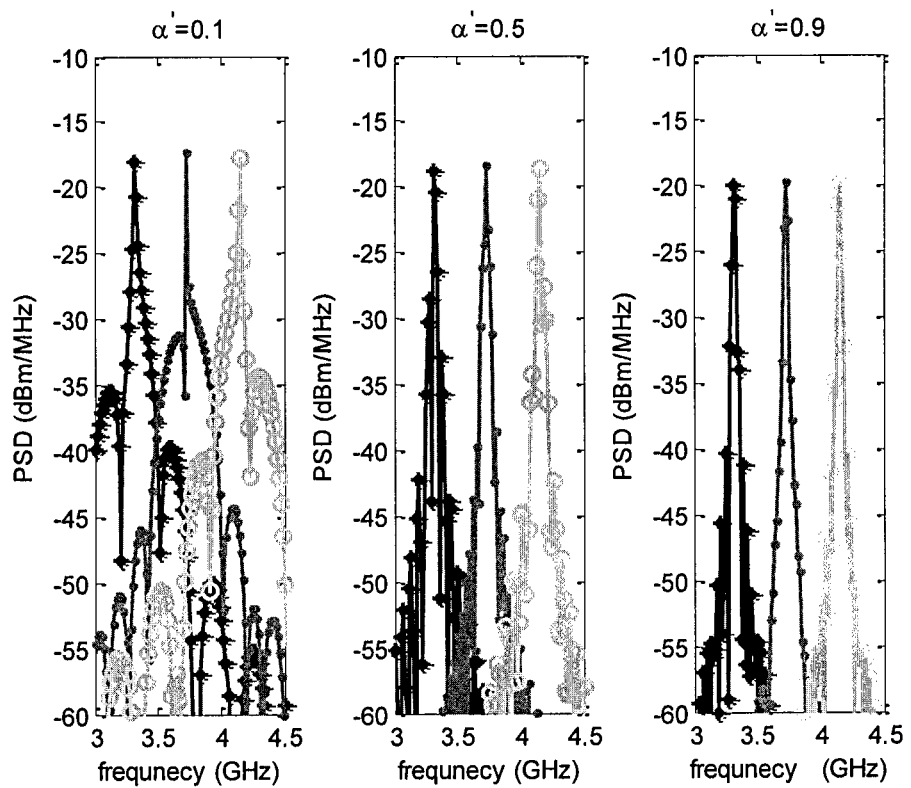
Figure 30 Frequency domain for different test functions selected randomly

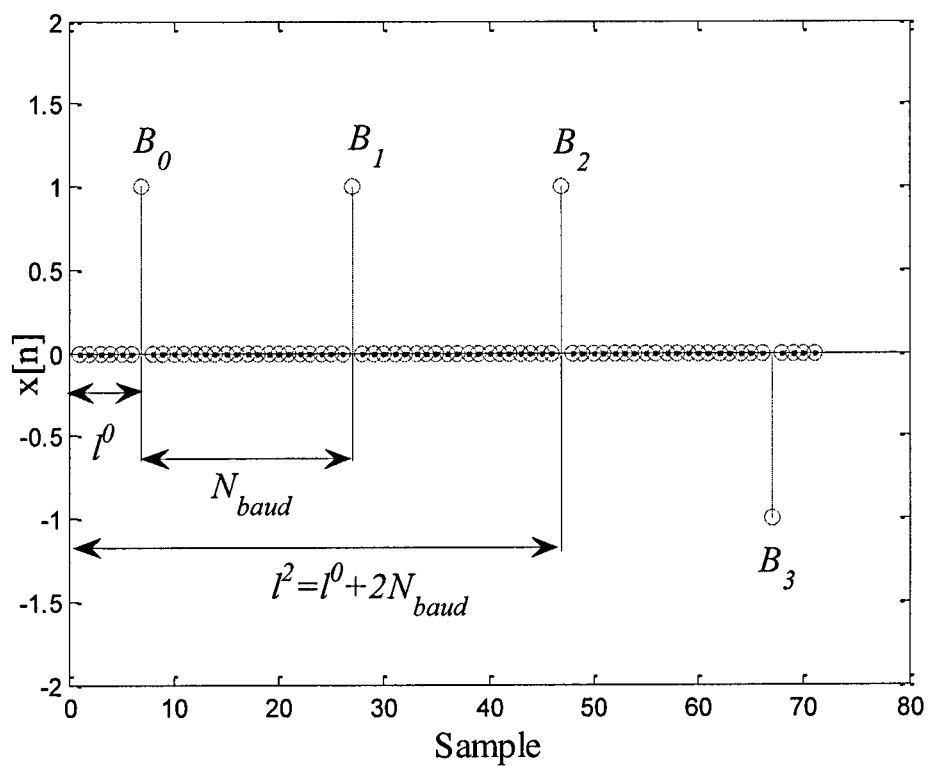
Figure 31 The location of the k$^{th}$ nonzero samples

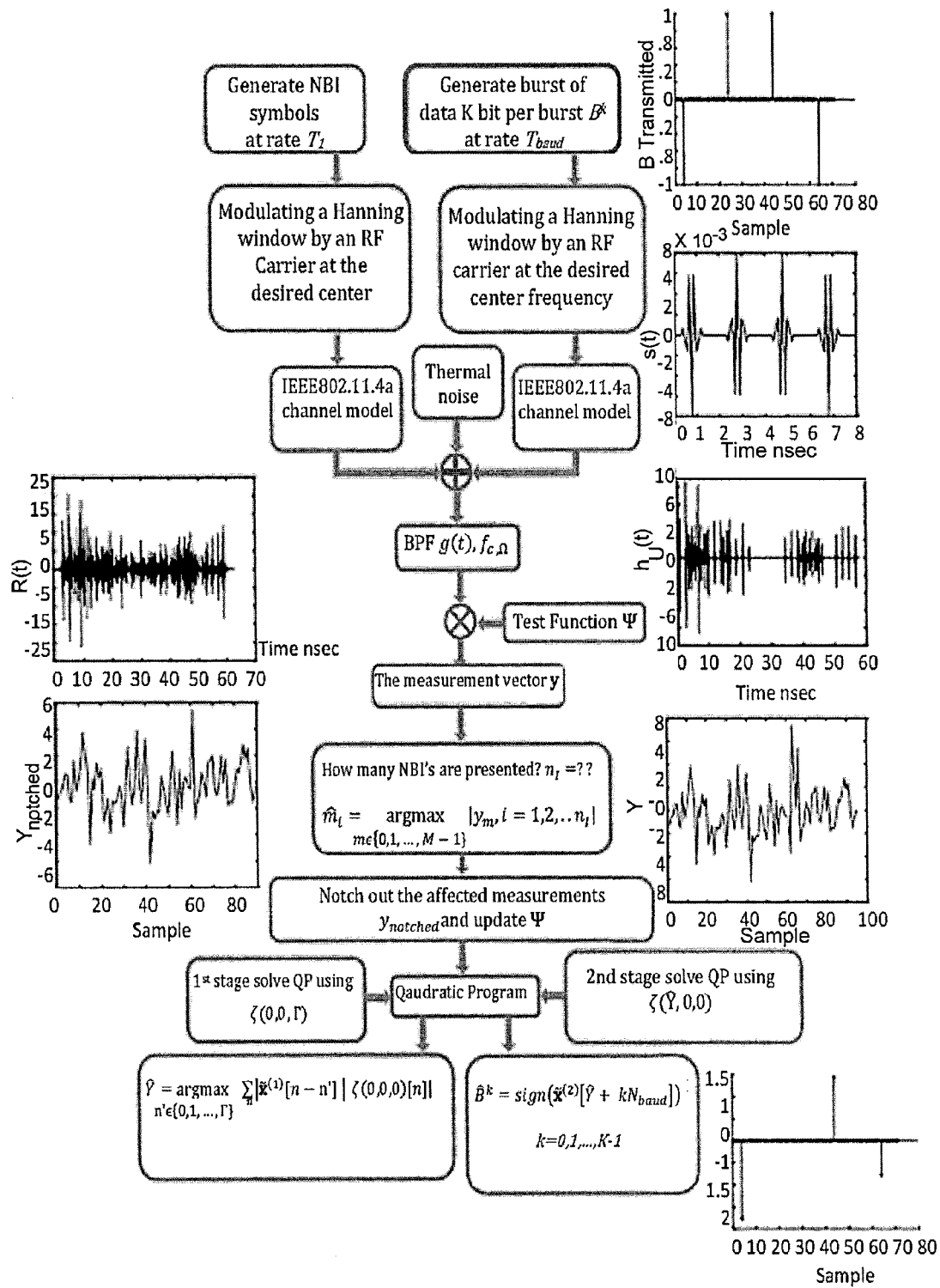
Figure 32 Flow chart for the main steps of the blind system

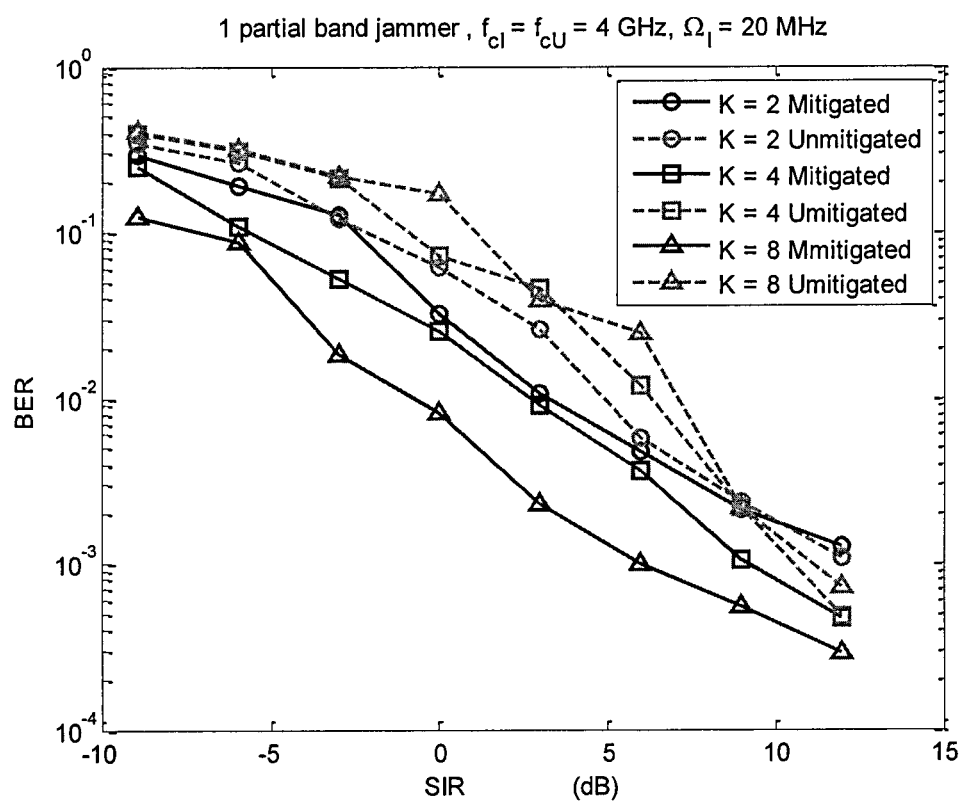
Figure 33 Performance of a partial band interferer for different burst size

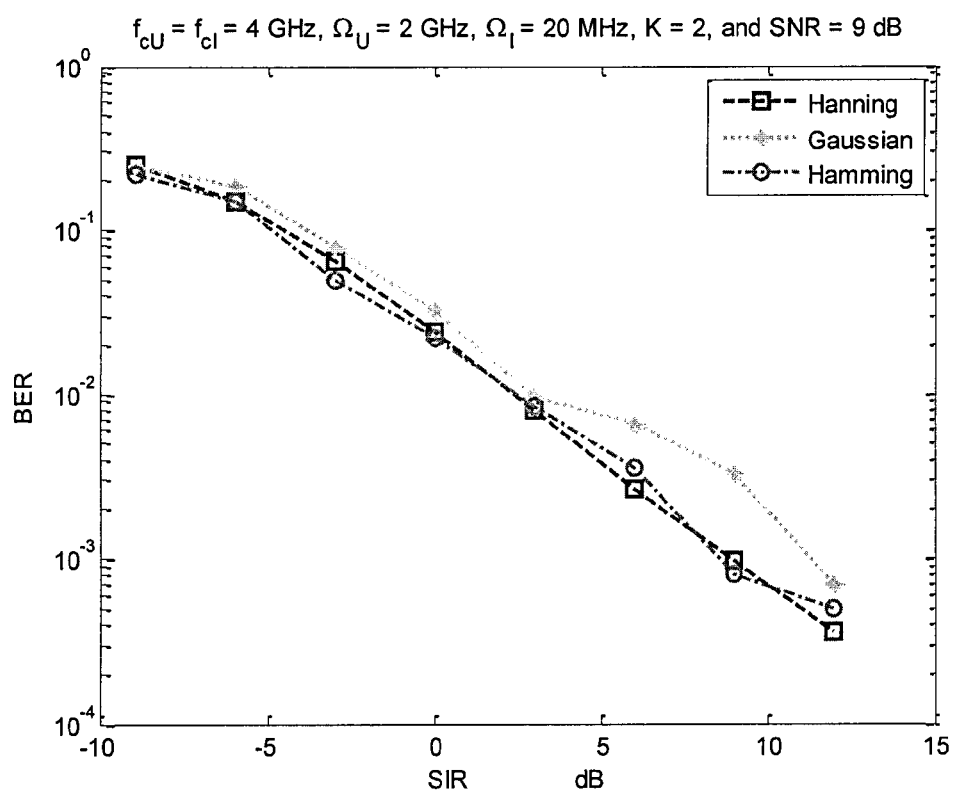
Figure 34 Performance for different UWB modulated pulses jammed by a partial band interferer

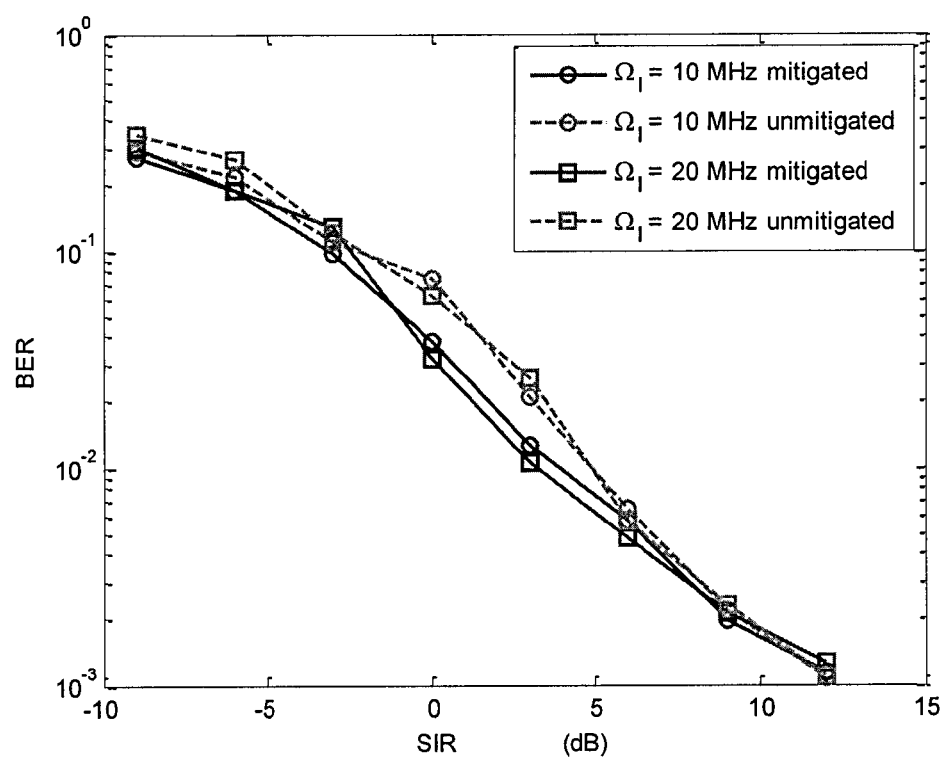
Figure 35 Performance of a partial band interferer with different bandwidth

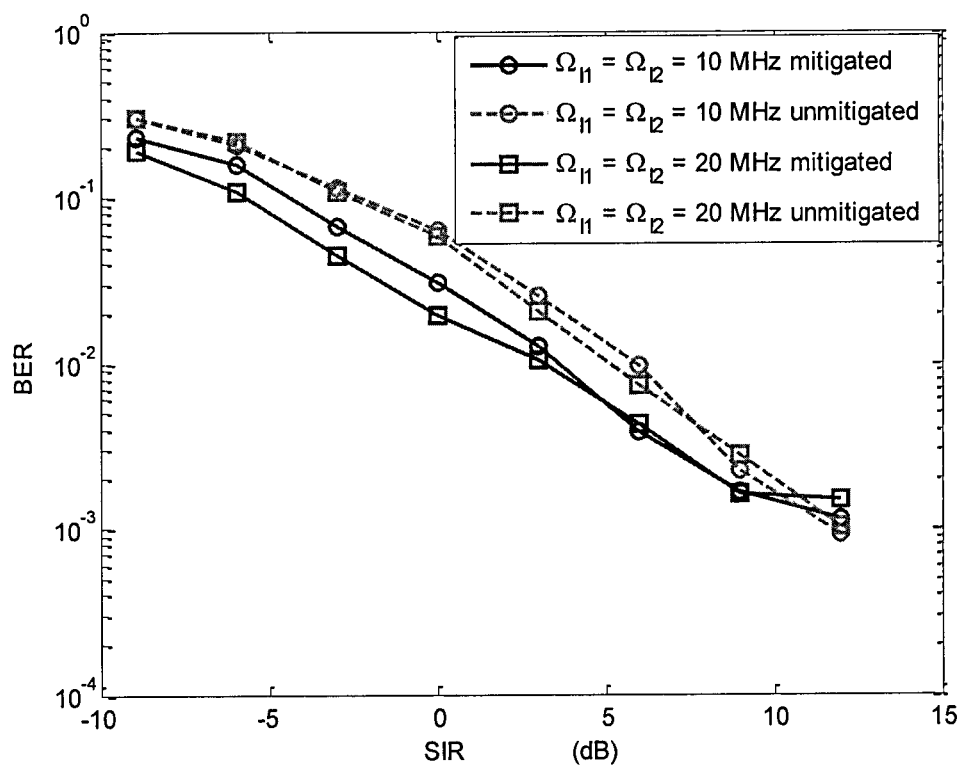
Figure 36 Performance of 2 partial bands interferer with different bandwidth

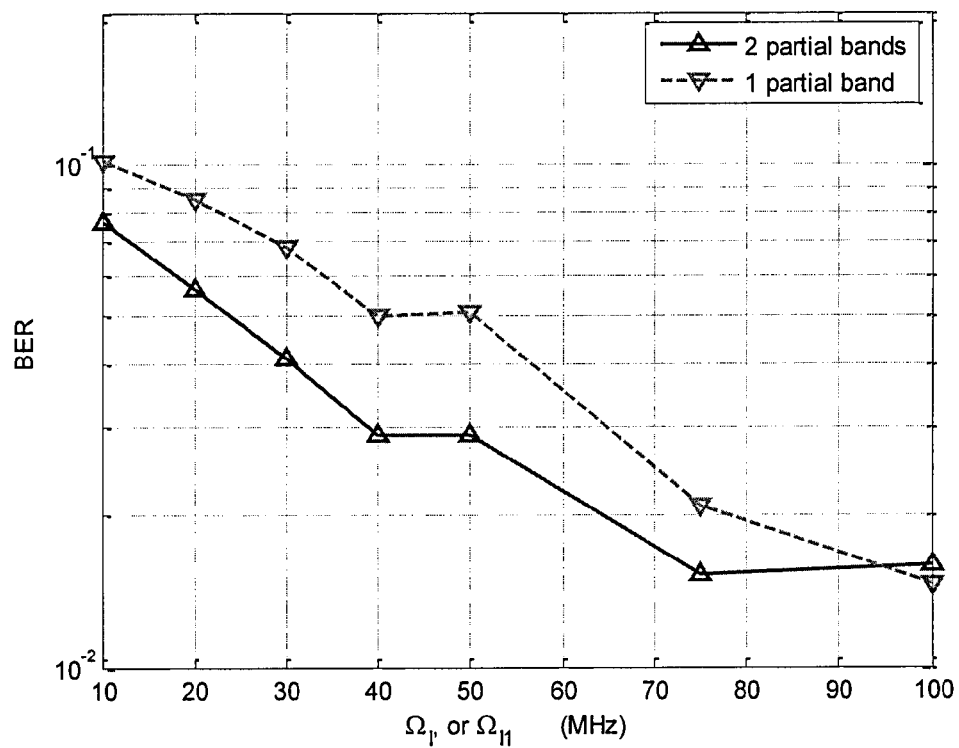
Figure 37 BER Performance as a function of the NBI's bandwidth

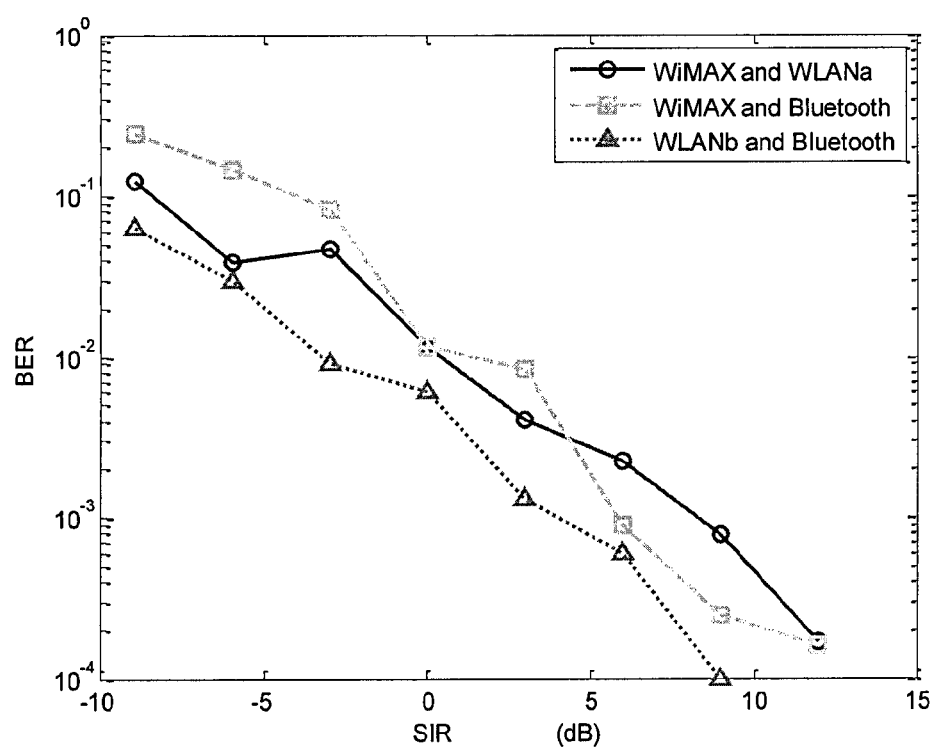
Figure 38 BER performance in the presence of licensed NBI's

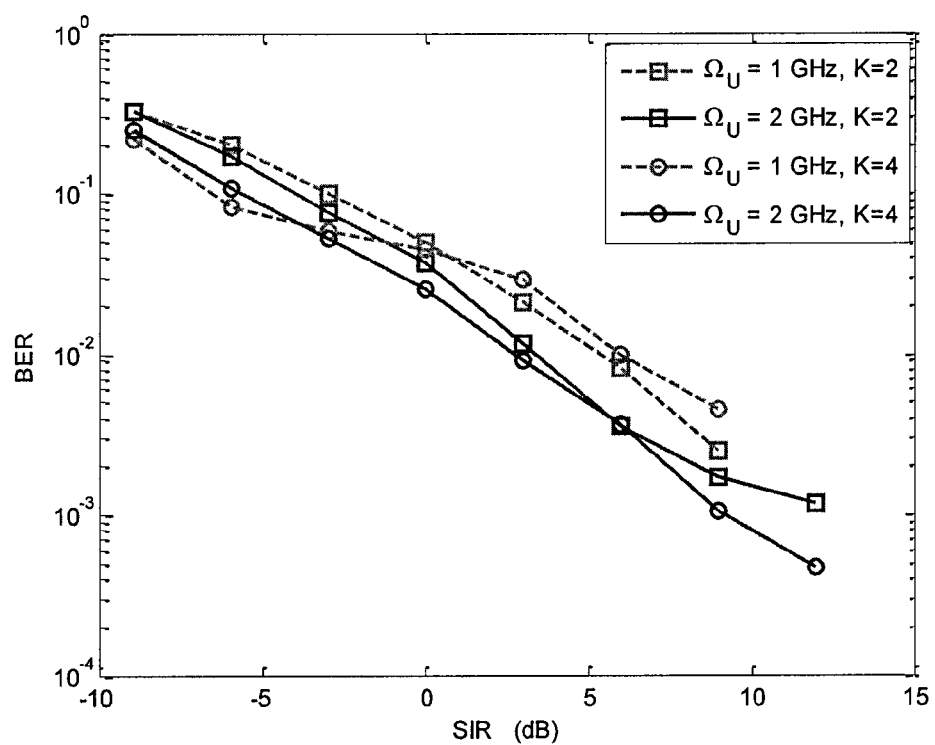
Figure 39 BER performance when changing the bandwidth of the UWB modulated pulse

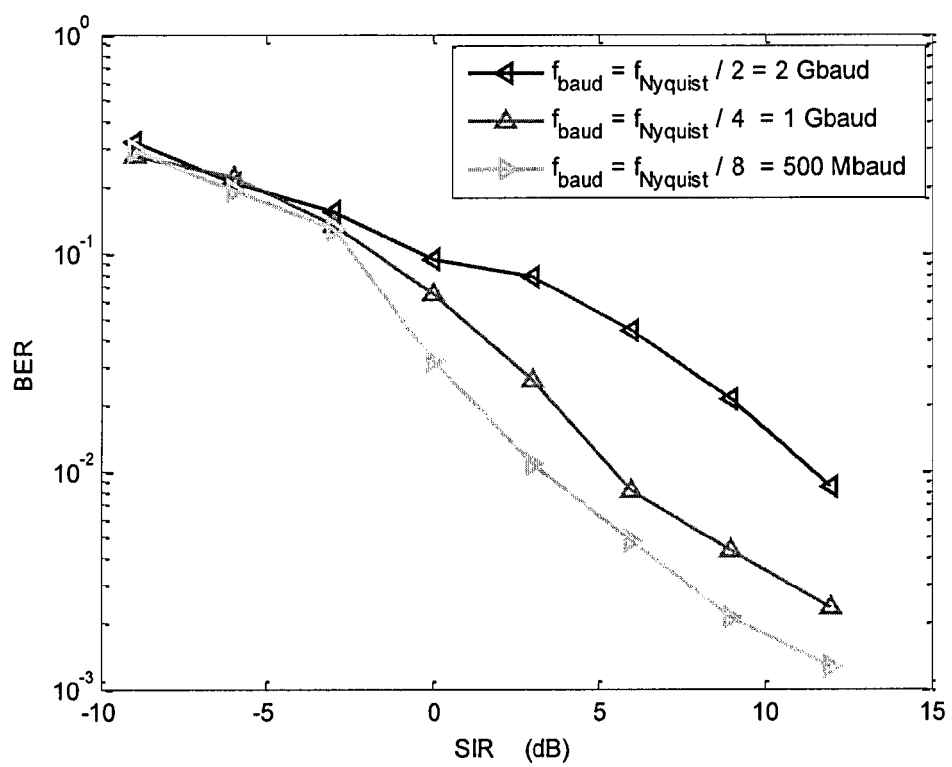
Figure 40 BER performance for one partial band interferer with different baud rate

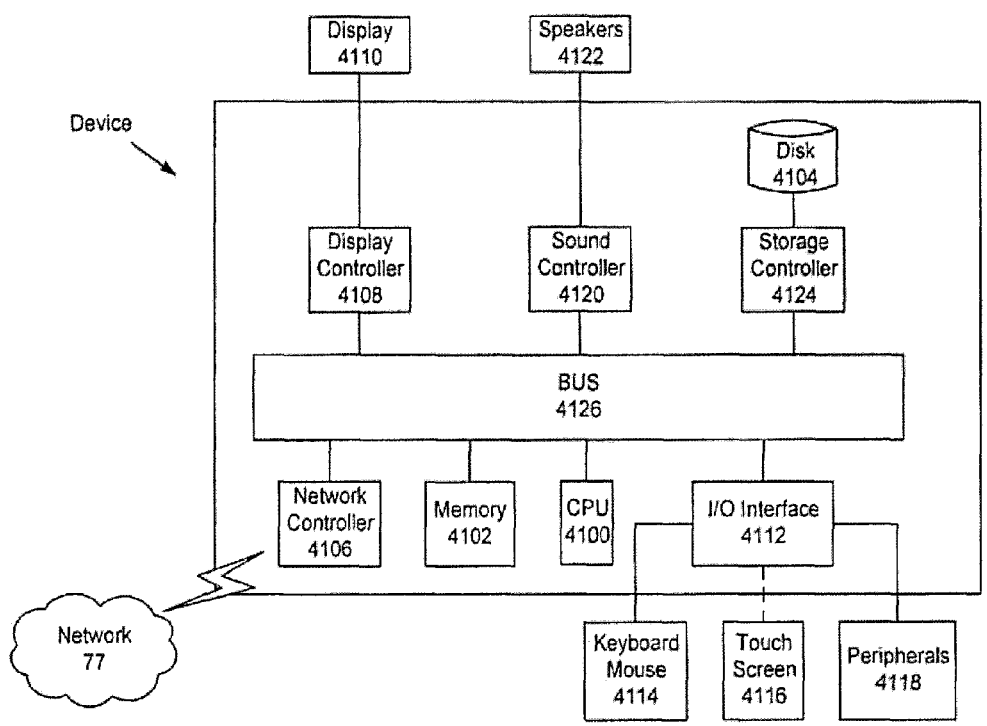
Figure 41 A computer system upon which an embodiment of the present invention may be implemented

EVALUATION OF COMPRESSED SENSING IN UWB SYSTEMS WITH NBI

BACKGROUND

1. Field of the Invention

The present disclosure relates to a method of compressed sensing in ultra wide band systems with narrow band interference.

2. Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Ultra Wide-Band (UWB) technology is a promising a cutting edge technology in delivering high data rate for short range wireless communication systems. It is suitable for applications which need low power such as multi-hop wireless networks. Recently, UWB technology became a good candidate for short-range indoor high-resolution positioning systems. UWB signals have the ability to trade bandwidth for a reduced transmission power. This can be achieved by sending a very short pulse duration which means very large bandwidth. UWB signals include not only carrier-less base-band signals, such as Impulse Radio (IR) or non-sinusoidal pulses, but also wide-bandwidth signals with carriers, such as Multi-Band Orthogonal Frequency Division Multiplexing (MB-OFDM).

UWB radios are expected to be the next generation of transmission system that can support high data rate and power-constrained applications such as wireless sensor and body area networks. Because of their large bandwidth, two problems arise, namely the high speed analog-to-digital-conversion (ADC) required at the receiver side and the coexistence with other narrowband systems that share the same part of the spectrum. The two problems can be reduced using compressive sensing (CS). Narrowband interference (NBI) sources can be licensed or unlicensed signals with different center frequencies and different bandwidths.

Because of their large bandwidth, UWB signals may encounter some problems especially with high sampling rate required at the receiver side. Reducing the complexity of UWB receiver is an important issue. Moreover, coherence existence with other narrowband systems is a major concern which needs to be addressed through a proper mechanism. CS is a promising signal processing solution which can reduce the sampling requirements as well as avoid the interference with narrowband systems.

Narrowband Interference (NBI) signals may have two scenarios. One of them is overlaying the UWB spectrum over a licensed narrowband signal. The other is the intentional jamming where someone share part of the UWB spectrum in order to disturb the existence transmission. See T. H. Stitz, T. Ihalainen, M. Renfors, "Mitigation of Narrowband Interference in Filter Bank Based Multicarrier Systems," in *IEEE Communications Society*, Vol. 7, pp. 3241-3246, 2006, incorporated herein by reference in its entirety. Because of the power constraint of UWB signals, the mitigation of the NBI over UWB system is a challenging task. Although, both narrowband and UWB systems may affect each other, the interest is on mitigation of the NBI effect on UWB systems. When the narrowband signals are very strong, they will interfere with UWB signal and may degrade the system performance. See F. Dowla F. Nekoogar, and A. Spiridon, "Interference Mitigation in Transmitted-Reference Ultra-Wideband Receivers," in *IEEE Antennas and Propagation Society*, Vol. 4, pp. 1307-1310, June, 2004; H. Nikookar and R. Prasad, Introduction to Ultra Wideband for Wireless Communications, Springer, 2009; and C. Wang, M. Ma, R. Ying, and Y. Yang, "Narrowband Interference Mitigation in DSUWB Systems," in *IEEE Signal Processing*, Vol. 17 pp. 429-432, 2010, each incorporated herein by reference in their entirety.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

One aspect of the disclosure includes a method of mitigating narrow band interference (NBI) in ultra wide band (UWB) systems operating around 10 GHz mitigates multiuser interference from IEEE 802.22 and WiMAX, wherein the multiuser interference interferes with both trained and blind UWB systems, with the trained UWB system using pilot symbol assisted modulation.

In another embodiment the method passes a received UWB signal through a band pass filter (BPF), wherein the BPF is located at a UWB receiver and the UWB signal is a Hanning modulated pulse centered at 4 GHz frequency.

In another embodiment the method measures a plurality of test functions, determines a number of active users, notch filters NBI signals, based on the determined number of active users, passes the notch filtered signal through a quadratic programming algorithm, to perform joint decoding, estimates an arrival of a UWB payload, and demodulates the UWB payload, based on the estimated arrival of the UWB payload.

BRIEF DESCRIPTION OF THE DRAWINGS

The disclosure will be better understood from reading the description which follows and from examining the accompanying figures. These are provided solely as non-limiting examples of embodiments. In the drawings:

FIG. 1 shows the main topics of the present disclosure;

FIG. 2 shows a FCC spectral mask for UWB indoor communication systems;

FIG. 3 shows time and frequency domains for the Gaussian, first, and second derivative Gaussian pulses;

FIG. 4 shows FCC spectral mask for UWB indoor communication systems with narrowband systems;

FIG. 5 shows an autocorrelation receiver (AcR);

FIG. 6 shows a system architecture of CS based-UWB system;

FIG. 7 shows a block diagram of the proposed system model;

FIG. 8 shows impulse response and the power delay profile of CMI;

FIG. 9 shows matching pursuit for signal structure estimation;

FIG. 10 shows block diagram for the I-UWB system;

FIG. 11 shows implemented I-UWB signaling scheme;

FIG. 12 shows I-UWB receiver with GLRT detector;

FIG. 13 shows distribution of pulses transmitted over time—Frames and chips are synchronized for all users;

FIG. 14 shows flowchart for the main steps of the UWB system with training;

FIG. 15 shows BER as a function of Np1 and Np2;

FIG. 16 shows BER as a function of Np1 and Np3;

FIG. 17 shows BER as a function of Np2 and Np3;

FIG. 18 shows BER with different frame number;

FIG. 19 shows BER as a function of the interference threshold;

FIG. 20 shows system performance for different NBI;

FIG. 21 shows performance for licensed NBIs;

FIG. 22 shows system performance when 0, 2, 3, 5, 10, 15, 20 and 25 users are active;

FIG. 23 shows throughput of DS-TH coding for different number of interfering users;

FIG. 24 shows signal paths taken by the UWB-IR and the NBI signals;

FIG. 25 shows Hanning window in time and frequency domain;

FIG. 26 shows Hanning modulated pulse and its power spectrum;

FIG. 27 shows frame format for the bursty data transmission;

FIG. 28 shows correlator receiver with digital notch filter;

FIG. 29 shows time and frequency domain representations of the BPF;

FIG. 30 shows frequency domain for different test functions selected randomly;

FIG. 31 shows location of the $k^{th}$ nonzero samples;

FIG. 32 shows flow chart for the main steps of the blind system;

FIG. 33 shows performance of a partial band interferer for different burst size;

FIG. 34 shows performance for different UWB modulated pulses jammed by a partial band interferer;

FIG. 35 shows performance of a partial band interferer with different bandwidth;

FIG. 36 shows performance of 2 partial bands interferer with different bandwidth;

FIG. 37 shows BER performance as a function of the NBI's bandwidth;

FIG. 38 shows BER performance in the presence of licensed NBIs;

FIG. 39 shows BER performance when changing the bandwidth of the UWB modulated pulse;

FIG. 40 shows BER performance for one partial band interferer with different baud rate; and FIG. 41 shows a computer system upon which an embodiment of the present invention may be implemented.

DETAILED DESCRIPTION

The description provided here is intended to enable any person skilled in the art to understand, make and use this invention. Various modifications to the disclosed embodiments will be readily apparent to those skilled in the art, and the general principals defined herein may be applied to these modified embodiments and applications without departing from the scope of this invention. In each of the embodiment, the various actions could be performed by program instruction running on one or more processors, by specialized circuitry or by a combination of both. Moreover, the invention can additionally be considered to be embodied, entirely or partially, within any form of computer readable carrier containing instructions that will cause the executing device to carry out the technique disclosed herein. The present invention is thus, not intended to be limited to the disclosed embodiments, rather it is be accorded the widest scope consistent with the principles and features disclosed herein.

Details of functions and configurations well known to a person skilled in this art are omitted to make the description of the present invention clear. The same drawing reference numerals will be understood to refer to the same elements throughout the drawings.

The present disclosure utilizes CS as a mean to mitigate NBI in UWB systems. The mitigation is studied in both trained and blind systems. CS is used to detect and remove NBI effects as well as reduce the sampling rate at the receiver side. The Bit Error Rate (BER) performance in both systems is examined by applying different NBIs, with different center frequencies and bandwidths.

In the present disclosure, both trained and blind systems have been examined in mitigating the effect of the NBI in UWB system using CS as well as reduce the speeds of the ADC.

In trained systems, three training pilot groups are required. The system is first trained to estimate the NBI with no UWB transmission, then the UWB signal space is estimated and finally the channel impulse response is extracted. This research optimizes UWB systems with CS to mitigate the effect of NBI through efficient assignments of pilot symbols among the required training. Extensive simulation is conducted to investigate the optimum distribution of the pilot symbols that enhances the system's bit-error-rate (BER) performance. Based on this investigation, a better understanding of the effect of the NBI's characteristics on UWB systems with CS is drawn. Furthermore, the impact of the number and the type of the NBI sources is also evaluated. The impact of multiple users on the system behavior is considered. It is shown that the number of pilot symbols in the third group is directly proportional to the performance; hence once the minimum number of pilot symbols for first two groups is met, the extra symbols should be assigned to get information about the channel.

In blind UWB systems, the present disclosure investigates the problem in bursty application such as wireless sensor network. The receiver does a joint decoding of the time of arrival and the data bits using quadratic programming (QP). A correlator receiver combined with digital notch filter is applied. The basis functions in the correlators are designed to be highly frequency selective through windowing technique. Hence only few measurements are corrupted by the interferer. Here, the present disclosure studies the performance of different licensed and unlicensed NBIs and the present disclosure extends the mitigation technique to suppress the effect of multiple NBIs. The present disclosure discusses the system behavior under different NBI's and UWB signal bandwidths. Furthermore, the present disclosure evaluates the effect of the burst size, the type of the modulated window and the baud rate on the performance. For a partial band jammer, slight enhancement is achieved when doubling the bandwidth. In the dual-band jammer case, the enhancement due to the mitigation against the jammers is evident. For the considered scenarios, the present disclosure demonstrates that the BER is a strong function of the NBI's bandwidth while it is a weak function of the pulse shape. As the UWB signal's bandwidth increases, the number of the notched measurements lessens and the present disclosure preserves the important information about the transmitted pulse.

Details are given in how to generate UWB pulses as well as UWB systems pros and cons. The issue of spectrum sharing between UWB systems and different narrowband systems is also discussed. The present disclosure provides channel modeling and narrowband interferers modeling. In addition, compressive sensing framework and how it is utilized to reconstruct sparse signals are illustrated with details. The IEEE802.11.4a UWB channel model is discussed in the present disclosure and also different interferers models are presented. Furthermore, the present disclosure discusses mitigation problem in training UWB systems. Those systems use pilot symbol assisted modulation combined with direct sequence spread spectrum and time hopping for signaling. The mitigation process focuses on the detection and elimination of the most significant NBI components in the Discrete Cosine Transform (DCT) or Discrete Fourier Transform (DFT) domain. The present disclosure studies the mitigation of the narrowband interference in blind systems. The center frequency of the interfering source and the bandwidth of UWB signal as well as other factors play an important role in the mitigation process. The present disclosure provides summary of findings, and the recommendation for future.

Both trained and blind systems have been investigated for mitigating the NBI in UWB system using compressive sensing. The NBI sources were assumed to be licensed and unlicensed signals with different center frequencies and different bandwidths.

In trained systems, three training pilot groups are required. The present disclosure investigates the effect of each pilot group symbols and obtains the distribution that optimizes the BER performance. The present disclosure shows that the first and the last pilot group symbols are very important. Communications can be achieved without using the second group. Though, the performance can be enhanced if the second pilot group symbols are used. It is also shown that the third group is the most dominant one. Hence extra symbols should be assigned to estimate the channel.

Moreover, the trained system performance is further examined in the presence of multiuser interference when other users share the same channel. Throughput of the system is evaluated in the presence of multiuser interference in addition to the NBI.

In blind UWB systems, the present disclosure extends the mitigation technique in A. Oka and L. Lampe, "Compressed Sensing Reception of Bursty UWB Impulse Radio is Robust to Narrow-Band Interference," in *IEEE Global Telecommunications*, December, 2009, incorporated herein by reference in its entirety, to mitigate the effect of two NBIs. For the considered SIR, the present disclosure concludes that the 2 partial bands NBI has less effect on the performance than the partial band jammer since the power at the effecting bands are so low compared with that of the partial band NBI.

The present disclosure examines the effect of the NBI's bandwidth and the UWB signal's bandwidth on system performance. Those parameters are related to the mitigation process. For the considered scenarios, the present disclosure demonstrates that the BER is a strong function of the NBI's bandwidth and of the UWB signal's bandwidth. In addition, the present disclosure studies different parameters that may affect the system performance such as the burst size, the type of the modulated window and the baud rate. The present disclosure shows that sending the information using large burst size outperforms sending it using small burst size since the probability of making an error in one bit decreases as the burst size increases. The present disclosure also proves that the BER is a weak function of the considered modulated window. Additionally, the performance is highly affected when the NBI's center frequency is shifted to the center frequency of the transmitted pulse.

Compressive sensing is a promising signal processing technique used to reduce the sampling rate at the receiver as well as reduce the effect of the NBI on the UWB systems. As depicted in FIG. 1, the present disclosure includes three main topics, UWB, NBI and CS. The present disclosure provides the reader with technical background related to UWB signals, NBI, and CS techniques.

UWB signals are usually defined as any signal that occupies bandwidth greater than 500 MHz or has a fractional bandwidth, $B_f$, greater than 0.2. The fractional bandwidth is defined as the ratio between the signal bandwidth (BW) and its center frequency $f_c$ as given by:

$$B_f = \frac{BW}{f_c} = \frac{f_H - f_L}{(f_H + f_L)/2} \tag{1-1}$$

where $f_L$ is the lower band, and $f_H$ is the upper band in the frequency spectrum at −10 dB points. The approved bands for indoor and outdoor UWB communications have a Power Spectral Density (PSD) lower than part 15 FCC limits which is −41.3 dB/MHz in the range of 3.1-10.6 GHz, as shown in FIG. 2. See Y. D. Alemseged and K. Witrisal, "Two Stage Narrowband Interference Mitigation for Transmitted Reference UWB Systems," in *IEEE International Symposium on Personal, Indoor and Mobile Radio Communications, PIMRC*, Athens, Greek, September 2007; X. Li and K. Kwak, "NBI Suppression UWB System Based on Novel Nonlinear Chirp Pulses," in *IEEE Communications and Information Technology*, pp. 1167-1170 September, 2009; and G. Zhao, M. Jin, W. Fan, "A Low-complexity NBI Suppression Algorithm in UWB Systems," in *IEEE Communication Technology*, November, 2006, each incorporated herein by reference in their entirety.

UWB signals have the ability to trade bandwidth for a reduced transmission power. The idea is based on sending a very short pulse duration which improves the immunity to multipath. The bandwidth is very large and according to Shannon theorem the data rate will also be large. UWB systems are proposed for many applications such as wireless sensor networks with low cost and low complexity. See A. Oka and L. Lampe, "A Compressed Sensing Receiver for Bursty Communication with UWB Impulse Radio," in *Intl. Conf. on Ultra-Wideband*, pp. 279-284, September 2009; M. Ovtcharov, V. Poulkov, G. Iliev and Z. Nikolova, "Narrowband interference suppression for IEEE UWB channels," *The Fourth Intern. Conf. on Digital Telecommunications (ICDT 2009)*, pp. 43-47, Colmar, France, Jul. 20-25, 2009; and P. Zhang, Z. Hu, R. Qiu, and B. Sadler, "A compressed Sensing Based Ultra-Wideband Communication System," in *Proc. IEEE International Conference on Communications ICC*, pp. 1-5, 2009, each incorporated herein by reference in their entirety. One of the benefits of low-power spectral density is a low probability of detection. Therefore UWB signals are suitable for military applications. Another benefit is the long battery life/lighter batteries for UWB devices.

Table 1 also depicts the corresponding Effective Isotropic Radiated Power (EIRP), and the frequencies for the indoor and the outdoor UWB systems.

TABLE 1

Emission limits for indoor and outdoor systems in EIRP (H. Nikookar and R. Prasad, Introduction to Ultra Wideband for Wireless Communications, Springer, 2009, incorporated herein by reference)

| Emission limit for UWB Frequency (GHz) | Indoor EIRP (dBm/MHz) | Outdoor EIRP (dBm/MHz) |
|---|---|---|
| 0.96-1.61 | −75.3 | −75.3 |
| 1.61-1.9 | −53.3 | −63.3 |

TABLE 1-continued

Emission limits for indoor and outdoor systems in EIRP (H. Nikookar and R. Prasad, Introduction to Ultra Wideband for Wireless Communications, Springer, 2009, incorporated herein by reference)

| Emission limit for UWB Frequency (GHz) | Indoor EIRP (dBm/MHz) | Outdoor EIRP (dBm/MHz) |
|---|---|---|
| 1.9-3.1 | −51.3 | −61.3 |
| 3.1-10.6 | −41.3 | −41.3 |

The choice of the UWB waveforms depends on many factors. The most common waveform is the Gaussian pulse and its higher derivatives. The higher derivatives are more favorable because of their low DC content. The time and the frequency domain for the first, and the second derivatives Gaussian pulses are shown in FIG. 3. Orthogonal Hermite or modified Hermite pulses, Legandre pulses and Prolate spheroidal functions are also among several proposed UWB waveforms. The Gaussian pulse is expressed mathematically as:

$$p(t) = \frac{1}{\sqrt{2\pi\sigma^2}} e^{-\frac{t^2}{2\sigma^2}} \quad (1\text{-}2)$$

The first and the second derivative of the Gaussian pulse are $$p'(t) = \frac{dp(t)}{dt} = \frac{-t}{\sigma^2\sqrt{2\pi\sigma^2}} e^{\frac{t^2}{2\sigma^2}} \quad (1\text{-}3)$$

$$p''(t) = \frac{d^2 p(t)}{dt^2} = \frac{1}{\sigma^2\sqrt{2\pi\sigma^2}} \left[\frac{t^2}{\sigma^2} - 1\right] e^{-\frac{t^2}{2\sigma^2}} \quad (1\text{-}4)$$

The energy of such pulses extends over large bandwidth. FIG. 3 shows the Gaussian pulse in time and frequency domains where the amplitudes are normalized. The corresponding first and second derivative Gaussian pulses are also plotted in both domains. The graph as well indicates that there are low DC components for the Gaussian derivative pulses. Next, in the present disclosure the second derivative Gaussian pulse is used unless otherwise is specified.

There are many systems that share the UWB frequency spectrum, see FIG. 4. Those systems can be categorized into two types. Systems having fixed or assigned frequency range are called licensed systems. Systems which don't have assigned frequency spectrum are known as unlicensed systems. The licensed systems are the most important interference sources for the UWB signals including WiMAX, WLAN, and Bluetooth.

FIG. 4 illustrates many narrowband systems that share the UWB spectrum including, GPS, Personal Communications Service (PCS), the Industrial, Scientific, and Medical band (ISM), WLAN, and intentional jammers. Bluetooth and IEEE802.11b WLAN are two standards which use the 2.4 GHz (ISM) band.

According to the sampling theorem, the minimum required sampling frequency for accurate detection is twice the maximum frequency of the transmitted signal. When acquiring a high frequency signal, a very high speed ADC is needed. Those ADCs are difficult to design.

The problem becomes worse with channel distortion and Inter-Symbol Interference (IS I) which appears when a high data rate goes over a frequency selective channel in such case an equalizer is employed. High data rate requirements will definitely affect the receiver design i.e. more complex Digital Signal Processing (DSP) components are required.

CS technique has been used to reduce the speed of ADC into a sub-Nyquist rate in UWB systems which can be designed and implemented. This could be achieved if the UWB signal is sparse i.e. has few nonzero terms. See A. Gomaa and N. Al-Dhahir, "A Compressive Sensing Approach to NBI Cancellation in Mobile OFDM Systems," in IEEE Communications Society, December, 2010; A. Gomaa and N. Al-Dhahir, "A Sparsity-Aware Approach for NBI Estimation in MIMO-OFDM," in IEEE Transactions on Wireless Communications, Vol. 10, No. 6, pp. 1854-1862 June, 2011; Z. Wang, G. R. Arce, J. L. Paredes, and B. M. Sadler, "Compressed Detection for Ultra-Wideband Impulse Radio," in Proc. 8th IEEE Intl. Workshop SPA WC, June 2007; Z. Wang, G. R. Arce, B. M. Sadler, J. L. Paredes, S. Hoyos, and Z. Yu, "Compressed UWB Signal Detection with Narrowband Interference Mitigation," in IEEE Int. Conf on UWB, Vol. 2 pp. 157-160, September, 2008; P. Zhang and R. C. Qiu, "Wireless Tomography, Part III: Compressed Sensing for Ultra-Wideband Signals," in IEEE Waveform Diversity and Design, pp. 35-39, August 2010, each incorporated herein by reference in their entirety. More details about CS are provided in the present disclosure.

First the present disclosure describes problems related to the mitigation of NBI in UWB systems and utilization of CS to UWB systems. Also, the present disclosure addresses the problem of NBI in UWB systems based on CS.

Since UWB systems have a wide bandwidth; they may coexist with other licensed or unlicensed narrowband systems. Generally, wideband systems like Direct Sequence (DS) systems are capable of interference suppression. The degree of the suppression may not be satisfactory when the spreading gain is limited and a very strong NBI is presented. Wang et al., see C. Wang, M. Ma, R. Ying, and Y. Yang, "Narrowband Interference Mitigation in DS-UWB Systems," in IEEE Signal Processing, Vol. 17 pp. 429-432, 2010, incorporated herein by reference in its entirety, proposed DS-UWB system as an extension to the code aided interference suppression which uses the linear minimum mean-square error algorithm for multiuser detection. See H. V. Poor and X. Wang, "Code-aided Interference Suppression for DS/CDMA Communications—Part I: Interference Suppression Capability," in IEEE Trans. Commun., Vol. 45, No. 9, pp. 1101-1111, September 1997, incorporated herein by reference in its entirety. A considerable enhancement in the NBI suppression capability is achieved by introducing a new type of spreading sequence method. In case of very high data rate application, inter-chip interference is present because of the non-sharply peak autocorrelation of the sequence. Consequently an equalizer needs to be implemented which increases the receiver complexity. For such application, the equalizer needed was avoided with spreading sequence that has sharply peak autocorrelation. See C. Wang, R. Ying, Y. Wei, and Y. Yang, "Spreading Sequence Selection Scheme For NBI Suppression in DS-UWB System," in IEEE Ultra wideband and Ultra short Impulse Signals, pp. 186-188, September, 2010, incorporated herein by reference in its entirety.

The performance of DS pulse amplitude modulation UWB system with IEEE802.11a WLAN as NBI source was studied by see X. Li and K. Kwak, "NBI Suppression UWB System Based on Novel Nonlinear Chirp Pulses," in IEEE Communications and Information Technology, pp. 1167-1170 September, 2009; and G. Zhao, M. Jin, W. Fan, "A Low-complexity NBI Suppression Algorithm in UWB Systems," in *IEEE Communication Technology*, November, 2006, each incorporated herein by reference in its entirety.

The negative impact of NBI can be reduced by proper pulse shaping. In X. Li and K. Kwak, "NBI Suppression UWB System Based on Novel Nonlinear Chirp Pulses," in *IEEE Communications and Information Technology*, pp. 1167-1170 September, 2009, incorporate herein by reference nonlinear chirp pulses were used to create UWB pulses and decrease the NBI. The pulses are flexible in the design and have low complexity.

Another method to reject the NBI is based on Singular Value Decomposition (SVD). To reduce the complexity of SVD, the input data is segmented to several groups, every group is rearranged in special way where the matrix dimension is reduced. At the end, SVD is applied on every matrix; consequently the complexity is reduced without clearly penalizing the BER.

Data can be used to modulate a polarity of the "data" pulse with respect to a "reference" pulse. In Auto-Correlation Receiver (AcR) shown in FIG. 5, the received reference signal is delayed and then correlated with the data signal. The amount of the delay in an AcR is matched to the delay between reference and data pulse at the transmitter. The overall system is usually referred to as Transmitted-Reference (TR) AcR.

Although no channel estimation is required, the receiver front-end is open to undesirable noisy signals. On the darker side also, AcR suffers from ISI when the data rate is increased. Compared with coherent receiver, it is robust against the multipath propagation at low complexity. A data model; proposed by K. Witrisal and Y. D. Alemseged, "Narrowband interference mitigation for Differential UWB systems," in *IEEE Asilomar Conference on Signals, Systems, and Computers*, Monterey, Calif., November 2005, incorporated herein by reference in its entirety, was applied effectively for detection and NBI alleviation by combining several AcR channels linearly.

Narrowband interference suppression in F. Dowla F. Nekoogar, and A. Spiridon, "Interference Mitigation in Transmitted-Reference Ultra-Wideband Receivers," in *IEEE Antennas and Propagation Society*, Vol. 4, pp. 1307-1310, June, 2004, incorporated herein by reference is accomplished by a modified feedback loop mechanism. In this approach, feedback delay can be controlled to extract information from a number of previous transmitted pulses. The Signal-to-Interference Ratio (SIR) was improved as the number of involved pulses increased giving a cleaner pulse.

Dang and Van Der Veen, in Q. Dang and A. van der Veen, "Narrowband Interference Mitigation for a Transmit-Reference Ultra-Wideband Receiver," in 14*th European Signal Processing Conference*, 2006, incorporated herein by reference investigated the mitigation problem in high data rate application. See Q. Dang and A. van der Veen, "Narrowband Interference Mitigation for a Transmit-Reference Ultra-Wideband Receiver," in 14*th European Signal Processing Conference*, 2006, incorporated herein by reference in its entirety. By oversampling, the transmitted symbols can be detected by gathering the energy of all the multipath arrivals. At certain range of SIR, it is possible to mitigate the NBI, though the model becomes invalid when the NBI is too strong. In this case, the NBI needs to be filtered before entering the AcR.

In Y. D. Alemseged and K. Witrisal, "Two Stage Narrowband Interference Mitigation for Transmitted Reference UWB Systems," in *IEEE International Symposium on Personal, Indoor and Mobile Radio Communications, PIMRC*, Athens, Greek, September 2007, incorporated herein by reference NBI mitigation is achieved through a system made of two stages, namely: an adaptive NBI cancellation and a linear combiner. The scheme uses a canceller circuit based on feed forward approach. The interference is filtered out through tunable analog Band-Pass Filter (BPF) and subtracted from the received signal before the correlator. The output of the correlator is feedback to the canceller which adjusts the canceller parameters until minimal interference is observed. In case of too strong NBI or a second interferer is presented, a linear combiner is used to reject any leakage. The AcR uses a method based on SVD to identify the spectral location of the NBI. In Y. D. Alemseged, H. Harada, and K. Witrisal, "Detection and Identification of NBI for Multichannel UWB Autocorrelation Receivers," in *IEEE Wireless Communications and Networking*, May, 2009, incorporated herein by reference a method of threshold comparator based on the SVD of a reduced rank of the received data matrix is used for NBI detection. See Y. D. Alemseged, H. Harada, and K. Witrisal, "Detection and Identification of NBI for Multichannel UWB Autocorrelation Receivers," in *IEEE Wireless Communications and Networking*, May, 2009, incorporated herein by reference in its entirety. Then an approach analogous to DFT calculation is followed for the NBI center frequency identification.

Filtering is also used by other researchers for NBI cancellation. A technique based on multicarrier called amplitude-phase adaptive sine-modulated/cosine-modulated filter bank equalizer was applied by T. H. Stitz, T. Ihalainen, M. Renfors, "Mitigation of Narrowband Interference in Filter Bank Based Multicarrier Systems," in *IEEE Communications Society*, Vol. 7, pp. 3241-3246, 2006, incorporated herein by reference. It was used to mitigate the distortion on an OFDM sub-channel by a NBI located at an OFDM adjacent sub-channel. Ovtcharov et al., in M. Ovtcharov, V. Poulkov, G. Iliev and Z. Nikolova, "Narrowband interference suppression for IEEE UWB channels," *The Fourth Intern. Conf. on Digital Telecommunications* (ICDT 2009), pp. 43-47, Colmar, France, Jul. 20-25, 2009, incorporated herein by reference proposed a scheme using complex adaptive digital filtering. The filter monitors the NBI's frequency regularly based on the least mean square algorithm to adjust its frequency to match the center frequency of the NBI. The approach can eliminate the NBI effects; however the performance becomes worse for SIR greater than 0 dB because the NBI filter introduces amplitude and phase distortion.

Apart from filtering, the NBI problem is solved as well by introducing a pulse that meets the Federal Communication Committee (FCC) spectrum mask and has spectral nulls at frequencies of NBI in the UWB spectrum. See Y. Wang, X. Dong, and I. J. Fair, "A method for spectrum shaping and NBI suppression in UWB communications," *Proc. In IEEE Int. Conf. Commun.* (*ICC '06*), Istanbul, Turkey, June 2006; Z. Wang, G. R. Arce, B. M. Sadler, J. L. Paredes, and X. Ma, "Compressed Detection for Pilot Assisted Ultra-Wideband Impulse Radio," in *Proc. IEEE Int. Conf. on Ultra-Wideband*, Singapore, September 2007; Y. Wang, X. Dong, I. J. Fair, "Spectrum Shaping and NBI Suppression in UWB Communications," in *IEEE transactions on wireless communications*, Vol. 6, issue 5, pp. 1944-1952, May 2007; and G. Zhang, Y. Dai, X. Zhang, Y. Lv and L. Chen, "Design and Implementation of UWB Pulse with Multiple Narrow-Band Interferences Mitigation," in *IEEE Consumer Electronics, Communications and Networks*, pp. 1154-1157, April 2011, each incorporated herein by reference in their entirety. The transmitted pulse for this approach is represented by a coded based Gaussian monocycle pulse where the value of each code bit gives the weighting coefficient of each monocycle pulse. The resulting pulse is the sum of weighted and overlapping Gaussian monocycles. Thus the shape of the resulting spectrum is determined by both the Fourier transform of the basic Gaussian monocycle pulse and the spectrum of the intended codeword. Even though, a set of multi-variables nonlinear equations has to be solved to get the codeword. The approach can be applied for different modulation techniques such as pulse position modulation, and OFDM-UWB and IR UWB.

In G. Zhang, Y. Dai, X. Zhang, Y. Lv and L. Chen, "Design and Implementation of UWB Pulse with Multiple Narrow-Band Interferences Mitigation," in *IEEE Consumer Electronics, Communications and Networks*, pp. 1154-1157, April 2011, incorporated herein by reference the FCC mask was realized through combining multiple Gaussian derivative pulses ($1^{st}$-$15^{th}$) with proper scaling. The resulting pulse is added to a similar one with a certain time delay. The final resultant pulse meets the FCC PSD, bandwidth mask, and has multiple nulls to mitigate the NBI at certain frequencies. The nulls can be controlled by changing the time delay. The pulses designed in Y. Wang, X. Dong, and I. J. Fair, "A method for spectrum shaping and NBI suppression in UWB communications," *Proc. in IEEE Int. Conf. Commun. (ICC '06)*, Istanbul, Turkey, June 2006, incorporated herein by reference and Z. Wang, G. R. Arce, J. L. Paredes, and B. M. Sadler, "Compressed Detection for Ultra-Wideband Impulse Radio," in *Proc. 8th IEEE Intl. Workshop SPAWC*, June 2007, incorporated herein by reference are suitable only for single NBI whereas in G. Zhang, Y. Dai, X. Zhang, Y. Lv and L. Chen, "Design and Implementation of UWB Pulse with Multiple Narrow-Band Interferences Mitigation," in *IEEE Consumer Electronics, Communications and Networks*, pp. 1154-1157, April 2011, incorporated herein by reference they have the ability to suppress multiple NBI with low implementation cost and low power.

The NBI can be reduced by exploiting the UWB signals immunity to the multipath effect based on interference Selection Diversity (SD) in Single-Input-Multiple-Output (SIMO) system. In contrast to the conventional SD, the receiver selects the weakest signal and feeds it to the demodulator. Since UWB signal power over all antennas is almost constant, while the interfering power varies independently from one antenna to another when the multipath angle spread is high, any increase in the received power is related to a superior NBI power. See J. Ibrahim, R. M. Buehrer, "NBI Mitigation for UWB Systems Using Multiple Antenna Selection Diversity," in *IEEE Transactions on Vehicular Technology*, Vol. 56, No. 4, pp. 23 63-2374, July 2007, incorporated herein by reference in its entirety. Better performance was realized through doubling the number of receiving antennas. In addition, this approach does not need fast ADC, synchronization and knowledge of the location or the statistical characteristics of the NBI signal.

The present disclosure has discussed several methods to solve the NBI problem. Given that the promised solution is the CS; the present disclosure concentrates on the literature that exploits CS for UWB systems.

Even when no interference is assumed, compressive sensing techniques are used to reduce the sampling rate to sub-Nyquist rate and hence results in low ADC requirements. Researchers on UWB systems used CS in training systems, while others applied it for blind system. See B. Jin, S. Zhang, J. Pan, and K. Lin, "Sub-Nyquist sampling based narrowband interference mitigation in UWB impulse radio," Electronics Letters, Vol. 48, no. 15, pp. 963-964, Jul. 19 2012; and Z. Wang, G. R. Arce, B. M. Sadler, J. L. Paredes, and X. Ma, "Compressed Detection for Pilot Assisted Ultra-Wideband Impulse Radio," in *Proc. IEEE Int. Conf. on Ultra-Wideband*, Singapore, September 2007, each incorporated herein by reference in their entirety. For the case of impulse radio (I-UWB), CS was applied by many researchers. See A. Oka and L. Lampe, "Compressed Sensing Reception of Bursty UWB Impulse Radio is Robust to Narrowband Interference," in *IEEE GLOBECOM*, November-December 2009, incorporated herein by reference in its entirety. Other researchers applied CS for UWB systems in bursty applications such as wireless sensor networks. See B. Jin, S. Zhang, J. Pan, and K. Lin, "Serial compressed sensing communication system for UWB impulse radio in bursty applications," Electronics Letters, Vol. 47, no. 6, pp. 412-414, Mar. 17 2011, incorporated herein by reference in its entirety.

A serial system structure; shown in FIG. 6; was proposed by P. Zhang, Z. Hu, R. Qiu, and B. Sadler, "A compressed Sensing Based Ultra-Wideband Communication System," in *Proc. IEEE International Conference on Communications ICC*, pp. 1-5, 2009, incorporated herein by reference. The system is suitable for I-UWB communications, which is sparse in time domain. An UWB signal is transmitted by supplying a sparse bit stream through an UWB pulse generator and a pre-coding filter. After the channel, a low-rate ADC samples the received signal which is then processed by a recovery algorithm.

Based on the CS UWB Single-Input-Single-Output (SISO) system in P. Zhang, Z. Hu, R. Qiu, and B. Sadler, "A compressed Sensing Based Ultra-Wideband Communication System," in *Proc. IEEE International Conference on Communications ICC*, pp. 1-5, 2009, incorporated herein by reference a Multiple-Input-Multiple-Output (MIMO) system was proposed by P. Zhang and R. C. Qiu, "Wireless Tomography, Part III: Compressed Sensing for Ultra-Wideband Signals," in *IEEE Waveform Diversity and Design*, pp. 35-39, August 2010, incorporated herein by reference. The method in P. Zhang and R. C. Qiu, "Wireless Tomography, Part III: Compressed Sensing for Ultra-Wideband Signals," in *IEEE Waveform Diversity and Design*, pp. 35-39, August 2010, incorporated herein by reference is different from the method in P. Zhang, Z. Hu, R. Qiu, and B. Sadler, "A compressed Sensing Based Ultra-Wideband Communication System," in *Proc. IEEE International Conference on Communications ICC*, pp. 1-5, 2009, incorporated herein by reference in that the UWB channel was modeled with pulse distortion. Though, the total samples/sec at the receiver is almost the same, the sampling rate is reduced at each receiver branch compared with P. Zhang, Z. Hu, R. Qiu, and B. Sadler, "A compressed Sensing Based Ultra-Wideband Communication System," in *Proc. IEEE International Conference on Communications ICC*, pp. 1-5, 2009, incorporated herein by reference system.

A CS based Maximum Likelihood Sequence Estimation (MLSE) correlator receiver was proposed in A. Oka and L. Lampe, "A Compressed Sensing Receiver for Bursty Communication with UWB Impulse Radio," in *Intl. Conf on Ultra-Wideband*, pp. 279-284, September 2009, incorporated herein by reference. It consists of an analog front-end which contains a bank of correlators with test functions, low ADC, and DSP back-end based on a computationally efficient Quadratic Program (QP) reconstruction. The number of correlators is smaller than the required by Shannon-Nyquist sampling theorem.

To support burst applications see B. Jin, S. Zhang, J. Pan, and K. Lin, "Serial compressed sensing communication system for UWB impulse radio in bursty applications," Electronics Letters, Vol. 47, no. 6, pp. 412-414, Mar. 17 2011; and B. Jin, S. Zhang, J. Pan, and K. Lin, "Sub-Nyquist sampling based narrowband interference mitigation in UWB impulse radio," Electronics Letters, Vol. 48, no. 15, pp. 963-964, Jul. 19 2012, each incorporated herein by reference suggested the use of a pre-coding filter followed by UWB pulse generator.

Generalized Likelihood Ratio Test (GLRT) detector based on compressive measurements, where the received signal was projected onto a random digital basis, was derived by see Z. Wang, G. R. Arce, J. L. Paredes, and B. M. Sadler, "Compressed Detection for Ultra-Wideband Impulse Radio," in *Proc. 8th IEEE Intl. Workshop SPAWC*, June 2007, incorporated herein by reference. CS was applied for channel estimation. The complexity of the system was reduced by taking advantage of the sparsity of the received signal. Two compressive measurements were applied. The first one was based on random basis as in Z. Wang, G. R. Arce, J. L. Paredes, and B. M. Sadler, "Compressed Detection for Ultra-Wideband Impulse Radio," in *Proc. 8th IEEE Intl. Workshop SPAWC*, June 2007, incorporated herein by reference while the other was constructed based on the subspace signal structure estimated by Matching Pursuit (MP) algorithm. For training, pilot symbol assisted modulation was used to provide information about the channel, and to estimate the signal structure.

Applying CS technique, as mentioned, was mainly used to reduce the sampling rate. Few researches have investigated the possibility of NBI mitigation in UWB systems by utilizing CS. Similar studies utilized CS in NBI mitigation for OFDM systems. An algorithm based on CS technique was proposed in A. Gomaa and N. Al-Dhahir, "A Compressive Sensing Approach to NBI Cancellation in Mobile OFDM Systems," in *IEEE Communications Society*, December, 2010; and A. Gomaa and N. Al-Dhahir, "A Sparsity-Aware Approach for NBI Estimation in MIMO-OFDM," in *IEEE Transactions on Wireless Communications*, Vol. 10, No. 6, pp. 1854-1862 June, 2011, each incorporated herein by reference to estimate and mitigate the NBI signals undergoing fast and frequency-selective fading channels in OFDM systems. Before channel estimation, NBI is estimated and cancelled. Both references studied the case of asynchronous jamming where the NBIs and the desired signals do not coincide (some frequency offset).

Wang et al. in Z. Wang, G. R. Arce, B. M. Sadler, J. L. Paredes, S. Hoyos, and Z. Yu, "Compressed UWB Signal Detection with Narrowband Interference Mitigation," in *IEEE Int. Conf. on UWB*, Vol. 2 pp. 157-160, September, 2008, incorporated herein by reference extended the subspace detection method in Z. Wang, G. R. Arce, B. M. Sadler, J. L. Paredes, and X. Ma, "Compressed Detection for Pilot Assisted Ultra-Wideband Impulse Radio," in *Proc. IEEE Int. Conf. on Ultra-Wideband*, Singapore, September 2007, incorporated herein by reference to NBI mitigation in which the NBI subspace is estimated from random measurements when the UWB signal is absent. The coefficients of the NBI signal were estimated using Basis Pursuit Denoising (BPDN) algorithm. Once the UWB symbols are detected, both null subspace of the NBI and UWB subspace—estimated by BPDN—are used to construct the compressive measurement matrix. For signaling purpose, pilot symbol assisted modulation combined with direct sequence spread spectrum coding and time-hopping (DS-TH) coding was suggested. The pilot symbols were divided into three groups in order to: estimate the NBI subspace; estimate the UWB signal subspace; and provide information about the channels.

Combining the correlator receiver with digital notch filter was applied to NBI suppression when strong NBI was present from licensed systems like WiMAX. The NBI affects only small part of the CS measurements by setting the test functions to be highly frequency selective at the correlators. During the QP reconstruction, a 'digital notch' was employed which discovers and drops those affected measurements with only few numbers of correlators. An approach in between see A. Oka and L. Lampe, "Compressed Sensing Reception of Bursty UWB Impulse Radio is Robust to Narrow-Band Interference," in *IEEE Global Telecommunications*, December, 2009; and Z. Wang, G. R. Arce, B. M. Sadler, J. L. Paredes, S. Hoyos, and Z. Yu, "Compressed UWB Signal Detection with Narrowband Interference Mitigation," in *IEEE Int. Conf. on UWB*, Vol. 2 pp. 157-160, September, 2008, each incorporated herein by reference was also used for NBI elimination. The proposed system used a training sequence in the first burst and did not transmit any information. Then a method similar to that in Z. Wang, G. R. Arce, B. M. Sadler, J. L. Paredes, S. Hoyos, and Z. Yu, "Compressed UWB Signal Detection with Narrowband Interference Mitigation," in *IEEE Int. Conf. on UWB*, Vol. 2 pp. 157-160, September, 2008, incorporated herein by reference was used to detect the coefficients of the NBI.

For CS based UWB systems, no additional hardware are required to detect and mitigate the NBI subspace as well as no ISI was assumed (low pulse rate). The NBI signals in are sparsely characterized in the DCT. Though in A. Oka and L. Lampe, "Compressed Sensing Reception of Bursty UWB Impulse Radio is Robust to Narrow-Band Interference," in *IEEE Global Telecommunications*, December, 2009, incorporated herein by reference the baud rate might be close to the Nyquist rate with imperfect timing. The basis functions are sinusoidal waveforms which are sparse in frequency domain.

In light of the deficiencies of conventional systems the present disclosure branches into two main directions. The former branch is the mitigation of NBI in training UWB systems. The latter is the mitigation in blind UWB systems.

The ability of CS technique to detect and reconstruct unknown signals from far few numbers of measurements is explained. There are many CS algorithms with different complexity; including Basis Pursuit (BP), Matching Pursuit (MP), Orthogonal Matching Pursuit (OMP), and Basis Pursuit Denoising (BPDN). Here, the present disclosure covers the details of MP algorithm because it is the one that will be used in the present disclosure. The present disclosure introduces different models required to evaluate the proposed NBI mitigation techniques. Important properties of interferers are explained. The present disclosure focuses on the types that are used in the simulation.

The block diagram of the system, shown in FIG. 7, involves an UWB system and a NB system, as embodiments of the present disclosure. Thermal noise is added at the UWB receiver. The channel model for the UWB transmitter is different than the NBI channel. UWB channel, MP algorithm, and NBI modeling are explained in details.

A UWB channel model was proposed by the IEEE 802.11.4a working group see A. F. Molisch, K. Balakrishnan, C. Chong, S. Emami, A. Fort, J. Karedal, J. Kunisch, H. Schantz, U. Schuster, and K. Siwiak, "Ieee 802.15.4a channel model—final report," Tech. Rep., IEEE 802.15 TG4a, 2006, incorporated herein by reference. The model is proposed by modifying the conventional model for Saleh-Valenzuela (S-V) model. See A. Saleh and R. A. Valenzuela, "A statistical model for indoor multipath propagation," in *IEEE J. Selected Areas Comm.*, Vol. 5, pp. 138-137, February 1987, incorporated herein by reference in its entirety. It is applicable for different environments such as indoor residential, indoor office, industrial, outdoor, and open outdoor environments. The multipath components arrive as clusters according to Poisson distribution, and each path in a certain cluster also arrives with the same distribution. Thus the inter-arrival times for the clusters and the paths within the clusters are exponentially distributed. The impulse response of the channel can be expressed as:

$$h(t) = \sum_{l=0}^{L} \sum_{k=0}^{K_l} a_{l,k} \delta(t - T_l - \tau_{l,k}).$$  (2-1)

where L is the number of clusters, $K_l$ is the number of multipath components within the $l^{th}$ cluster, $\alpha_{l,k}$ is the multipath gain coefficient of the $k^{th}$ component in the $l^{th}$ cluster, $T_l$ is the delay of the $l^{th}$ cluster which is defined as the Time Of Arrival (TOA) of the first arriving multipath component within the $l^{th}$ cluster, and $\tau_{l,k}$ is the delay of the $k^{th}$ multipath component relative to the $l^{th}$ cluster arrival time, $T_l$. The two dimensional model can be reduced into one dimensional discrete model including a mixed Poisson distribution for ray arrival times:

$$h(t) = \sum_{l=0}^{L-1} \alpha_l \delta(t - \tau_l)$$  (2-2)

where $\alpha_l$, $\tau_l$ are the attenuation and the delay of the $l^{th}$ path. The channel model was already implemented using Matlab in A. F. Molisch, K. Balakrishnan, C. Chong, S. Emami, A. Fort, J. Karedal, J. Kunisch, H. Schantz, U. Schuster, and K. Siwiak, "Ieee 802.15.4a channel model—final report," Tech. Rep., IEEE 802.15 TG4a, 2006, incorporated herein by reference and the present disclosure uses it directly. See A. F. Molisch, K. Balakrishnan, C. Chong, S. Emami, A. Fort, J. Karedal, J. Kunisch, H. Schantz, U. Schuster, and K. Siwiak, "Ieee 802.15.4a channel model—final report," Tech. Rep., IEEE 802.15 TG4a, 2006, incorporated herein by reference in its entirety.

TABLE 2

IEEE802.1.4a channel model classification

| LOS | Environment | NLOS | Environment |
|---|---|---|---|
| CM-1 | Residential | CM-2 | Residential |
| CM-3 | Office | CM-4 | Office |
| CM-5 | Outdoor | CM-6 | Outdoor |
| CM-7 | Industrial | CM-8 | Industrial |
|  |  | CM-9 | outdoor |

Channel models in IEEE 802.15.4a are classified as in the Table 2. Each model is applicable for a specific environment. Odd numbered channels represent line-of-sight scenarios, while even numbered channels are for non-line-of-sight (NLOS).

Channel Model#1 (CM 1) is used throughout the present disclosure. A representative simulated impulse response and power delay profile for CM1 is plotted in FIG. 8. The path strength of the multipath after 150 nanosecond excess delay is negligible.

Let $x \in \mathbb{R}^N$ be a vector of length N×1, most of its elements are zeros and there are K nonzero elements in x. Assume also that $\Psi$ is a basis matrix of dimension N×N. The vector x can be represented by a linear combination as:

$$x = \sum_{n=1}^{N} \theta_n \psi_n = \Psi \Theta$$  (2-3)

where $\theta = [\theta_0, \theta_1, \ldots, \theta_{N-1}]$ is N×1 vector of constant coefficients. The signal x is called K-sparse or it is sparse in the $\Psi$-domain. By utilizing the CS, the sparse signal x can be reconstructed from M measurements where N>>M by projecting x onto a measurement matrix $\Phi$ with M×N dimension as:

$$y = \Phi x$$  (2-4)

$$y = f \Theta \text{ where } f = \Phi \Psi$$  (2-5)

The CS technique has proven that a major factor for accurate reconstruction process is the incoherence between $\Phi$ and $\Psi$. See E. J. Candes, "Compressed Sampling," European Mathematical Society, 2006, incorporated herein by reference in its entirety.

Through an optimization problem of the $l_1$-norm the coefficients of the vector $\theta$ can be recovered from the vector y using the following formula:

$$\hat{\theta} = \text{argmin} \|\hat{\theta}\|_1 \text{ subject to } y = f\hat{\theta}$$  (2-6)

where $\hat{\theta}$ is the recovered vector. Linear programming such as BP or MP and OMP is used to solve the problem.

In the present disclosure among many CS algorithms, MP is used. Matching Pursuit algorithm is simple and efficient. However, it is not optimal because it does not take the noise effect into account. For the sparse signal, $x = H\theta$ which is K-sparse on basis $\Psi$, where $\theta$ is a vector with K×1 nonzero elements, and H is a subspace matrix of dimension N×K that is constructed from the basis $\Psi$ with N>>K. The location of columns that construct the subspace matrix H from the basis $\Psi$ is unknown, which can be achieved using MP algorithm.

Given the measurement vector, $y = \Phi x$, the target of the algorithm is to extract the K largest columns correlated to y from a combined dictionary $V = \Phi \Psi$. FIG. 9 summarizes the main steps for the MP algorithm. The process works iteratively with $T_0$ maximum number of iterations. It starts by an initialization states for the sparse vector $\hat{\theta}$ and starts a counter, for the number of iterations. In each turn, the algorithm goes over all V columns, and searches for the most correlated column vector with y then removes it from y giving a residual error vector, $e_r$. After each iteration, K can be approximated by observing the magnitude of the current residual. The subspace matrix $\hat{H}$ is constructed by examining the number of the significant elements of $\hat{\theta}$ when the threshold value, becomes smaller than the ratio between residual vector and the measurement vector.

Compressive sensing is used to estimate the coefficients of NBI in trained UWB systems. This can be done by exploiting the fact that the NBI has sparse representation in the DCT domain. Furthermore, CS is applied to estimate and construct the subspace measurement matrix in which a sparse UWB signal lies. In blind UWB systems, the test functions in the correlator receiver are sparse in the frequency domain. The transmitted waveform contains only K nonzero samples i.e. it is K-sparse, therefore NBI is effectively eliminated. For I-UWB receivers, CS is also used to reduce the sampling rate at the receiver side far below the Nyquist rate.

One objective of the present disclosure is to mitigate the NBI effect on UWB systems. The bandwidth and the center frequency of a UWB signal is denoted by $\Omega_U$, $f_{cU}$ respectively, while $\Omega_I$, $f_{cI}$ are the bandwidth and the center frequency of NBI signal and $\Omega_U >> \Omega_I$. The performance is not affected when the interferer operates out of the band of interest. The present disclosure is only interested in the jammers overlaying the UWB signal's bandwidth.

Narrowband Interference Modeling

Next, the present disclosure discusses different NBIs, such as single-tone, multi-tone and partial-band interference models. See Si Chen; Bang-ning Zhang; Daoshen Guo; Qin-yu Zhang, "Jammer cancellation in time-hopping impulse radio using independent component analysis," in *International Conference on Wireless Communications & Signal Processing, WCSP*, Vol., no., pp. 1-4, 13-15 Nov. 2009, incorporated herein by reference in its entirety. Furthermore, the present disclosure discusses some licensed NBIs like WiMAX, WLAN, and Bluetooth.

Unlicensed Narrowband Interference

The unlicensed narrowband interferers or jammers do not have fixed center frequency or bandwidth. A single tone jammer can be considered as the simplest form of interference, where a sinusoidal signal with a certain single frequency, $f_I$, lays within the UWB signal's bandwidth. The extreme case occurs when the frequency of the jammer coincides with the center frequency of the UWB signal. The time domain expression of the tone jammer, v(t), and its autocorrelation function, $R_v(\tau)$, are expressed as:

$$v(t) a \cos(2\pi f_I t) \quad (2\text{-}7)$$

$$R_v(\tau) = \frac{a^2}{2}\cos(2\pi f_I \tau) \quad (2\text{-}8)$$

The average power of the jammer is $$v = R_v(\tau = 0) = \frac{a^2}{2}.$$

The PSD of single tone interferer is the Fourier transform of its autocorrelation which is expressed as:

$$S_v(f) = \frac{a^2}{4}[\delta(f - f_I) + \delta(f - f_I)] \quad (2\text{-}9)$$

On the other hand, multi-tone interferer is constructed by adding more than one tone interference signal. Assuming $N_v$ equal power tones, the multi-tone jammer can be defined as:

$$v_i(t) = \sum_{l=1}^{N_v} \sqrt{\frac{2}{N_v}} \cos(2\pi f_l t + \phi_l) \quad (2\text{-}10)$$

When the phase of the individual tones is random and independent, this type of interference has Gaussian distribution when $N_v \gg 1$ according to the central limit theorem.

Partial-band interference spreads its power, v, over a specific frequency band, so it affects a partial band of the total UWB signal bandwidth. The PSD of the partial-band jammer is given by:

$$S_v(f) = \begin{cases} \frac{v}{\Omega_l}, & |f - f_{cl}| \le \Omega_l \\ 0, & \text{otherwise} \end{cases} \quad (2\text{-}11)$$

Licensed Narrowband Interference

The licensed narrowband interferers or jammers have fixed or assigned frequency range. WiMAX and IEEE802.11a WLAN are OFDM based systems where the available bandwidth divides into smaller sub-bands. The data transmitted in each sub-band utilizes different modulation techniques. The IEEE802.11b standard and Bluetooth operate over the 2.4 GHz ISM band.

WiMAX is a primary NB service based on the IEEE802.16-2004 standard. It operates in the band of 2-66 GHz over an adaptable channel bandwidth ranging from 1.25 MHz up to 20 MHz which can be any integer multiple of 1.25 MHz, 1.5 MHz, 1.75 MHz, 2 MHz, and 2.75 MHz. The modulation adaptively changes according to the channel conditions. With different coding rate, the system may provide data rate up to 75 Mbps.

Another OFDM based system is the IEEE802.11a WLAN which works in the 5.2 GHz spectrum with 20 MHz channel bandwidth. It uses adaptive modulation and coding which changes according to the channel conditions. Hence the system data rate might reach up to 54 Mbps. See J. Bellorado, S. S. Ghassemzadeh, L. J. Greenstein, T. Sveinsson, V. Tarokh, "Coexistence of ultra-wideband systems with IEEE-802.11a wireless LANs," *Proc. IEEE Global Telec. Conf. (GLOBECOM '03)*, Vol. 1, pp. 410-414, 1-5 Dec. 2003, incorporated herein by reference in its entirety.

The IEEE802.11b WLAN has a bandwidth around 22 MHz and operates in the 2.4 GHz band as illustrated in FIG. 4. WLAN simulates an implementation of the Direct Sequence Spread Spectrum (DSSS) system that provides 1 Mbps, 2 Mbps, 5.5 Mbps, and 11 Mbps payload data rates. The modulation of the system changes from DBSK to combinations of DQPSK, QPSK and complementary code keying (CCK). See I. Lensford. A. Stephens. and U. Nevo. "Wi-Fi (802.11b) and Bluetooth: Enabling Coexistence:" in *IEEE Network Magazine*, Vol. 15, pp. 20-27, September/October 2001; and L. Sydanheimo, M. Keskilammi and M. Kivikoski, "Performance Issues on the Wireless 2.4 GHz ISM Band in a Multisystem Environment", in *IEEE Trans. Consumer Electronics*, Vol. 48, No. 3, pp. 638-643, August 2002, each incorporated herein by reference in their entirety.

Bluetooth operates in the 2.4 GHz ISM band. It transmits signals with small power around 1 mW, therefore it is applicable for short-rage technology. Frequency Hopping Spread Spectrum (FHSS) is used in Bluetooth. Bluetooth uses 1600 hop/sec to switch over 79 channels to avoid interfering with other systems operating in the same band. Each channel has a bandwidth of 1 MHz starting at 2.402 GHz and finishing at 2.48 GHz. Though the bandwidth is large, the common Bluetooth devices provides data rate of only 1 Mbps using Gaussian frequency shift keying (GFSK).

TABLE 3

Comparison between different NB services

| NB service | WiMAX | IEEE802.11a WLAN | IEEE802.11b WLAN | Bluetooth |
|---|---|---|---|---|
| Technique | OFDM | OFDM | DSSS | FHSS |
| Modulation, coding rate | ½ BSPK, ½, ¾ (QPSK, 16-QAM), ⅔, ¾ 64-QAM | ½, ¾ (BPSK, QPSK, 16-QAM) ⅔, ¾ 64-QAM | DBPSK, DQPSK, QPSK, CCK | GFSK |
| Spectrum GHz | 2-11 | 5.2 | 2.4 | 2.4 |
| Bandwidth MHz | 20 | 50 | 22 | |
| Maximum data rate Mbps | 75 | 54 | 11 | 1 |

Table 3 illustrates comparisons between the NB services. It focuses mainly on the most important characteristics such as modulation and coding, the operating frequency band bandwidth, and the maximum data rate supported by each service. It will be difficult to conside all possible NB systems. The discussion here provides guidelines for the chosen frequencies and bandwidths.

The UWB IEEE802.11.4a channel model mainly focuses on CM1, which the present disclosure uses in the simulation. Among many CS algorithms the present disclosure concentrates on the MP algorithm. See A. F. Molisch, K. Balakrishnan, C. Chong, S. Emami, A. Fort, J. Karedal, J. Kunisch, H. Schantz, U. Schuster, and K. Siwiak, "Ieee 802.15.4a channel model—final report," Tech. Rep., IEEE 802.15 TG4a, 2006, incorporated herein by reference in its entirety.

Different unlicensed and licensed NBIs were discussed. For the unlicensed NBI, the center frequency and the bandwidth of the jammers can be located anywhere in the UWB signal's spectrum. Licensed NB services are governed by standards.

Next, the present disclosure uses MP algorithm to estimate the sparse components of the NBI in the DCT domain. Additionally, the basis or the subspace of the transmitted UWB signal will be constructed by the same algorithm. The algorithm aims to extract the sparse elements from a reduced set of measurements using a pre-defined dictionary. A dictionary is a matrix that is built up from the signal of interest. Each column in this dictionary is a scaled and shifted version of the signal of interest. Matching Pursuit can be also used to estimate the columns from the designed dictionary that fully construct the sparse signal.

Mitigation of Narrowband Interference in Systems with Channel Training

In frequency selective channels, I-UWB pulses are distorted because of their wide bandwidth. When such pulses are sent over multipath environment, which cause ISI, the receiver must deal with timing problems carefully. The timing becomes so complex in multiple access techniques where there are many users sending on the same channel. It is even worse when an interferer shares part of the transmission bandwidth. The presence of interference degrades the system performance. Most UWB system achieves synchronization and proper channel estimation by sending a training sequence. Some systems are designed to work in the presence of NBI and some are designed to work in the presence of both NBI dense ISI.

Training can be achieved by inserting a known data stream in the beginning of each frame or by sending pilot symbols at regular intervals during the whole transmission time. Many operations required at the receiver side such as channel estimation, synchronization, and data detection could be easily achieved when the received signal contains a training sequence. However, part of the transmitted data will be used as an overhead. Hence there is a tradeoff between the system performance and the throughput. Mitigation of narrowband interference can make use of the transmitted training sequence.

Another objective of the present disclosure is to mitigate the effect of interference on trained UWB systems based on CS technique. Narrowband interference signals may have sparse representation in the DCT domain. The interest of the present disclosure is to suppress the most significant components of the NBI signal in the DCT domain. The utilized system model is the one proposed by Z. Wang, G. R. Arce, B. M. Sadler, J. L. Paredes, S. Hoyos, and Z. Yu, "Compressed UWB Signal Detection with Narrowband Interference Mitigation," in *IEEE Int. Conf. on UWB*, Vol. 2 pp. 157-160, September, 2008, incorporated herein by reference. In this research, the optimum pilot symbols distribution is investigated as well as the effect of each pilot group symbols is also studied. Moreover, the present disclosure evaluates the performance of the receiver in Z. Wang, G. R. Arce, B. M. Sadler, J. L. Paredes, S. Hoyos, and Z. Yu, "Compressed UWB Signal Detection with Narrowband Interference Mitigation," in *IEEE Int. Conf. on UWB*, Vol. 2 pp. 157-160, September, 2008, incorporated herein by reference in the presence of multiuser interference. The same signaling scheme (DS-TH) is used for multiple access.

When a random measurement matrix is applied in CS, the captured energy of the received UWB signal by a compressive detector may not be enough. The performance can be enhanced if the UWB signal structure is employed in the construction of the projection matrix. When structure is employed in designing the projection matrix, few measurements are required to get most of the received UWB signal energy. This is because the received UWB signal is sparse and located in low dimensional subspace. In addition, NBI can be represented as a sparse signal in the DCT domain. Since the length of the representation is limited, the coefficients in the DCT domain decay fast. The interest is to suppress the most significant ones.

The construction of an UWB transmitter is explained. Pilot symbol assisted modulation combined with DS spread spectrum and TH is applied for signaling purpose. Modeling of the interference source is discussed next. The UWB receiver design follows with compressive measurements and data detection. The coefficients of the NBI and UWB signal structure are estimated during the first and second stage of the pilot symbols respectively using MP algorithm. Simulation and results are disclosed.

An embodiment of the present model has an UWB signal path and an interfering signal path, see FIG. 10. The UWB transmitter consists of data symbols, DS code, TH code, and UWB pulse generators. The NBI transmitter comprises of a NBI symbols generator, followed by a modulation block. The transmitted UWB signal is convolved with the channel impulse response before being received. The received signal is also corrupted by NBI signal and thermal noise. The noisy signal goes through an ideal BPF that has bandwidth and center frequency matched to those of the intended signal to be received.

The system model is an I-UWB system in which binary symbols are represented by a sequence of pulses. The transmitted pulse, $\phi_U(t)$, can have different shapes. Unless otherwise specified the present disclosure uses the second derivative of the Gaussian pulse which has duration time $T_{Pulse}$ and unit energy. One binary symbol is transmitted through repeating $\phi_U(t)$ pulses in $N_f$ frames. Hence the duration time for one symbol, $T_s$, is $T_s = N_f T_f$, where $T_f$ is the frame duration. Each frame is further divides into $N_c$ chips, and each chip has $T_c$ duration.

For signaling purpose, pilot symbol assisted modulation merged with direct sequence spread spectrum (DS) and time hopping (TH) is used. There are $N_d$ symbols in each burst including $N_p$ pilot symbols and $N_s$ data modulated symbols, therefore $N_d = N_p + N_s$. The pilot symbols are divided into three groups, namely $N_{p1}$, $N_{p2}$ and $N_{p3}$. The first group symbols are used to estimate the NBI signal subspace, the second group symbols are applied to estimate the UWB signal subspace; and the last group symbols gives information about the channel. During the first pilot symbols, zeros are sent, while ones are sent during the other two. FIG. 11 represents the signaling scheme for the transmitted signal. Within each frame, the pulse is hopped and appeared in certain chips according to the TH code $c_n$. It also illustrates the format for one symbol time where the pulse appears in three different positions.

The transmitted signal for one burst can be represented mathematically as:

$$s(t) = \sum_{n=0}^{N_d N_f - 1} a_n b_{\lfloor n/N_f \rfloor} \sqrt{E}\, \phi_U(t - nT_f - c_n T_c) \quad (3\text{-}1)$$

where the DS code is $a_n \in \{\pm 1\}$. $b_{\lfloor n/N_f \rfloor}$ is the binary transmitted symbols, the TH code is $c_n \sim U[0, N_c-1]$ and E is the energy of the transmitted signal. As mentioned before $b_i = 0$ for $i \in [0, N_{p1}-1]$, $b_i = 1$ for $i \in [N_{p1}, N_p-1]$, and $b_i = \pm 1$ with equal probability for $i \in [N_p, N_d-1]$.

The none-periodicity introduced by the TH code gives a smooth shape for the frequency spectrum and avoids any spectral lines in the transmitted signal. The TH code also minimizes the interference between users in multiple access technique, where each user has a unique TH code.

The transmitted signal then passes through a multipath communication channel, $h(t)$, having $T_{med}$ maximum excess delay time with L paths, where $\alpha_l$ and $\tau_l$ are the attenuation, and delay associated with $l^{th}$ path.

$$h(t) = \sum_{l=0}^{L-1} \alpha_l \delta(t-\tau_l) \quad (3\text{-}2)$$

To ignored ISI, the chip duration is fixed such that it is greater than the transmitted pulse duration plus the maximum excess delay of the channel ($T_c > T_{Pulse} + T_{med}$). Although the UWB channel could have a large number of paths, only few paths are selected which contains most of the UWB channel's energy, see FIG. 8. Since there are many insignificant paths, UWB channels can be modeled as sparse channels due to the large transmission bandwidth.

The interference source, $v(t)$, consists of two main blocks as in FIG. 10. The first block generates the NBI symbols, and then the modulation is performed in the second block. The channel models for the intended UWB signal and the interferer in FIG. 10 may be the same or may be different. When they are the same, the IEEE802.11.4a model is used with different realizations. Some researchers used different channel for the interferer such as fast and frequency selective channel, or frequency nonselective slow fading channel. The interfering signal could be passed through a perfect channel and used additively like AWGN to jam the receiver. When more than one NBI are present, the interference signal, $v_i(t)$ for $i=1, 2, \ldots, N_v-1$, is modeled as the sum of $N_v$ interferers.

There are three main stages employed at the receiver side. The effect of the NBI is suppressed by designing a measurement matrix that uses the estimated NBI as a null subspace. In the first stage, the received signal is projected into a random measurement matrix. Since no UWB symbols are transmitted, the NBI's coefficients are estimated using CS. Subsequently, these coefficients are used to obtain the NBI signal subspace. In the next stage, the UWB signal subspace is constructed by making use of the projection matrix of the estimated NBI subspace through CS. Finally, a measurement matrix that combines the estimated null subspace of the NBI and the constructed UWB signal subspace is designed. This matrix has the ability to collect most of the received UWB signal energy as well as suppress the NBI if present.

The receiver basically consists of BPF, M mixer-integrators, and generalized likelihood ratio test (GLRT) detector. The received UWB signal is contaminated by white Gaussian noise $w(t)$ with two sided power spectral density (PSD), $$\frac{N_0}{2},$$

and narrowband interference, $v(t)$. The filter has one-sided bandwidth, $\Omega$, center frequency, $f_c$, and it affects only the noise. The output noise becomes $\tilde{w}(t)$, whereas the desired and interfering signals aren't distorted. The received signal at the output of the BPF is:

$$r(t) = \int_0^t h(t-\tau) s(\tau) d\tau + v(t) + \tilde{w}(t) \quad (3\text{-}3)$$

The received signal is processed by three different measurement matrices; denoted by $\Phi_i$, $i=1, 2, 3$, each of dimension M×N. They are constructed to achieve the mitigation and demodulation requirements.

Full knowledge of the direct sequence code, $\alpha_n$, and the time hopping code, $c_n$, is assumed at the receiver side. M Mixer-integrators are employed to get the compressive measurements, with integration period, $T_{prj}$, set as $T_{Pulse} + T_{med} \geq T_{prj} \geq T_{Pulse}$. The compressive measurements for the $n^{th}$ frame have to be started at $t = c_n T_c + (n-1) T_f$, and ended at $t + T_{prj}$. At this time the mixer-integrators are sampled at the same time, and then they reset to zero to be ready for the next frame.

The sampling frequency should fulfill the relation $$f_s = 2 \times \left( f_c + \frac{\Omega}{2} \right),$$

hence the data has length of $$N = T_{prj} f_s.$$

Since the present disclosure uses CS technique for two purposes which are ADC speed reduction and signal reconstruction, the sampling frequency becomes large because the transmitted signal is in the order of GHz. Actually, don't sample at rate fs because only the projected data goes through the ADC.

During the first pilot group symbols, the received signal get multiplied by $\Phi_1$ which has independent and identically distributed (i.i.d.) Bernoulli distribution. In this stage, no UWB symbols are transmitted and the subspace of the NBI signal can be estimated. After multiplication by the direct sequence code, the compressive measurements of the received $n^{th}$ frame during the first pilot symbols, $y_1[n]$, can be written as:

$$y_1[n] = a_n \Phi_1 r[n] = a_n \Phi_1 v[n] + a_n \Phi_1 w[n], n=0, \ldots, N_{p1} N_f - 1 \quad (3\text{-}4)$$

where $r[n]$ is the sampled received signal of the $n^{th}$ frame of size N×1. The digitized NBI and the digitized noise are $v[n]$ and $w[n]$ respectively, both of size N×1. The output $y_1[n]$ is a vector of size M×1. The previous equation can be rewritten as:

$$y_1[n] = a_n \Phi_1 C \zeta[n] + a_n \Phi_1 w[n] \quad (3\text{-}5)$$

where $C = [c_0, c_1, \ldots c_{N-1}]$ is the inverse DCT matrix, and $\zeta[n]$ is the DCT representation of $v[n]$. The estimated NBI coefficients, $\zeta[n]$, can be obtained in this stage based on $y_1[n]$ because the NBI has sparse representation in the DCT domain. Matching Pursuit (MP) algorithm is used to estimate those coefficients.

Suppose that $\tilde{\zeta}$ is defined as $\tilde{\zeta} = \sum_{n=0}^{N_{p1} N_f - 1} |\zeta[n]|$ and $\zeta_{max} = \max\{\tilde{\zeta}_0, \tilde{\zeta}_1, \ldots, \tilde{\zeta}_{N-1},\}$. The NBI subspace can be approximated as $C_v = [c_{n0}, c_{n1}, \ldots, c_{nj}]$, where $n_j \in \{i | |\tilde{\zeta}_i| > \mu \zeta_{max}\}$.

The most significant coefficients of the NBI in the DCT domain are suppressed by controlling the interference threshold, μ. If very large value for μ are assigned, the constructed NBI subspace will not suppress the interference effect. If it is too small, unnecessary suppression is done for the zero coefficients since the NBI is sparse. The projection matrix of the NBI subspace signal is constructed as:

$$P1/v = I_N - C_v(C_v^T C_v)^{-1} C_v^T \qquad (3\text{-}6)$$

The received signal is then multiplied by the second measurement matrix, $\Phi_2$, during the second group pilot symbols. The UWB signal structure or subspace is estimated in this stage. During the second pilot symbols, the compressive measurements will be:

$$y_2[n] = a_n \Phi_2 r[n] = \Phi_2 s + a_{n+\Delta N} \Phi_2 v[n+\Delta N] + a_{n+\Delta N} \Phi_2 w[n+\Delta N], \ n=0,\ldots,N_{p2}N_f-1 \qquad (3\text{-}7)$$

where $\Delta N = N_{p1}N_f$, and $s_{N\times 1}$ is the digitized noise free received signal $h(t) \otimes \phi_U(t)$ within $T_{prj}$, where $\otimes$ represents the convolution. The second measurement matrix is constructed as; $\Phi_2 = \Phi_1 P1/V$, consequently $\Phi_2 v[n+\Delta N] \approx 0$. As a result, the effect of the NBI is suppressed. The UWB signal subspace is constructed from $y_2[n]$ using MP algorithm. Averaging the second compressive measurement to reduce the noise is done using:

$$\bar{y}_2 = \frac{1}{N_{p2}N_f} \sum_{n=0}^{N_{p2}N_f-1} y_2[n] \qquad (3\text{-}8)$$

Because of the multipath channel, the received UWB signal is a shifted and scaled version of the transmitted UWB pulse, $\phi_U(t)$.

A dictionary, $\Psi_c$, can be designed such that each column is a time shifted version of $\phi_U(t)$. Let be the sampled form of $\Psi_c$ with a rate of $f_s$. Each column of $\Psi_u$ is normalized to have a unit energy. The $f^{th}$ column is given by:

$$\Psi_{uj}(n) = \phi_U(n/f_s - j/f_s), n=0,1,\ldots,f_s T_{prj} - 1 \qquad (3\text{-}9)$$

Only K paths with the largest gains out of the total UWB channel paths are considered. This gives the received signal sparse representation (K-sparse). As a result, the UWB signal structure can be represented as $s = H_u \theta_u$ where $H_u$ is a matrix of dimension N×K constructed from K relevant column vectors of $\Psi_u$, and $\theta_u$ is a K×1 vector of non-zero coefficients. Given $\Psi_u$, $\Phi_2$ and $y_2$, MP algorithm can be used to estimate the K vectors from $\Psi_u$ that construct the UWB signal subspace $\hat{H}_u$.

Finally, the third group pilot symbols and the data modulated symbols are multiplied by the third measurement matrix $\Phi_3$. This matrix has the ability to collect most of the received UWB signal energy as well as suppress the NBI if present. The construction of $\Phi_3$ utilizes the NBI and UWB subspaces using the formula:

$$\Phi_3 = G(\tilde{H}_u^T \tilde{H}_u)^{-1} \tilde{H}_u^T \qquad (3\text{-}10)$$

where G is an i.i.d. random matrix of dimension M×N, and $$\tilde{H}_u = P\frac{1}{V} \hat{H}_u.$$

The compressive measurements multiplied by $\alpha_n$ during both the third pilot group symbols and the data modulated symbols are given respectively by:

$$y_3[n] = \Phi_3 s + a_{n+\tilde{\Delta}N} \Phi_3 v[n+\tilde{\Delta}N] + a_{n+\tilde{\Delta}N} \Phi_3 w[n+\tilde{\Delta}N], \ n=0,\ldots,N_{p3}N_f-1 \qquad (3\text{-}11)$$

$$y_{dj}[n] = b_j \Phi_3 s + a_{n+\tilde{\Delta}N} \Phi_3 v[n+\hat{\Delta}N] + a_{n+\tilde{\Delta}N} \Phi_3 w[n+\hat{\Delta}N], \ n=0,\ldots,N_f-1 \qquad (3\text{-}12)$$

where $\tilde{\Delta}N = (N_{p1}+N_{p2})T_f$, $\hat{\Delta}N = (N_p+j)N_f$, and $b_j \in \{\pm 1\}$ is the data modulated with $j=0, 1, \ldots, N_s-1$. The term $\Phi_3 s$ gives information about the channel and it can be obtained from $y_3[n]$ within the same burst. Averaging $y_3[n]$ over multiple frames is used as a template to demodulate the transmitted symbols. The maximum likelihood estimation of $\Phi_3 s$ is given by:

$$\Phi_3 \hat{s} = \frac{1}{N_{p3}N_f} \sum_{n=0}^{N_{p3}N_f-1} y_3[n] = \Phi_3 s + a_{n+\tilde{\Delta}N} \bar{w} \qquad (3\text{-}13)$$

where $$\bar{w} = \frac{1}{N_{p3}N_f} \sum_{n=0}^{N_{p3}N_f-1} v[n+\tilde{\Delta}N] + w[n+\tilde{\Delta}N]$$

is a vector of length N×1 compromises of the sum of a WGN with variance $$\frac{N_0 \Omega}{N_{p3}N_f}$$

and the residual NBI which can be also modeled as Gaussian noise.

Since the transmitter sends $b_j \in \{\pm 1\}$ with equal probability, two hypotheses must be distinguished by the detector:

$$\mathcal{H}_0: y_{dj}[n] = -\Phi_3 s + a_{n+\tilde{\Delta}N} \Phi_3 v[n+\hat{\Delta}N] + a_{n+\tilde{\Delta}N} \Phi_3 w[n+\hat{\Delta}N], (b_j=-1), n=0,1,\ldots,N_f-1 \qquad (3\text{-}14)$$

$$\mathcal{H}_1: y_{dj}[n] = \Phi_3 s + a_{n+\tilde{\Delta}N} \Phi_3 v[n+\hat{\Delta}N] + a_{n+\tilde{\Delta}N} \Phi_3 w[n+\hat{\Delta}N], (b_j=1), n=0,1,\ldots,N_f-1 \qquad (3\text{-}15)$$

The statistics of the GLRT detector is defined as:

$$T(y_{dj}) = (\Phi_3 s + \Phi_3 \zeta_p)^T (N_0 \Omega \Phi_3 \Phi_3^T)^{-1} (b_j \Phi_3 s + \Phi_3 \zeta_d) \qquad (3\text{-}16)$$

where $$\zeta_p = \frac{1}{N_{p3}N_f} \sum_{n=0}^{N_{p3}N_f-1} w[n+\hat{\Delta}N] + v[n+\hat{\Delta}N],$$

and $$\zeta_d = \frac{1}{N_f} \sum_{n=0}^{N_f-1} w[n+\tilde{\Delta}N] + v[n+\tilde{\Delta}N].$$

The detector estimates $\hat{b}_j = 1$ if $T(y_{dj}) > 0$; otherwise $\hat{b}_j = -1$. The first bracket in the previous equation is the average of $y_3[n]$ over $N_{p3}N_f$ frames used as a template, whereas the last bracket represents the average of the measurement vector during the data transmission over $N_f$ frames.

Suppose that there are $m=1, 2, \ldots, N_u$ secondary users in addition to the primary user. The users transmit their information at the same time with the intended one and there is no delay of propagation, see FIG. 13. Each user has its own DS code, TH code, and data. Therefore, collision or interference occurs if the TH codes are matched. This may amplify the intended pulse, reduce its level or make it zero depend on the DS code, the information of the interfering users, the number of users as well as the TH codes relative to the current transmitted pulse of the intended user. The kth user has transmitted waveform over a burst represented by:

$$s^k(t) = \sum_{n=0}^{N_d N_f - 1} a_n^k b_{\lfloor n/N_f \rfloor}^k \sqrt{E} \, \phi_U(t - nT_f - c_n^k T_c) \quad (3\text{-}17)$$

where $a_n^k$ and $c_n^k$ are the DS, and the TH codes for the $k^{th}$ user. The other parameters are similar to those related to the intended user.

In a network, the average number of bits that are transmitted successfully or average rate of successful bit delivery is known as the throughput. In multiuser systems, the throughput decreases as the number of users increases. Throughput can be represented mathematically using the following formula:

$$\text{Throughput} = (1 - \text{BER}) R_s \quad (3\text{-}18)$$

where $R_s$ is the symbol rate in bps. In the simulation, the throughput is calculated for different number of the secondary users $N_u$.

In one embodiment of the present disclosure the mitigation of NBI in trained UWB systems is evaluated. The diagram in FIG. 14 depicts the main steps that are used to investigate the mitigation process based on CS. As mentioned the transmission sequence contains the three groups of pilot symbols, and the data modulated symbols. DS-TH is used for signaling where each symbol is repeated in $N_f$ frames at different chips. The signal then goes through an IEEE802.11.4a channel. The NBI system also generates its own symbols, and sends them over an NBI channel.

At the receiver side, the received UWB signal is captured using BPF. The measurement is taken using three measurement matrices. First the corrupted received signal at the BPF's output is multiplied by $\Phi_1$ which has Bernoulli distribution. This measurement vector is used to estimate the NBI subspace using CS. Second, the received signal is multiplied by $\Phi_2$ which is constructed according to the estimated NBI subspace. Based on this measurement vector, the UWB signal subspace is estimated using CS. Third, the received signal is multiplied by $\Phi_3$ that has the ability to null out the NBI and collect the UWB's signal energy. After averaging over the third group pilot symbols, the measurement vector now is used as a template in the demodulation process. Again the received signal is multiplied by $\Phi_3$ but the measurement vector is applied as the input to the GLRT detector with previous template. Finally, the detector does the decision process.

An investigation of the pilot symbols distribution is considered. Then fix the distribution of the pilot symbol and study different related parameters such as the number of frames per symbol, $N_f$, and the interference threshold, $\mu$. After that, the performance of the system is evaluated under the effect of different unlicensed and licensed NBIs. Finally, the system is tested in the presence of both NBI and multiuser interference. In addition, system throughput is examined under the effect of multiuser interference as well as NBI's effect.

To investigate the best distribution of pilot symbols in the presence of NBI, the following parameters are selected. The transmitted signal is the second derivative Gaussian pulse with duration $T_{pulse} = 0.75$ ns and center frequency, $f_{cU} = 3$ GHz. The bandwidth of the receiver BPF is 8 GHz; hence the sampling frequency is GHz. The IEEE802.11.4a Channel Model 1 (CM 1) which represents residential line-of-sight (LOS) environment is used. One thousand symbols ($N_d = 1000$) are transmitted over many realizations randomly generated from CM1. The mean root square delay spread is about 17 nanosecond, and the channel response is normalized to have unit energy. The projection time covers the whole received multipath arrivals. The sampling rate is reduced to M/N=20% through CS, where N is the length of the received signal. The chip duration is $T_c = 32$ ns, and the number of chips is $N_c = 25$. The frame duration is $T_f = T_c N_c = 800$ ns, and the number of frames per symbol is $N_f = 5$, therefore $T_s = T_f N_f = 4$ μs. The delivered data rate is $R_s = 250$ kbps. The total number of pilot symbols is $N_p = 45$ and interference threshold, $\mu = 10^{-1}$. The performance is evaluated for SNR=−21 dB and SIR=−20 dB. All those parameters are fixed in the simulation unless stated otherwise.

The signal power is calculated over the whole time spanned by the multipath arrivals and the noise is added over the total duration time. The added noise will only have effect during the signaling time. This is why communication can be achieved at relatively low SNR.

In the following, the present disclosure considers three different cases. In every case, one pilot at a time is fixed and trade off the remaining two to keep $N_p$ constant. The fixed pilot is assigned moderate value. The results are depicted in three figures. The figures are divided into two subplots. The difference between the subplots is in the center frequency of the NBIs. The center frequencies of the NBIs are either $f_{cI1} = f_{cI2} = 1.6$ GHz or $f_{cI1} = f_{cU} = 3$ GHz. Each subplot contains three different NBIs with different bandwidth combinations. Three different bandwidth combinations are investigated: ($\Omega_{I1} = 20$ MHz, $\Omega_{I2} = 10$ MHz), ($\Omega_{I1} = 40$ MHz and $\Omega_{I2} = 20$ MHz) and ($\Omega_{I1} = 100$ MHz $\Omega_{I2} = 50$ MHz). For fair comparison all interferers are adjusted to have the same power. The results are illustrated in terms of BER as a function of $N_{p1}$ or $N_{p2}$. Note as the number of symbols in one group increase the other will decrease to keep $N_p = 45$.

First, the number of pilot symbols in the third group, $N_{p3} = 10$, is fixed to evaluate the number of pilots required for subspaces estimation for the NBI and UWB signals, see FIG. 15. The BER curves as function of $N_{p1}$ can be divided into three different regions. For values of $N_{p1}$ between 0 and 5 there is a gradual improvement in the system performance. From 5 to 15 symbols the tradeoff between $N_{p1}$ and $N_{p2}$ has a minimal effect on the performance. As $N_{p1}$ increases more than 15 the performance starts to degrade at a slow pace. The symbols in $N_{p1}$ are necessary to reduce the NBI's effect, however communication can still be achieved at $N_{p2} = 0$.

In the second case, the NBI signal subspace estimation and the acquired channel information are investigated by fixing $N_{p2} = 15$. FIG. 16 indicates that no communication is possible when neither NBI signal subspace estimation nor channel information is being used. The NBI that has large bandwidth ($\Omega_{I1} = 100$ MHz $\Omega_{I2} = 50$ MHz) becomes less sparse since more coefficients appear in the DCT domain. Consequently, more symbols are required in $N_{p1}$ to optimize the BER as the two subplots demonstrate. The situation is even worse when the two frequencies are unequal. Increasing $N_{p3}$ results in a gradual reduction in the BER provided that $N_{p1}$ is not less than the minimum requirements. For the simulated scenarios, a minimum of $N_{p1} = 5$ is required.

Finally, the UWB signal subspace estimation and the channel information are studied when $N_{p1}$ is fixed as depicted in FIG. 17. The third group, $N_{p3}$, must not be zero in order to know the channel characteristics and consequently have an acceptable system performance. On the other hand, communication can be established at $N_{p2} = 0$ in all bandwidth combinations. For the simulated scenarios, the BER decreases as $N_{p2}$ increases until $N_{p2}$=15, and $N_{p3}$=25.

From the previous simulations, the optimal distribution is a weak function of the center frequency or bandwidth of the NBI. The system performance is a strong function of $N_{p3}$ as FIG. 16 and FIG. 17 illustrate. For limited power interference, the BER degrades as the center frequency of the NBI is shifted to $f_{c/1}$=$f_{cU}$. The BER degrades as the center frequency of the NBI is shifted to $f_{c/1}$=$f_{cU}$. However, the degradation due to increasing the NBI's bandwidth together with shifting the NBI's center frequency is larger because it results in more significant coefficients of the NBI in the DCT domain. The sparsity is also affected and subsequently, the mitigation of NBI won't be the same. The distribution of the pilot symbols in Z. Wang, G. R. Arce, B. M. Sadler, J. L. Paredes, S. Hoyos, and Z. Yu, "Compressed UWB Signal Detection with Narrowband Interference Mitigation," in *IEEE Int. Conf. on UWB*, Vol. 2 pp. 157-160, September, 2008, incorporated herein by reference for the NBI that has $f_{c/1}$=$f_{c/2}$=1.6 GHz and ($\Omega_{I1}$=20 MHz, $\Omega_{I2}$=10 MHz), was $N_{p1}$=5, $N_{p2}$=30 and $N_{p3}$=10 which isn't optimal as FIG. 15 shows. Based on the simulations, the distribution at $N_{p1}$=5, $N_{p2}$=15 and $N_{p3}$=25 leads to better performance as shown in FIG. 16 and FIG. 17.

In the remaining simulations, the pilot symbols distribution is fixed according to the previous investigations as: $N_{p1}$=5, $N_{p2}$=15 and $N_{p3}$=25. The effect of the frame repetition, $N_f$, is examined in FIG. 18. The performance is evaluated for $f_{c/1}$=$f_{c/2}$=1.6 GHz and ($\Omega_{I1}$=20 MHz and $\Omega_{I2}$=10 MHz). Similar behavior is expected for the other combinations of interferers. The BER is reduced as more frames being used to represent one symbol. With no repetition, around 9 dB more is needed to have similar performance of $N_f$=5. The simulation shows that, increasing $N_f$ from 5 to 10 saves around 3 dB at very low BER. Note that this is not affair comparison as the rate is reduced by a factor of 2.

In the preceding simulations, the interference threshold, $\mu$=$10^{-2}$, was fixed. The effect of this factor on the system performance is plotted in FIG. 19. For the region where 0<$\mu$<0.04, the performance improves as $\mu$ increases. The small improvement is because the suppressed coefficients used to construct the NBI subspace is decreased. Few columns are being involved in the construction of the estimated NBI subspace, the performance enhances. Herein the noisy coefficients are eliminated and consequently the noise level is reduced. This is equivalent to avoid picking up the non-significant coefficients and avoid collecting more noise. For $\mu$>0.1, the performance starts to degrade. In those range, the constructed NBI subspace is not enough to suppress the interference effect. In other words, few NBI's coefficients are involved in the construction process.

The third part of the simulation addresses different NBI types that might jam the UWB systems. Different NBIs are studied under the same distribution of the pilot symbol. The unlicensed NBIs to be investigated are considered as the sum of two QPSK signals. The effect of the center frequency of the NBI and its bandwidth are studied.

FIG. 20 demonstrates six different scenarios. Sold lines are used to represent the three traces where the center frequencies of the two QPSK jammers are $f_{c/1}$=$f_{c/2}$=1.6 GHz, while dashed lines are used when the center frequencies are 3, and 1.6 GHz. When one center frequency of the NBI ($\Omega_{I1}$=20 MHz, $\Omega_{I2}$=10 MHz) matches $f_{cU}$, this results in a loss of 1 dB at BER=1×$10^{-4}$. For the $f_{c/1}$=$f_{c/2}$=1.6 GHz NBI, no more than 2 dB is needed to work at BER=$10^{-4}$ if the bandwidth of the NBI increases from ($\Omega_{I1}$=20 MHz, $\Omega_{I2}$=10 MHz) to ($\Omega_{I1}$=100 MHz, $\Omega_{I2}$=50 MHz). However, more than 8 dB is needed if the bandwidth of the NBI increases from ($\Omega_{I1}$=20 MHz, $\Omega_{I2}$=10 MHz) to ($\Omega_{I1}$=200 MHz, $\Omega_{I2}$=50 MHz) and at the same time $f_{c/1}$ changes to match $f_{cU}$. The considered distribution of the pilot symbols isn't optimal for the last case; hence such huge difference is obtained.

Next, the system performance is investigated for different licensed NBIs. FIG. 21 considers WiMAX, IEEE802.11a WLAN (WLANa), IEEE802.11b WLAN (WLANb), and Bluetooth. Those NBIs have fixed center frequencies and bandwidths according to the regulation as discussed.

WLANa signal has the least effect in system performance because it operates at 5.2 GHz away from the center frequency of the transmitted pulse at $f_{cU}$=3 GHz, see FIG. 21. On the other hand, the performance degradation due to WLANb at 2.4 GHz is large which is very close to transmitted pulse at 3 GHz. Although Bluetooth signal has very low bandwidth, the randomness of the center frequency of the Bluetooth signal causes large degradation in the performance. It is desired to point out that Bluetooth and the estimation process of its subspace are changed in every transmission.

In the last part, the system is evaluated in the presence of multiuser interference in addition to the NBI. The utilized signaling scheme for the multiuser system is DS-TH coding. Synchronized data transmission is assumed for the intended and the secondary user(s). The NBI has center frequencies of the $f_{c/1}$=$f_{cU}$=13 GHz, $f_{c/2}$=1.6 GHz with bandwidth ($\Omega_{I1}$=40 MHz and $\Omega_{I2}$=20 MHz). FIG. 22 shows that the system performance degrades as more users are present together with the NBI. For the given system parameters, two secondary users resulted in a minimal effect on the BER. This indicates the ability of the DS-TH code to reduce the interference. This is a direct function of the system's spreading gain.

Finally, throughput versus the SNR is plotted in FIG. 23 as the number of the interfering user changes. As expected, throughput decreases when more users jam the intended one and vice-versa. At large SNR, throughput is almost constant as one has up to five secondary users. Moreover, the reduction in the throughput at such SNR is lower than 10 kbps as the number of users increases up to 25 users. At very low SNR, the effect of the multi user interference becomes large and clear. This multiuser study quantifies the amount of degradation due to the presence of other users. It also serves as a motive for future study where the entire compressive sensing algorithm is redesigned to possible reject other users. The challenge is in the similarity between the intended dictionary and the one to be nullified.

Here, the mitigation of NBI in trained UWB systems is investigated based on CS. The speeds of the ADC as well as the NBI effects are reduced through CS. This part of the present disclosure first investigates the optimum pilot symbols distribution as well as the effect of each pilot group symbols. The present disclosure concludes that there are a minimum required number of symbols in the first group $N_{p1}$ after which the performance saturates. For the considered scenarios, $N_{p1}$=5 was enough to achieve good system performance at low SIR and low NBI's bandwidth, this value is satisfied for weaker NBIs i.e. SIR>−20 dB. Communications can be achieved with $N_{p2}$=0. However, the performance can be enhanced if the UWB signal structure is employed in the construction of the projection matrix, i.e. $N_{p2}$>0. The number of pilot symbols in the third group $N_{p3}$ is directly proportional to the performance.

The present disclosure studied different parameters that may affect the system performance such as the number of frame per symbol and the interference threshold, $\mu$. The BER is reduced as more frames are being used to represent one symbol. Simulations also show that the value of the interference threshold should be chosen carefully. The performance improves as μ increases over a certain range where the number of the suppressed coefficients used to construct the NBI subspace is decreased. Herein the present disclosure eliminates the noisy coefficients and consequently the noise level is reduced.

The mitigation process was also applied when licensed NB services are present. Based on the simulation, the performance of the system degrades as the NBI's center frequency locates closer to that of the transmitted pulse. Generally, increasing the NB I's bandwidth will reduce the sparsity of the NBI signal. More than one NBI with unequal center frequencies also results on a reduction in the sparsity of their equivalent NBI signal. Therefore, the interference threshold should be changed or the system needs to redistribute the pilot symbols to have acceptable performance.

Furthermore, the system behavior is studied in the presence of multiuser interference besides the NBI. As expected, simulation shows that when more users being active the system performance degrades and vice-versa. This also causes a reduction in the system throughput. Future optimization for CS in the presence of multiusers is motivated.

Mitigation of Narrowband Interference in Blind Systems

Channel estimation is an important element that determines the performance of a given communications system especially in the presence of interference. Channel estimation can be done by training the system with a priori known data or it can be done blindly. Communication systems that don't use training sequences are known as blind systems. They are capable to do several processes blindly such as channel estimation, synchronization, and demodulation. The effect of the NBI on UWB systems can be eliminated using CS in two different systems; trained systems and blind systems. In one embodiment, the present disclosure concentrates on blind systems see A. Oka and L. Lampe, "A Compressed Sensing Receiver for Bursty Communication with UWB Impulse Radio," in *Intl. Conf. on Ultra-Wideband*, pp. 279-284, September 2009; A. Oka and L. Lampe, "Compressed Sensing Reception of Bursty UWB Impulse Radio is Robust to Narrow-Band Interference," in *IEEE Global Telecommunications*, December, 2009; and A. Oka and L. Lampe, "Compressed Sensing Reception of Bursty UWB Impulse Radio is Robust to Narrowband Interference," in *IEEE GLOBECOM*, November-December 2009, each incorporated herein by reference.

One objective of this part of the present disclosure is to study the performance of CS in blind UWB systems in the presence of NBI. Specifically, this part of the present disclosure studies the performance for different licensed and unlicensed NBIs and extends the mitigation technique in A. Oka and L. Lampe, "Compressed Sensing Reception of Bursty UWB Impulse Radio is Robust to Narrow-Band Interference," in *IEEE Global Telecommunications*, December, 2009, incorporated herein by reference for two NBIs. The speeds of the ADC as well as the NBI effects are reduced through CS. The channel models in A. Oka and L. Lampe, "Compressed Sensing Reception of Bursty UWB Impulse Radio is Robust to Narrow-Band Interference," in *IEEE Global Telecommunications*, December, 2009, incorporated herein by reference for the UWB signal and the NBI were fixed with only two different realizations. In the present disclosure, the channels are randomly selected from different UWB channel realizations in every burst transmission. The present disclosure evaluates the effect of the burst size, the type of the modulated window and the baud rate. The present disclosure also goes over the parameters that are related to the mitigation process such as the NBI's bandwidth and bandwidth of the transmitted pulse.

The present disclosure addresses the problem of utilizing CS to blind UWB system in the presence of NBI. The configuration of UWB transmitter is explained first. The interference source follows next with some details. More details about NBI modeling are mentioned. The receiver has two main parts, analog-front-end and DSP-back-end which are clarified in details. Since the major processes are done in the receiver, all functions are elaborated and the constructions of the related blocks are explained. Simulation and some results are given.

UWB Transmitter Configuration

The proposed system contains two main transmission paths, UWB signal path and interference path as shown in FIG. 24. The UWB signal's transmitter consists of UWB symbol generator, UWB pulse shaper, UWB channel, and signal attenuator. The interfering signal has a similar path. The received signal is corrupted by NBI signal and thermal noise. The corrupted signal goes through an ideal BPF that has bandwidth and center frequency matched to those of the intended signal to be received.

The transmitter sends burst of data represented by a burst of pulses. The transmitter comprises three blocks, including baud clock, payload bits, and IR pulse generator as shown in FIG. 24. The baud clock generates a clock signal at frequency $f_{baud}=1/T_{baud}$. It determines the timing of the pulse within the same burst. Moreover, the start of every burst is also set by this clock through down-conversion of its frequency to $f_{burst}$. The payload bits block produces information bits, $B^k$. In every burst, the transmitter sends K pulses after that it remains silent till the start of the next burst. The supplied bits, drown equally probable from $\{+1, -1\}$, amplitude modulate an IR pulse, $\phi_U(t)$. The pulse shape of UWB signal is generated by modulating a Hanning window with an RF carrier at the desired center frequency. Thus, the pulse $\phi_U(t)$ will have a center frequency $f_{cU}$, bandwidth $\Omega_U$ and interval $T_{pulse}$.

The time and the frequency domain of the modulated pulse is plotted in FIG. 26. The pulse has pulse duration, $T_{pulse}=1$ ns, center frequency, $f_{cU}=4$ GHz, and a 6-dB bandwidth of about $\Omega_U=2$ GHz.

The correct TOA, $T_d$, for each burst is uniformly distributed in the interval $[0, \gamma]$. The transmitter sends K pulses per burst per transmission. Then it keeps silent during a period of $T_{burst}$. After that, it sends pulses, followed by the silent period. The process continues till the transmitter completes sending all the information.

In FIG. 27, illustration for three burst transmission is sketched where there are four bits per burst. The transmitted waveform for a burst of data transmission can be written as:

$$s(t)=\Sigma_{k=0}^{K-1} B^k \phi_U(t-k T_{baud}-T_d) \quad (4-1)$$

The UWB waveform is then passed through an UWB channel, $c_U(t)$, according to IEEE802.15.4a channel model CM1 presented in the present disclosure. The impact of path-loss due to distance between the UWB transmitter and the UWB receiver, $d_U$, is represented by d–p/U where p is the path-loss exponent.

Interference Configuration

The interfering symbols are generated at rate $1/T_1$, where $T_1$ is the baud rate of the NBI. As for UWB signal, the symbols are shaped first using $\phi_1(t)$. Then the interfering signal, v(t), is passed through channel $c_1(t)$. The channel of the NBI might be an IEEE802.11.4a channel model as used for the UWB signal but with different realization. Alternatively, it may be other channel model as FIG. 7 shows that perfect channel can be also used. The impact of path-loss due to the distance between the NBI and the UWB receiver, $d_1$, is represented by d–p/U.

UWB Receiver Configuration

The received signal is contaminated by both two sided PSD, $N_0/2$, additive White Gaussian Noise (AWGN), $w(t)$, and narrowband interference, $v(t)$; see FIG. 24. A correlator receiver with digital notch filter is employed to detect the transmitted signal and mitigate the NBI. The receiver in FIG. 28 has two main parts, analog front-end and DSP back-end. Those parts are presented with more details in the present disclosure. The DSP back-end applies simple quadratic problem optimization. Quadratic programs can be easily solved by optimization techniques like interior-point-methods.

In blind systems, CS is used to achieve two main things. The first one is reducing the speed of the ADC or the sampling rate. The other is the utilization of a sparse signal to detect a certain waveform's structure. According to the present disclosure when the length of a signal is N samples, according to Nyquist theorem it requires at least M mixer-integrators to reconstruct the original shape of the signal being transmitted where M≥N. However, with M<<N the original signal can be—with high probability—estimated perfectly without degradation using CS. Hence the speed of the ADC is reduced to by a factor of M/N. The transmitted signal contains K nonzero samples and the test functions are also sparse in the frequency domain. The sparsity of the transmitted signal helps in the demodulation process, while the sparsity of the test functions emphasis that the NBI has only small effect in the measurements being taken. Subsequently the location of the NBI is detected as well as its effect is effectively eliminated.

The analog front end part contains a BPF and M mixer-integrators. Each mixer compares the signal with one of the basis. The receiver first utilizes BPF, $g(t)$, to capture the intended UWB signal and limit the noise. The BPF should have a center frequency which coincides with the frequency of the desirable UWB signal $f_c$ and bandwidth equal to the bandwidth of the transmitted UWB signal $\Omega$, i.e. $\Omega_U$ and $f_c = f_{c_U}$. FIG. 29 demonstrates the time and the frequency domain of a BPF with a center frequency of 4 GHz and almost a flat bandwidth around 2 GHz. The design of the filter should ensure that the desired UWB signal passes the filter without distortion.

Ignoring the path-loss, the signal at the output of the BPF can be written as:

$$r(t) = \sum_{k=0}^{K-1} B^k h(t - k T_{baud} - T_d) + w(t) + i(t) \quad (4-2)$$

where $h(t) = \phi_U(t) * c_U(t) * g(t)$ is the total impulse response of length denoted by $\lambda_h$ second. The last two terms are the response of the filter to the noise and to the interference respectively. M mixer-integrators follow the BPF with highly frequency selective test functions. The number of correlators is smaller than required by Shannon-Nyquist sampling theorem. The output from those mixers is taken simultaneously at $t = \lambda_h + (K-1) T_{baud}$.

The test functions $\Psi \in \mathbb{R}^{M \times N}$ are sinusoidal waveforms of amplitude $1/\sqrt{N}$ designed to have a rapid decay through windowing technique. In addition, their frequencies are deterministically and uniformly distributed in the interval $$\left[ f_c - \frac{\Omega}{2}, f_c + \frac{\Omega}{2} \right].$$

so they are sparse in the frequency domain. Tukey window or tapered cosine, $w[n]$, is used here, to be compared with see A. Oka and L. Lampe, "Compressed Sensing Reception of Bursty UWB Impulse Radio is Robust to Narrow-Band Interference," in *IEEE Global Telecommunications*, December, 2009, incorporated herein by reference where the equation for computing its coefficients is given by:

$$w[n] = \begin{cases} \frac{1}{2}\left[1 + \cos\left(\frac{2\pi}{\alpha'}\left[n - \frac{\alpha'}{2}\right]\right)\right], & 0 \le n < \frac{\alpha'}{2} \\ 1, & \frac{\alpha'}{2} \le n < 1 - \frac{\alpha'}{2} \\ \frac{1}{2}\left[1 + \cos\left(\frac{2\pi}{\alpha'}\left[n - 1 + \frac{\alpha'}{2}\right]\right)\right], & 1 - \frac{\alpha'}{2} \le n \le 1 \end{cases} \quad (4-3)$$

The sampled $m^{th}$ test function multiplied by the window can be written as:

$$\psi_i = \frac{1}{\sqrt{N}} \sin\left(\frac{2\pi f_1 n}{f_s}\right) w[n], \, n = 0, 1, \ldots, N-1, \quad (4-4)$$

$$\forall \, i = 0, 1, \ldots, M-1$$

The shape of this window is controlled by a factor $0 \le \alpha' \le 1$. The window becomes a rectangle window when $\alpha' \le 0$ and resembles a Hanning window if $\alpha' \ge 1$. Hence the shape of function approximately doesn't change if the controlled factor is greater than one or lower than zero. FIG. 30 represents the frequency domain for three basis functions designed for three values of $\alpha' = 0.1$, 0.5 and 0.9. By making use of Tukey window, the functions get narrower as $\alpha'$ increased. The basis functions must be known at the DSP back-end; however they are simple because they don't require any tuning.

Beside the sinusoidal waveforms, the basis functions can be other signals. The present disclosure focuses on the sinusoidal signals explained previously. Unless otherwise stated, the controlled factor is fixed to be $\alpha' = 0.9$.

For the quantity $$\frac{M}{N} \frac{f_s}{2\Omega},$$

if sample at the Nyquist frequency, $f_s$ should equal to $2\Omega$. When M=N, there is no loss and the Nyquist rate is achieved. While the bandwidth is calculated at the 3 dB point, a factor, $\alpha$, is injected to the quantity to be $$\frac{M f_s}{2\alpha \Omega N}.$$

This factor is included to enhance and support practical pulses because there are no ideal band-limited pulses. The factor $$\frac{M f_s}{2\alpha \Omega N^*}$$

is called the sampling-factor with $\alpha = 1.5$. Perfect sampling will occur when $$\frac{M f_s}{2\alpha \Omega N^*} = 1,$$

while $$\frac{Mf_s}{2\alpha\Omega N^*} < 1$$

represents the under-sampling case. In the last case where M<<N, the sampling rate at the receiver side is reduced further and the receiver complexity is reduced.

The output of the $m^{th}$ mixer is given as:

$$y_m = \int_0^{\lambda_h + \gamma + (K-1)T_{baud}} r(t)\psi_m(t)\,dt \qquad (4\text{-}5)$$

The measurement vector $y=[y_0, y_1, \ldots y_{M-1}]$ is used in the DSP back-end to demodulate the payload, $B^k$, via QP algorithm.

The main objective of the DSP back-end is to estimate the payload transmitted information vector $B=[B^0, B^1, B^{K-1}]$ and actual TOA uncertainty $\hat{Y}$. When an NBI(s) signal is presented in the band of interest, correlating the test functions with the received signal gives a vector with large value(s) whenever the NBI and any one of the test functions have the same frequency. The first task is to find the position of this value. The location of the interferer is detected then its effect is reduced by a digital notch filter. Since the affected measurements are dropped, lose small amount of the UWB signal's energy may be lost. However, using such rapidly decaying basis will ensure that the loss is limited.

Suppose that the number of interferers is denoted by $n_I$. An algorithm searches for the index or the indices of the maximum absolute measurement value(s) in the measurement vector y using the relation:

$$\hat{m}_i = \mathrm{argmax}_{m \in \{0,1,\ldots M-1\}} |y_m|, i=1,2,\ldots n_I \qquad (4\text{-}6)$$

When $n_I=1$, let D be an even number, the notch filter drops D+1 measurements around the index $\hat{m}$ resulting in $y_{notched} \in \mathbb{R}^{M-(D+1)}$, with the proper sub-matrix of $\Psi$.

$$y_{notched} = \left[y_0, y_1, \ldots, y_{\hat{m} - \frac{D}{2} - 1}, y_{\hat{m} + \frac{D}{2} + 1}, \ldots, y_{M-2}, y_{M-1}\right] \qquad (4\text{-}7)$$

$$\Psi = \begin{bmatrix} \psi_{11} & \psi_{12}, \ldots, & \psi_{1N} \\ \vdots & \vdots & \vdots \\ \psi_{(\hat{m}-\frac{D}{2}-1)1} & \psi_{(\hat{m}-\frac{D}{2}-2)2}, \ldots, & \psi_{(\hat{m}-\frac{D}{2}-1)N} \\ \psi_{(\hat{m}+\frac{D}{2}+1)1} & \psi_{(\hat{m}+\frac{D}{2}+1)2}, \ldots, & \psi_{(\hat{m}+\frac{D}{2}+1)N} \\ \vdots & \vdots & \vdots \\ \psi_{M1} & \psi_{M2}, \ldots, & \psi_{MN} \end{bmatrix} \qquad (4\text{-}8)$$

A major issue is how to set the value of D? The value of D is related to the bandwidth of UWB signal, $\Omega_U$, bandwidth of NBI signal, $\Omega_I$, and the number of measurements, M. It can be also related to $\Delta$ which is the frequency band that separates any two successive test functions, $$\Delta = \frac{\Omega_U}{M}.$$

Hence, it may be written $$D = \beta \frac{\Omega_I}{\Delta},$$

where $\beta$ is a safety factor to account for leakage into adjacent measurements. The value of $\beta$ is set to 4 as in see A. Oka and L. Lampe, "Compressed Sensing Reception of Bursty UWB Impulse Radio is Robust to Narrow-Band Interference," in *IEEE Global Telecommunications*, December, 2009, incorporated herein by reference.

Depending on the indices of the maximum absolute values in the measurement vector, there might be an overlapping between the notched measurements when $n_I=2$ for example. Consequently the notched vector may not be $y_{notched} \in \mathbb{R}^{M-(D_1+1+D_2+1)}$. Let the index or the location of the second maximum absolute measurement value be greater than the index of the first maximum absolute measurement value, mathematically $\hat{m}_2 > \hat{m}_1$. If there is no overlapping, the notched measurement vector is written as:

$$y_{notched} = \left[y_0, y_1, \ldots, y_{\hat{m}_1 - \frac{D_1}{2} - 1}, \right. \qquad (4\text{-}9)$$
$$\left. y_{\hat{m}_1 + \frac{D_1}{2} + 1}, \ldots, y_{\hat{m}_2 - \frac{D_2}{2} - 1}, y_{\hat{m}_2 + \frac{D_2}{2} + 1}, \ldots, y_{M-1}\right].$$

In this case, because of the first interferer the measurements $$\hat{m}_1 - \frac{D_1}{2}, \hat{m}_1 - \frac{D_1}{2} + 1, \ldots, \hat{m}_1 + \frac{D_1}{2} - 1, \hat{m}_1 + \frac{D_1}{2}$$

are notched. Additionally, the measurements $$\hat{m}_2 - \frac{D_2}{2}, \hat{m}_2 - \frac{D_2}{2} + 1, \ldots, \hat{m}_2 + \frac{D_2}{2} - 1, \hat{m}_2 + \frac{D_2}{2}$$

are dropped because of second the interferer. It is clear that no overlapping occurs when $$\hat{m}_2 - \frac{D_2}{2} > \hat{m}_1 + \frac{D_1}{2}.$$

Although, there is an overlapping if $$\hat{m}_2 - \frac{D_2}{2} \leq \hat{m}_1 + \frac{D_1}{2}.$$

Through either knowing the number of the presented interferers or finding the magnitudes which are larger than a specified threshold (the number of the active interferers), can be determined. The affected points are then subtracted and removed by digital notch filter employed in the DSP back-end. Therefore the interference signal is effectively mitigated.

Let $f_s$ be a virtual sampling rate that is large enough, and the sampling time $T_s=1/f_s$. Since the length of the channel impulse response is $\lambda_h$ seconds, the number of samples in the response will be $\Lambda_h=[\lambda_h f_s]$ samples. The discrete time representation of the channel can be written as $h[n]=[h[0], h[1], \ldots, h[\Lambda_h-1]]^T$. The maximum TOA uncertainty, $\gamma$, and the baud interval, $T_{baud}$, are constructed to be multiple of $T_s$. Hence the number of samples in the maximum possible TOA uncertainty becomes $\Gamma=\gamma f_s$ samples, and the samples between two consecutive bits will be $N_{baud}=f_x T_{baud}$ samples. While each transmission includes K bits and $\Gamma$ maximum possible TOA uncertainty, the maximum length of the payload is $\Lambda_x=\Gamma+(K-1)N_{baud}$ samples. Because of the convolution process, the maximum number of samples in each burst including the channel is $N=\Lambda_h+\Lambda_x-1$.

Additionally, the actual TOA uncertainty quantization is $Y=\text{round}(T_d f_s)$ samples. Small quantization error occurs which can be ignored when the sampling rate is large enough.

The received sampled waveform, $r \in \mathbb{R}^N$, becomes:

$$r = \mathcal{H} x + w + i \qquad (4\text{-}10)$$

where i, $w \in \mathbb{R}^N$ are the sampled forms of i(t) and w(t), respectively. $\mathcal{H} \in \mathbb{R}^{N \times \Lambda_x}$ is the convolutional matrix (Toeplitz form) of n[n] as in A. Oka and L. Lampe, "Compressed Sensing Reception of Bursty UWB Impulse Radio is Robust to Narrowband Interference," in *IEEE GLOBECOM*, November-December 2009, incorporated herein by reference.

$x \in \mathbb{R}^{\Lambda_x}$ is the virtual discrete time representation of the payload with K nonzero samples (K-sparse). Each sample has a random amplitude of $\{+1, -1\}$, and has a random position separated by $N_{baud}$ samples; mathematically $\Lambda^k = \gamma + kN_{baud}$, $k=0, 1, \ldots, K-1$. Since the samples are spaced equally by $N_{baud}$ knowing the location of the first bit handles the locations of the remaining ones provided $N_{baud}$. Hence the effective sparsity of the signal is only one rather than K. The sampled measurement vector, y, is the simultaneous sampling of the output of all correlators after multiplying the received signal by test functions which can be written as:

$$y = \Psi r = \Psi \mathcal{H} x + \Psi w + \Psi i \qquad (4\text{-}11)$$

Assume that all transmitted signals $x \in \mathbb{R}^{\Lambda_x}$ are equiprobable and are contained in the set $\chi$. This set has burst length of $\|x\|_0 = K$. The K nonzero entries of level $\{-1, +1\}$ are equally spaced by $N_{baud}$ samples. The locations of those nonzero samples are calculated based on the relation: $l^k = l^0 + kN_{baud}$ where $k=0, 1, \ldots, K-1$ and $l^0 \in [0, \Gamma]$, as FIG. 31 depicts that. There is a one-to-one mapping. To sum up, any possible transmitted signal, $\{-1, +1\}^K$, has its own payload and random TOA uncertainty (B,Y) which is mapped in the set $\chi$ to the corresponding vector x(B,Y). Therefore, the ML algorithm can be used to estimate the received discretized signal $\hat{x}$ first. Then the result is mapped to estimate the payload $\hat{B}(\hat{x})$ and TOA $\hat{Y}(\hat{x})$, in other words $P(y|B,Y)=P(y|x)$.

Let us ignore the interference term in equation above for the time being. Given x was transmitted, the ML demodulator used to detect the intended signal will be:

$$\hat{x} = \underset{x \in \chi}{\arg\min} (y - \Psi \mathcal{H} x)^T (\Psi \mathcal{G} \mathcal{G}^T \Psi^T)^{-1} (y - \Psi \mathcal{H} x) \qquad (4\text{-}12)$$

where $\mathcal{G}$ is the convolutional matrix (Toeplitz form) of g(t). Let $\xi[n]$ be a vector that represents one of the possible transmitted signals $x \in \mathbb{R}^{\Lambda_x}$. This candidate vector has very large values $\mho$ in positions where it's unlikely to include nonzero samples in the original transmitted signal and equals one in the remaining positions. For $n=0, 1, \ldots, \Lambda_x-1$, the vector $\xi[n]$ is defined as:

$$\xi(a, l_1, l_2)[n] = \begin{cases} 1, & n = l + kN_{baud}, \\ & l \in \{a + l_1, a + l_2\} \\ & k \in \{0, 1, \ldots, K-1\} \\ \mho, & \text{otherwise} \end{cases} \qquad (4\text{-}13)$$

The ML demodulation problem equation can be rewritten as:

$$\hat{x} = \arg\min_{x \in \mathbb{R}^{\Lambda_x} | \Xi(a, l_1, l_2) x\|_1 = K} (y - \Psi \mathcal{H} x)^T$$
$$(\Psi \mathcal{G} \mathcal{G}^T \Psi^T)^{-1} (y - \Psi \mathcal{H} x) \qquad (4\text{-}14)$$

where $\Xi(a, l_1, l_2) = \text{diag}\{\xi(a, l_1, l_2)\}$. Consequently, the previous equation can be simplified more and more to be a QP problem with two constraints as:

$$\tilde{z} = \min f^T z + \frac{1}{2} z^T Q z, \qquad (4\text{-}15)$$

Subject to: $z \in \mathbb{R}^{2\Lambda_x} : z \geq 0, [\xi(a, l_1, l_2)^T, \xi(a, l_1, l_2)^T] z = K$ $$Q = \begin{pmatrix} \mathcal{H}^T \Psi^T (\Psi \mathcal{G} \mathcal{G}^T \Psi^T)^{-1} \Psi \mathcal{H} & -\mathcal{H}^T \Psi^T (\Psi \mathcal{G} \mathcal{G}^T \Psi^T)^{-1} \Psi \mathcal{H} \\ -\mathcal{H}^T \Psi^T (\Psi \mathcal{G} \mathcal{G}^T \Psi^T)^{-1} \Psi \mathcal{H} & \mathcal{H}^T \Psi^T (\Psi \mathcal{G} \mathcal{G}^T \Psi^T)^{-1} \Psi \mathcal{H} \end{pmatrix} \qquad (4\text{-}16)$$

$$f = [-y_{notched}^T (\Psi \mathcal{G} \mathcal{G}^T \Psi^T)^{-1} \Psi \mathcal{H}, y_{notched}^T$$
$$(\Psi \mathcal{G} \mathcal{G}^T \Psi^T)^{-1} \Psi \mathcal{H}] \qquad (4\text{-}17)$$

The following equation used to extracts $\tilde{x} \in \mathbb{R}^{\Lambda_x}$ from $\tilde{z} \in \mathbb{R}^{2\Lambda_x}$ calculated in (4-15):

$$\tilde{x}_n = \tilde{z}_n - \tilde{z}_{(n+\Lambda_x)}, n=0,1, \ldots \Lambda_x - 1 \qquad (4\text{-}18)$$

The fastest one among several algorithms used to solve the QP problems is the interior-point algorithm. See S. Boyd and L. Vandenberghe. Convex Optimization. Cambridge University Press, 2004, incorporated herein by reference in its entirety. Since the QP problem in hand has only equalities and lower bounds, the problem is efficiently solved using medium-scale algorithm through Matlab in the present disclosure.

The detection process aims to estimate the signal $\hat{x}$ first, map $\hat{x}$ to estimate the payload $\hat{B}(\hat{x})$ and TOA $\hat{Y}(\hat{x})$. Hence the DSP back-end accomplishes the demodulation process through two steps. Estimating the arrival of the burst $\hat{Y}$ is the first one which is achieved by solving the QP problem using $\xi(a=0, l_1=0, l_2=\Gamma)$ to get $\tilde{x}^{(1)}$. The TOA can be estimated by correlating $\tilde{x}^{(1)}$ with the template $\xi(0,0,0)$ using the relation:

$$\hat{Y} = \arg\max_{n' \in \{0,1, \ldots \Gamma\}} \Sigma_n |\tilde{x}^{(1)}[n-n']| \xi(0,0,0)[n] \qquad (4\text{-}19)$$

The second step is to solve the QP problem using $\xi(a=0, l_1=0, l_2=\Gamma)$. The result $\tilde{x}^{(2)}$ and the first step's result $\hat{Y}$ are used to detect the payload sequence using the following formula:

$$\hat{B}^k = \text{sign}(\tilde{x}^{(2)}[\hat{Y}+kN_{baud}]), k=0,1, \ldots, K-1 \qquad (4\text{-}20)$$

The vector $\tilde{x}^{(2)}$ should contain K nonzero samples, but because of the noise and incorrect estimation of $\hat{Y}$ it may include more than K samples with different magnitudes. The estimated TOA $\hat{Y}$ is used to determine the location of the first nonzero sample in $\tilde{x}^{(2)}$. The remaining K-1 are handled easily as they are equally spaced by $N_{baud}$ samples. Finally the payload bits $\hat{B}^k$ are detected by taking only the sign of the determined locations in $\tilde{x}^{(2)}$.

In one embodiment of the present disclosure the mitigation of the NBI in blind UWB systems is evaluated. The diagram in FIG. 32 summarizes the main steps that are used to simulate the system. To sum up, the UWB system generates K bits in the first step, and shapes them. Next, the resultant signal goes through an IEEE802.11.4a channel. The UWB signal amplitude is scaled based on the traveled distance if the path-loss is considered. The NBI system also generates its own symbols, shapes them, and finally sends them over the interference channel.

At the receiver side, the received UWB signal is captured using BPF. Then the measurement is taken using the test functions followed by an algorithm that determines the number of active interferers. Based on this number, a digital notch filter suppresses the effects of those NBIs. Finally, the QP performs a joint decoding through two stages. The arrival of the current burst is estimated first. The payload is then demodulated in the second stage based on the estimated arrival.

All simulations are accomplished with $f_s=10$ GHz. For residential LOS environment, IEEE802.11.4a CM1 is used. The channel models for the UWB and the NBI signals are randomly selected from 100 realizations generated from CM1 that has a dispersion time around 50 nanosecond and normalized to have unit energy. A Hanning modulated pulse centered at frequency $f_{cU}=4$ GHz is used to shape the UWB symbols with duration interval $T_{pulse}=1$ ns, which yields $\Omega_U=2$ GHz. Moreover, the transmission rate is $$f_{baud} = \frac{f_{Nyquist}}{8} = \frac{2\Omega_U}{8}$$

500 Mbaud which causes an ISI to be extended over 25-50 pulses. The test functions are sinusoid waveforms generated to have frequencies that are deterministically selected from the band $$\left[f_c + \frac{\Omega_U}{2}, f_c - \frac{\Omega_U}{2}\right].$$

They are also designed to have a rapid decay using Tukey window.

The maximum TOA is $\gamma=1$ ns which yields $\Gamma=10$ samples. Since one of main objectives is to reduce the ADC through CS, the sampling-factor is adjusted to be 0.25 which implies 75% reductions in the sampling frequency. For the unlicensed NBI, the center frequency of the UWB pulse, the center frequency and the bandwidth of the jammers can be located anywhere in the UWB signal's spectrum. So assume that there is a partial band jammer and 2 partial bands jammer with two equal bandwidths. The 2 partial bands jammer causes interference in two bands at specific center frequencies. The partial band is fixed such that it has a center frequency equal to that of the modulated UWB pulse in order to produce as much as possible interference for the intended system i.e. $f_{cI}=f_{cU}=4$ GHz. The location of the 2 partial bands jammer is adjusted to be similar to one partial band which has bandwidth equal to summation of the two bands in the 2 partial bands jammer.

In this case the center frequencies are located at $$f_{cI1,2} = f_{cU} \pm \frac{\Omega_I}{2} = 4 \text{ GHz} \pm \frac{\Omega_I}{2}$$

where $\Omega_I$ is the bandwidth of each band.

While for the licensed NB services, the center frequencies and the bandwidth are fixed as illustrated. All those parameters are fixed unless stated otherwise.

At the beginning, the impact of the number of bits per burst, K, is considered. For a specific NBI, the performance is evaluated from the BER point of view. The performance is evaluated for K=2, 4, and 8 bit per burst and SNR=9 dB which is fixed for the following simulations unless otherwise stated. FIG. 33 shows the case of a partial band interferer that has $\Omega_I=20$ MHz and $f_{cI}=f_{cU}=4$ GHz.

If the mitigated with the unmitigated case are compared, it is clear that the performance is enhanced as K increases. Moreover, sending the information using large burst size outperforms sending it using small burst size. This is because of the equally spaced pulses and the low probability of error in arrival estimation which reduces the BER. At higher SIR, it is expected that there will be no benefit from the mitigation process since the NBI becomes very week and actually notch out the desired measurements.

Before changing the type and the location of the NBI, the type of the UWB modulated pulse is investigated. Three different windows are chosen including Hanning, Gaussian, and Hamming modulated pulses. For fair comparison, they're adjusted to produce similar 6-dB bandwidth of $\Omega_U=2$ GHz. The performance is discussed for the same NBI as shown in FIG. 34. For K=2, a partial band jammer is assumed with $f_{cI}=f_{cU}=4$ GHz. The Hanning and Hamming modulated pulses exhibit almost the same performance. When the SIR becomes greater than 3 dB, the Gaussian modulated pulse needs to increase the SIR by around 3 dB to get the same BER compared with Hanning and Hamming. As a result, Hanning modulated pulse is chosen to be used in the remaining scenarios.

The interference can take different models. When an interferer jams a system, it won't affect the performance being evaluated provided that its center frequency is out of the band of interest. In other words, the received signal at the output of the BPF doesn't contain any NBI. In the NBI free case, the performance should be almost similar to the case when the NBI is located out of the band of interest. Again for the unlicensed NBIs, assume a partial band jammer and 2 partial bands jammer with two equal bandwidths. For the licensed NBIs, the present disclosure studies them two at a time. For example, WiMAX, IEEE802.11b WLAN are added together and considered as two jammers in the mitigation process.

In FIG. 35 a partial band jammer is assumed to jam the UWB system with K=2. Slight enhancement is achieved by doubling the bandwidth since the power spreads over large bandwidth (20 MHz) compared with the 10 MHz. If the NBI is mitigated, the performance enhances in the rage of $-3<\text{SIR}<6$ dB. At higher SIR, no benefit is gained since the NBI's power is very low where actually the desired signal is dropped.

Similarly, the same system is evaluated in the presence of 2 partial bands jammer. The center frequencies for the two bands are adjusted at $f_{cI1}=4$ GHz+5 MHz, $f_{cI2}=4$ GHz−5 MHz. $\Omega_{I1}=\Omega_{I2}=10$ MHz, and for the other case $f_{cI1}=4$ GHz+10 MHz, $f_{cI2}=4$ GHz−10 MHz and $\Omega_{I1}=\Omega_{I2}=20$ MHz. In this case, the enhancement due to the mitigation against the jammers is large and clear as FIG. 36 illustrates. Such setting in the center frequencies of the jammers are in order to make them equivalent to two different partial bands. The 2 partial bands jammer is one signal which contains two bands, leading two low power in the bands. For the considered SIR, the power in the band of a partial band jammer with $\Omega_I=10$ MHz is greater than that of the 2 partial bands with $\Omega_{I1}=\Omega_{I2}=10$ MHz Therefore, the performance improves by increasing the bandwidth i.e. the NBI's effect decreases.

One object is to see the behavior of the intended system as a function of the jammer's bandwidth. For the two types of the unlicensed interferers the BER is investigated versus the jammer bandwidth for $\Omega_I=\Omega_{I1}=\Omega_{I2}$, SNR=9 dB, and SIR=−3 dB which implies that the interfering signal is double the UWB signal. As the NBI's power becomes very high, BER should decrease as the bandwidth of the jammer increases since the power spreads over large band. An UWB system that uses two bit per burst transmission is used (K=2) to send 100,000 symbols. The performance is plotted in FIG. 37. The dual-band interferer has less effect compared with the single-band case since the power at the effecting bands are so low compared with that of the partial band NBI. At bandwidth between 75-to-100 MHz, the two cases have the same effect on the system performance.

The effect of the licensed NB services restricts the selected frequency band. For WiMAX the possible range is large, so it can be studied for example at 4 GHz together with IEEE802.11a WLAN (WLANa) operating at 5.2 GHz in order to have two licensed interferers to the intended system. The modulated UWB pulse is designed to have a center frequency at $f_{cU}$=4.5 GHz and $\Omega_U$=2 GHz. The two jammers are added together and consider as one signal when calculating the SIR. Though, they are considered as two NBIs in the mitigation process.

Bluetooth and IEEE802.11b WLAN (WLANb), operating in the ISM band (2.4 GHz), need to change center frequency of the transmitted pulse. Coexistence of WiMAX interferer at 3.5 GHz with Bluetooth or with IEEE802.11b WLAN is also possible. Hence an UWB modulated pulse at $f_{cU}$=3 GHz be subject to interference from those NB services. Bluetooth and IEEE802.11b WLAN interferers or WiMAX and Bluetooth interferers are two different cases which are evaluated. The UWB system sends the data with K=8 and the SNR=27 dB.

The bandwidth of the WiMAX signal is set to its maximum ($\Omega_I$=20 MHz). The maximum bandwidth equals 20 MHz, 1 MHz, 22 MHz for WLANa, Bluetooth, and WLANb, respectively. The performance in WLANb and Bluetooth case outperforms that of WiMAX and Bluetooth as shown in FIG. 38. There are two main reasons for this; the bandwidth of the WiMAX is smaller than that for the WLANb by 2 MHz and its center frequency is closer to $f_{cU}$. Hence the affected band in the two cases is so different and consequently the corrupted and the notched measurements are also different. The center frequencies of WLANb and Bluetooth are the same which make them behave as one NBI, though it is changing for the Bluetooth because of the frequency hopping. The performance is affected more as the interferer's bandwidth decreases.

The bandwidth of the UWB pulse also has an effect in the notched measurements. For Hanning window with pulse duration around 1 nanosecond the 6-dB bandwidth is $\Omega_U$=2 GHz, see FIG. 26. As the pulse duration increases to 2 nanosecond the 6-dB bandwidth decreases to $\Omega_U$=1 GHz. In other words, the 6-dB bandwidth is $\Omega_U=2/T_{pulse}$. This parameter is related to the number of corrupted measurements being dropped. Comparing two different bandwidth for the same modulated pulse, the performance is shown in FIG. 39 for K=2, and 4 bit per burst. Meanwhile this parameters has an effect on the baud rate, the ratio of transmission remains as before i.e.

$$f_{baud} = \frac{f_{Nyquist}}{8}$$

where $f_{Nyquist}=2\Omega_U$.

When $\Omega_U$ increases the number of the notched measurements is reduced and preserves the important information of the transmitted pulse. Therefore, the performance enhances as FIG. 39 illustrates. When $\Omega_U$ decreases more of the measurements $$\left(D \propto \frac{1}{\Omega_U}\right)$$

are notched out.

Consequently the performance degrades. Similar to previous observation in FIG. 33, as K increases the performance improves.

The baud rate is also another important parameter. Here it is desired to know how much data can be transmitted compared to the Nyquist rate without degrade the system performance.

The system in A. Oka and L. Lampe, "Compressed Sensing Reception of Bursty UWB Impulse Radio is Robust to Narrow-Band Interference," in IEEE Global Telecommunications, December, 2009, incorporated herein by reference was studied at baud rate $$f_{baud} = \frac{f_{Nyquist}}{8},$$

where $f_{Nyquist}=2\Omega_U$. Three different baud rates are compared in FIG. 40 including $$f_{baud} = \frac{f_{Nyquist}}{8} = 500 \text{ Gbaud,}$$

$$\frac{f_{Nyquist}}{4} = 1000 \text{ Gbaud and } \frac{f_{Nyquist}}{2} = 2000 \text{ Gbaud with } K = 2.$$

A partial band NBI is present with bandwidth and center frequency of $\Omega_I$=20 MHz, $f_{cI}$=4 GHz, respectively.

The ISI is proportional to the transmission rate. Consequently, as the baud rate increases more pulses are being overlapped which degrade the system performance.

Here, the mitigation of the NBI in blind UWB systems is evaluated. The speeds of the ADC as well as the NBI effects are reduced through CS. The present disclosure extends the mitigation technique in A. Oka and L. Lampe, "Compressed Sensing Reception of Bursty UWB Impulse Radio is Robust to Narrow-Band Interference," in *IEEE Global Telecommunications*, December, 2009, incorporated herein by reference to consider the effect of two licensed or unlicensed NBIs. The present disclosure also studies different parameters that may affect the system performance such as the burst size, the type of the modulated window and the baud rate. In addition, the present disclosure examines the performance of the system in the presence of different licensed and unlicensed NBIs. The present disclosure also goes over the parameters that are related to the mitigation process such as the NBI's bandwidth and the bandwidth of the transmitted pulse.

As the present disclosure uses more bit per burst, the difference between the mitigated and the unmitigated case increases. Though, this difference becomes low as the SIR increases because the NBI becomes so weak. Moreover, sending the information using large burst size outperforms sending it using small burst size since the probability of making an error in one bit decreases as the burst size increases. The simulation shows that the BER is a weak function of the considered modulated widow. Additionally, the performance is highly affected when the NBI's center frequency is shifted to the center frequency of the transmitted pulse.

For a partial band jammer, slight enhancement is achieved by doubling the bandwidth since the power spreads over larger bandwidth. While in the dual-band jammer case, the enhancement due to the mitigation against the jammers is evident. At higher SIR, more benefit is not obtained since the NBI's power is very low where the present disclosure actually drops the desired signal. For the considered scenarios, it is demonstrated that the BER is a strong function of the NBI's bandwidth.

In the simulation, the present disclosure also considers different bandwidth of the transmitted pulse, $\Omega_U$. When $\Omega_U$ increases the number of the notched measurements is reduced and the present disclosure preserves the important information of the transmitted pulse. Therefore, the performance enhances. When $\Omega_U$ decreases the present disclosure notches out many of them. Consequently the performance degrades since the power of the NBI is now concentrated in a relatively larger band.

The present disclosure mainly focuses on studying the mitigation of NBI in trained and blind UWB systems based on CS. The mitigation technique in the trained system needs to have some knowledge about the NBI signal's subspace, while in blind systems other parameters are more dominant such as the bandwidth of the NBI, the bandwidth of UWB transmitted pulse and the number of measurements (mixer-integrators). In both systems, CS is applied to reduce the speed of the ADC by using mixer-integrators lower than the required by Shannon theorem.

The present disclosure describes a method including pilot symbol distribution that optimizes the BER in trained UWB systems. In blind systems the present disclosure extends the mitigation process to mitigate the effect of two licensed and unlicensed NBIs.

It was shown that due to the large bandwidth of the UWB signals, they require a very high speed ADC and they may interfere with other narrowband systems. Hence, an UWB receiver should handle those two problems in an efficient way.

Since narrowband signals have sparse representation in the DCT domain, they can be estimated using CS. The mitigation technique needs to have knowledge about the NBI signal's subspace. The present disclosure estimated the sparse components of the interferer using MP and then used knowledge to suppress the most significant coefficients. This was achieved by adjusting the value of the interference threshold, $\mu$. The present disclosure established that, this value should not be very large in order to have a good NBI's subspace estimation and shouldn't be very low to avoid excessive noise level.

Moreover, the present disclosure provides pilot symbols distribution that optimizes the BER. The present disclosure describes a system in which a minimum required number of symbols in the first group $N_{P1}$ after which the performance saturates. Communications can be achieved with $N_{p2}=2$, however, the performance can be enhanced if the UWB signal structure is employed in the construction of the projection matrix. The number of pilot symbols in the third group $N_{p3}$ is directly proportional to the performance; hence more symbols should be assigned to get information about the channel.

In one embodiment in the presence of strong and different licensed and unlicensed NBIs, the location of the NBI relative to the center frequency of the transmitted pulse determines the amount of the degradation in the system performance. Additionally, the present disclosure evaluated the system in the presence of multiuser interference. Simulations show that when more users being active the system performance degrades.

Further, the present disclosure considered the mitigation of narrowband interference in blind systems. The mitigation process needs to locate the center frequency of the NBI. Then a digital notch filter is employed to drop out the affect measurements around the estimated interferer based on some parameters such as the bandwidth of the NBI, the bandwidth of UWB transmitted pulse and the number of measurements (mixer-integrators). The main parameter in hand is the bandwidth of the NBI. Hence, it should be available at the intended receiver.

The performance is highly affected by the NBI's center frequency relative to the center frequency of the transmitted pulse. The present disclosure demonstrated that the BER is a strong function of the NBI's bandwidth. The performance enhances as the NBI's bandwidth increases since the power spreads over large bandwidth. As the UWB signal's bandwidth increases the number of the notched measurements reduces and the present disclosure preserves the important information of the transmitted pulse. Moreover, simulation shows that the BER is a weak function of the considered modulated windows.

The mitigation process in the blind and trained systems is totally different since it depends on various parameters. The inverse DCT transformation matrix of interferer should be known; in this case the trained system is used. On the other hand, the blind system can be effectively used, if the NBI's bandwidth is known.

The present disclosure considered NBI mitigation in UWB systems based on CS. There are still several open problems whose solution could add a great benefit in the field of interest. The present disclosure may summarize them in the following points:

Extend the trained CS based UWB system to perform MUltiuser Detection (MUD). Both the NBI and the multiuser interference are mitigated. Before NBI mitigation, the receiver jointly decodes all users first. Then subtracts the decoded information from the received noisy signal.

In Multiuser systems the dictionary is redesigned to nullify the other users. Different waveforms for the different users are used. Future work may compare and study different signaling schemes that can be used for multiuser techniques.

The amount of degradation due to the presence of other users is quantified. The method may include using compressive sensing algorithm to possibly reject other users. The challenge is in the similarity between the intended dictionary and the one to be nullified.

A receiver that changes the interference threshold, adaptively in order to enhance the BER. The same receiver may adaptively select the best pilot symbols distribution that optimizes the system performance.

A blind UWB system for multiuser signal detection.

The method may know the NBI's bandwidth by approximation. An algorithm is used to estimate the number of the active NBIs. A threshold to handle the NBI as a random signal can be used to detect weather the NBI is active or not.

Next, a hardware description of a device according to exemplary embodiments is described with reference to FIG.

41. In FIG. 41, the device includes a CPU 4100 which performs the processes described above. The process data and instructions may be stored in memory 4102. These processes and instructions may also be stored on a storage medium disk 4104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer.

Further, the claimed advancements may be provided as a utility application, background daemon, or component of an operating system, or combination thereof, executing in conjunction with CPU 4100 and an operating system such as Microsoft Windows 7, UNIX, Solaris, LINUX, Apple MAC-OS and other systems known to those skilled in the art.

CPU 4100 may be a Xenon or Core processor from Intel of America or an Opteron processor from AMD of America, or may be other processor types that would be recognized by one of ordinary skill in the art. Alternatively, the CPU 4100 may be implemented on an FPGA, ASIC, PLD or using discrete logic circuits, as one of ordinary skill in the art would recognize. Further, CPU 4100 may be implemented as multiple processors cooperatively working in parallel to perform the instructions of the inventive processes described above.

The device in FIG. 41 also includes a network controller 4106, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN sub-networks. The network 77 can also be wired, such as an Ethernet network, or can be wireless such as a cellular network including EDGE, 3G and 4G wireless cellular systems. The wireless network can also be WiFi, Bluetooth, or any other wireless form of communication that is known.

The device further includes a display controller 4108, such as a NVIDIA GeForce GTX or Quadro graphics adaptor from NVIDIA Corporation of America for interfacing with display 4110, such as a Hewlett Packard HPL2445w LCD monitor. A general purpose I/O interface 4112 interfaces with a keyboard and/or mouse 4114 as well as a touch screen panel 4116 on or separate from display 4110. General purpose I/O interface also connects to a variety of peripherals 4118 including printers and scanners, such as an OfficeJet or DeskJet from Hewlett Packard.

A sound controller 4120 is also provided in the device, such as Sound Blaster X-Fi Titanium from Creative, to interface with speakers/microphone 4122 thereby providing sounds and/or music.

The general purpose storage controller 4124 connects the storage medium disk 4104 with communication bus 4126, which may be an ISA, EISA, VESA, PCI, or similar, for interconnecting all of the components of the device. A description of the general features and functionality of the display 4110, keyboard and/or mouse 4114, as well as the display controller 4108, storage controller 4124, network controller 4106, sound controller 4120, and general purpose I/O interface 4112 is omitted herein for brevity as these features are known.

See Evaluation of Compressed Sensing in UWB Systems with NBI, by Saleh Ahmed Alawsh, A thesis presented to the dean of graduate studies at King Fand University of Petroleum and Minerals, Dhahran, Saudi Arabia, April 2013, incorporated herein by reference in its entirety.

The invention claimed is:

1. A method of mitigating interference by narrow band interference (NBI) signals in ultra wide band (UWB) systems, comprising:
   mitigating multiuser interference from narrowband interferers operating in a range of 2-11 GHz, wherein the multiuser interference interferes with a trained UWB system that uses pilot symbol assisted modulation;
   passing a received UWB signal through a band pass filter (BPF), wherein the BPF is located at a UWB receiver and the received UWB signal is a Hanning modulated pulse;
   measuring a plurality of test functions to determine frequencies of the NBI signals in the received UWB signal;
   determining a number of active users;
   notch filtering the NBI signals, based on the determined frequencies of the NBI signals and the determined number of active users;
   passing the notch filtered signal through a quadratic programming algorithm, wherein the quadratic programming algorithm performs joint decoding;
   estimating an arrival of a UWB payload; and
   demodulating the UWB payload, based on the estimated arrival of the UWB payload.

2. The method of claim 1, wherein the plurality of test functions are based on matching pursuit compressed sensing and generalized likelihood ratio test detection.

3. The method of claim 1 further comprising deriving distributions of pilot group training symbols, values of number of frames per symbol, and interference threshold to reduce bit error rate when a plurality of NBI signals interfere with one of the UWB systems, wherein the one of the UWB systems uses the pilot group training symbols for channel estimation.

4. The method of claim 1 further comprising
   detecting and mitigating more than one NBI signals interfering with the UWB signal in an UWB channel in a blind UWB system, wherein the blind UWB system is not based on training sequences.

5. The method of claim 1 wherein the trained UWB system further combines pilot symbol assisted modulation with direct sequence spread spectrum and time hopping for signaling.

6. The method of claim 5 further comprising detecting and mitigating more than one NBI signals interfering with an UWB signal in an UWB channel in a blind UWB system, wherein the UWB channel randomly varies from frame to frame, and wherein the UWB signal is subject to band pass filtering and quadratic programming and interior point algorithm operation.

7. The method of claim 1 further comprising mitigating the interference from NBI signals on the UWB systems by deriving values of NBI bandwidth.

8. The method of claim 1 further comprising mitigating the interference from NBI signals on UWB pulses by deriving values of bandwidth of the UWB pulses, type of modulated window, and baud rate.

9. The method of claim 1 further comprising mitigating interference from NBI signals on the UWB systems by deriving a burst size.

10. The method of claim 1 further comprising reducing bit error rate in one of the UWB systems with NBIs, by increasing burst sizes of sending information, wherein said one of the UWB systems is based on equally spaced pulses.

11. A non-transitory computer readable medium having instructions stored therein that when executed by one or more processors cause the one or more processors to perform a method of mitigating interference by narrow band interference (NBI) signals in ultra wide band (UWB) systems, the method comprising:

mitigating multiuser interference from narrowband interferers operating in a range of 2-11 GHz, wherein the multiuser interference interferes with a trained UWB system that uses pilot symbol assisted modulation;

passing a received UWB signal through a band pass filter (BPF), wherein the BPF is located at a UWB receiver and the received UWB signal is a Hanning modulated pulse;

measuring a plurality of test functions to determine frequencies of the NBI signals in the received UWB signal;

determining a number of active users;

notch filtering the NBI signals, based on the determined frequencies of the NBI signals and the determined number of active users;

passing the notch filtered signal through a quadratic programming algorithm, wherein the quadratic programming algorithm performs joint decoding;

estimating an arrival of a UWB payload; and demodulating the UWB payload, based on the estimated arrival of the UWB payload.

12. The non-transitory computer-readable medium of claim 11, wherein the plurality of test functions are based on matching pursuit compressed sensing and generalized likelihood ratio test detection.

13. The non-transitory computer-readable medium of claim 11 wherein the method further comprises deriving distributions of pilot group training symbols, values of number of frame per symbol, and interference threshold to reduce bit error rate when a plurality of NBI signals interfere with one of the UWB systems, wherein the one of the UWB systems uses the pilot group training symbols for channel estimation.

14. The non-transitory computer-readable medium of claim 11, wherein the method further comprises
detecting and mitigating more than one NBI signals interfering with an UWB signal in an UWB channel in a blind UWB system, wherein the blind UWB system is not based on training sequences.

15. The non-transitory computer-readable medium of claim 11 wherein the trained UWB system further combines pilot symbol assisted modulation with direct sequence spread spectrum and time hopping for signaling.

16. The non-transitory computer-readable medium of claim 15 wherein the method further comprises detecting and mitigating more than one NBI signals interfering with an UWB signal in an UWB channel in a blind UWB system, wherein the UWB channel randomly varies from frame to frame, and wherein the UWB signal is subject to band pass filtering and quadratic programming and interior point algorithm operation.

17. The non-transitory computer-readable medium of claim 11 wherein the method further comprises mitigating the interference from NBI signals on the UWB systems by deriving values of NBI's bandwidth.

18. The non-transitory computer-readable medium of claim 11 wherein the method further comprises mitigating the interference from NBI signals on UWB pulses by deriving values of bandwidth of the UWB pulses, type of modulated window, and baud rate.

19. The non-transitory computer-readable medium of claim 11 wherein the method further comprises mitigating interference from NBI signals on one of the UWB systems by deriving a burst size and further reducing bit error rate in an UWB system with NBIs, by increasing burst sizes of sending information, wherein said one of the UWB systems is based on equally spaced pulses.

20. An apparatus configured to mitigating interference by narrow band interference (NBI) signals in ultra wide band (UWB) systems, comprising:

a UWB receiver to mitigate multiuser interference from narrowband interferers operating in a range of 2-11 GHz, wherein the multiuser interference interferes with a trained UWB system that uses pilot symbol assisted modulation;

a band pass filter (BPF) to filter a received Harming modulated UWB pulse;

measuring circuitry to measure a plurality of test functions to determine frequencies of the NBI signals in the received Harming modulated UWB pulse and to determine a number of active users;

a notch filter to filter the NBI signals, based on the determined frequencies of the NBI signals and the determined number of active users;

a joint decoder to perform quadratic programming on the notch filtered signal;

an estimator to estimate an arrival of a UWB payload; and a demodulator to demodulate the UWB payload, based on the estimated arrival of the UWB payload.

* * * * *